United States Patent [19]
Hargarten et al.

[11] Patent Number: 4,911,006
[45] Date of Patent: Mar. 27, 1990

[54] CUSTODY TRANSFER METER

[75] Inventors: James W. Hargarten, Niwot; Allan L. Samson, Longmont, both of Colo.

[73] Assignee: Micro Motion Incorporated, Boulder, Colo.

[21] Appl. No.: 320,048

[22] Filed: Mar. 7, 1989

Related U.S. Application Data

[62] Division of Ser. No. 915,345, Oct. 3, 1986.

[51] Int. Cl.$^4$ .............................................. G01F 1/84
[52] U.S. Cl. ................................. 73/198; 73/861.37; 364/510; 364/501
[58] Field of Search ................ 73/198, 861.37, 861.38; 364/501.01, 510

[56] References Cited

U.S. PATENT DOCUMENTS

| | | | |
|---|---|---|---|
| 4,311,054 | 1/1982 | Cox et al. | 73/861.38 |
| 4,491,025 | 1/1985 | Smith et al. | 73/861.38 |
| 4,622,858 | 11/1986 | Mizerak | 73/861.38 |
| 4,655,089 | 4/1987 | Kappelt et al. | 73/861.83 |
| 4,660,421 | 4/1987 | Dahlin et al. | 73/861.38 |
| 4,729,243 | 3/1988 | Friedland et al. | 73/861.38 |

FOREIGN PATENT DOCUMENTS

| | | | |
|---|---|---|---|
| 0109218 | 5/1984 | European Pat. Off. | |
| 2551204 | 3/1985 | France | |
| 0151518 | 9/1983 | Japan | 73/861.38 |

Primary Examiner—Herbert Goldstein
Attorney, Agent, or Firm—Peter L. Michaelson

[57] ABSTRACT

Apparatus and accompanying methods for a custody transfer metering system, that illustratively utilizes a dual tube Coriolis mass flow rate meter and provides accurate totalized mass flow measurements and fault detection capability, are described. Specifically, this apparatus senses time differences occurring in the movement of both flow tubes. Four such time difference measurements are taken and combined in a predefined manner so as to eliminate differences appearing in the electrical characteristics of analog circuitry connected to each of two sensors used to detect tube movement and thereby to advantageously increase measurement accuracy. Mass flow rate of the fluid passing through the meter is determined, as a function of the combined time measurements, in terms of normalized mass and time units and thereafter converted into user specified mass units/unit time. The resulting converted value is used to compute totalized mass flow and to set and/or update various system outputs. Thereafter, the converted value is multiplied by an appropriate time factor to provide mass flow rate in terms of user specified mass and time units. By use of normalized calculations, processing time is advantageously saved and the number of unit conversions is advantageously reduced which, in turn, increases system accuracy. A sequence of diagnostic tests is continually performed to detect a variety of fault conditions and appropriately alert the user and inhibit further totalization.

37 Claims, 31 Drawing Sheets

SYSTEM BLOCK DIAGRAM

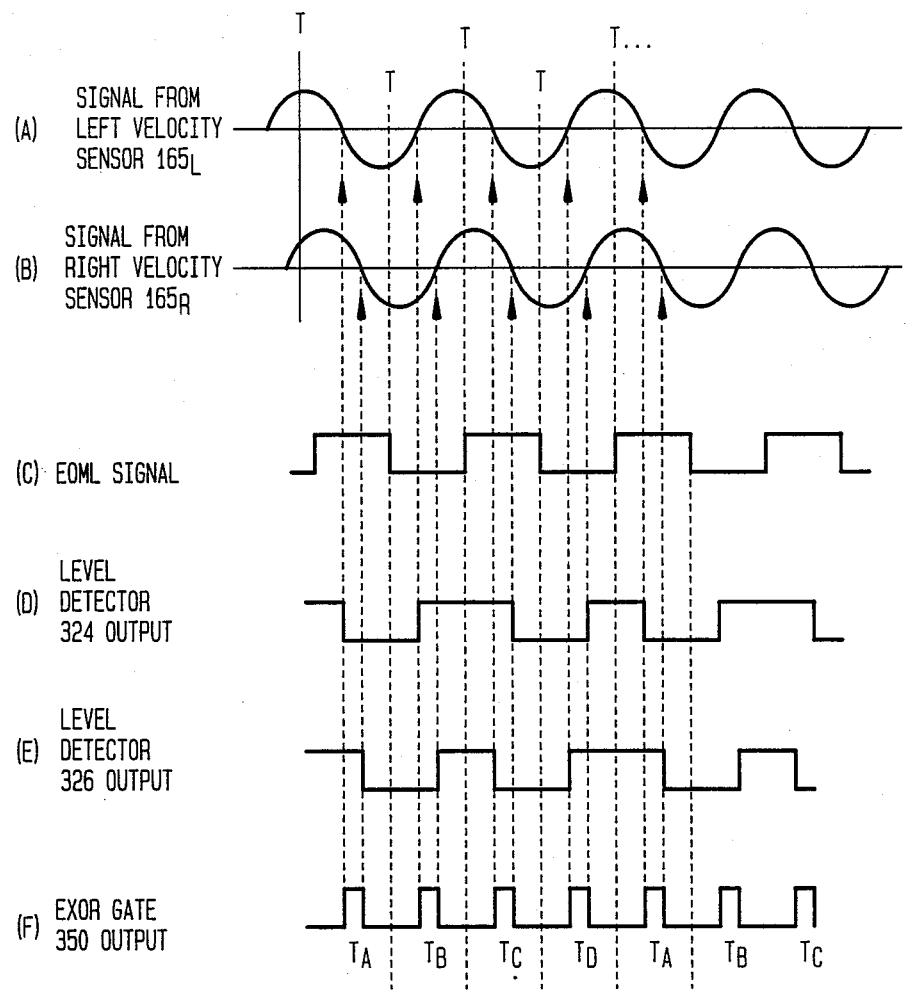

DRIVE CIRCUIT 40

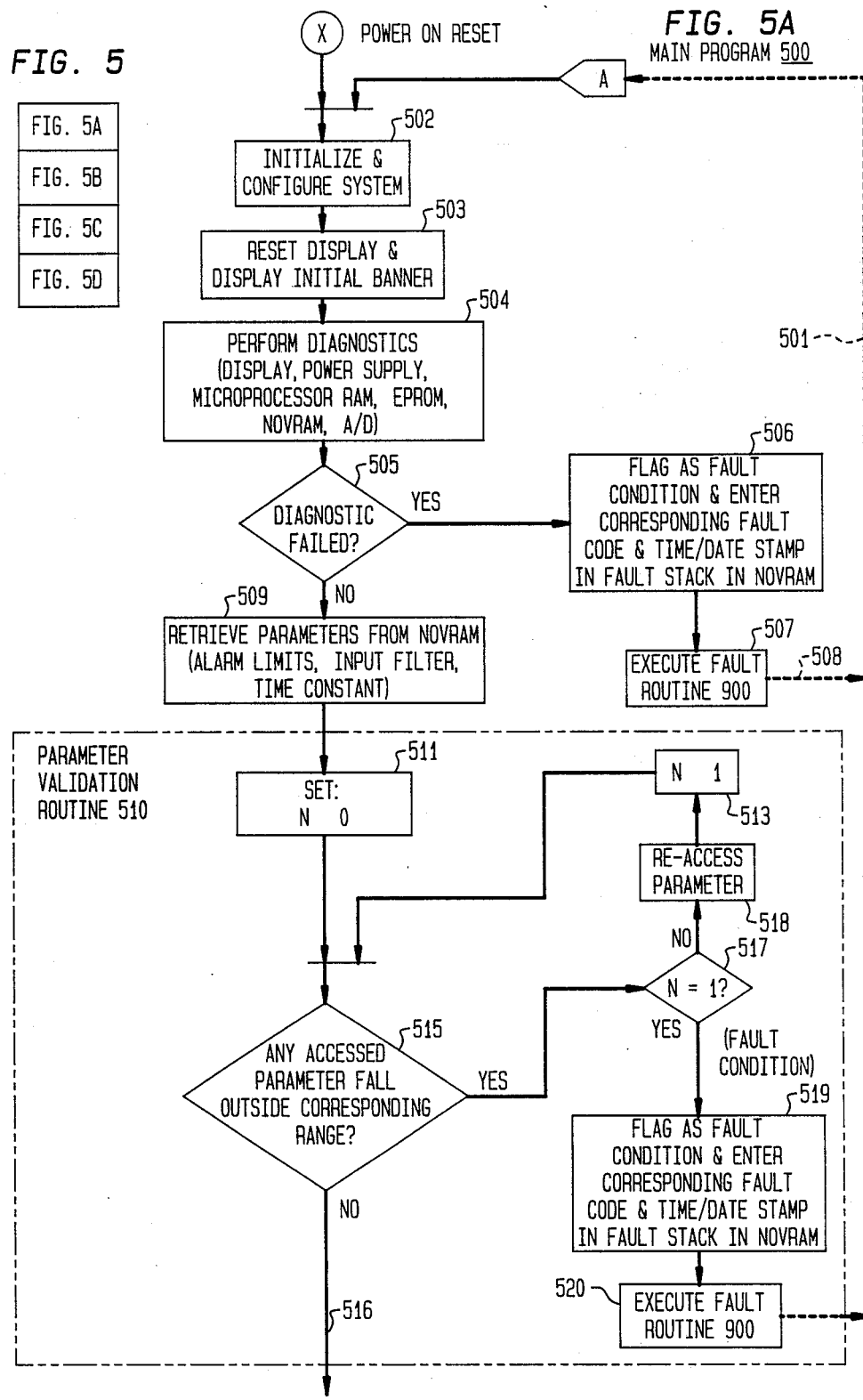

FIG. 5B

```
                    ↓
            ┌─────────────────┐
            │ ENABLE DRIVE CIRCUIT │─521
            └─────────────────┘
                    ↓
    ┌─525         ┌─────┐
    │ J  J+1 │    │ J  1 │─522
    └────────┘    └─────┘
         │            ↓
         │         ─523
         │       ╱ 1 SECOND ╲  NO
         │       ╲ ELAPSED? ╱──┐
         │        ╲        ╱   │
         │          YES        │ (loop back to 523)
         │           ↓
         │         ─526
    NO   │       ╱ EXCESS   ╲
    ┌────┼──────╲ DRIVE SIGNAL╱
    │    │       ╲   ON?   ╱
    │    │          YES
    │    │         ─527
    │   NO ╱ J = 30? ╲
    │   ←─╲         ╱
    │        YES
    │         ↓    ─529                      ─528
    │       ╱ EXCESS  ╲  YES        ┌──────────────────────┐
    │      ╲ DRIVE SIGNAL╱──────────│ FLAG AS FAULT CONDITION & │
    │       ╲   ON?   ╱ (FAULT      │ ENTER CORRESPONDING FAULT │
    │        ╲       ╱  CONDITION)  │ CODE & TIME/DATE STAMP IN │
    │           NO                  │ FAULT STACK IN  NOVRAM    │
    │            │                  └──────────────────────┘
    └────────────┤                            ↓      ─530
                 │                  ┌──────────────────┐ ─533
                 │       ─535       │ EXECUTE FAULT    │─────→
                 │   ┌──────────┐   │  ROUTINE 900     │
                 └──→│  SET UP  │   └──────────────────┘
                     │INTERRUPT MASK│
                     └──────────┘
                          ↓ ─537
                     ┌──────────┐
                     │ENABLE EOM│
                     │ INTERRUPT│                     ─543
                     └──────────┘            ┌──────────────────────┐
                          ↓ ─539             │ FLAG AS FAULT CONDITION & │
                     ┌──────────┐            │ ENTER CORRESPONDING FAULT │
                     │SET SOFTWARE TIMER│    │ CODE & TIME/DATE STAMP IN │
                     │ TO 1 SECOND:    │     │ FAULT STACK IN  NOVRAM    │
                     │   IROC  20      │     └──────────────────────┘
                     └──────────┘                    ↓ ─544
                          ↓ ─541              ┌──────────────┐  ─545
                     ┌──────────┐             │EXECUTE FAULT │─────→
                     │PERFORM SENSOR│         │ ROUTINE 900  │
                     │ DIAGNOSTICS │          └──────────────┘
                     └──────────┘   YES
                          ↓       ─542
                       ╱ DIAGNOSTIC ╲
                      ╲   FAILED?  ╱
                       ╲          ╱
                           NO
                            ↓
```

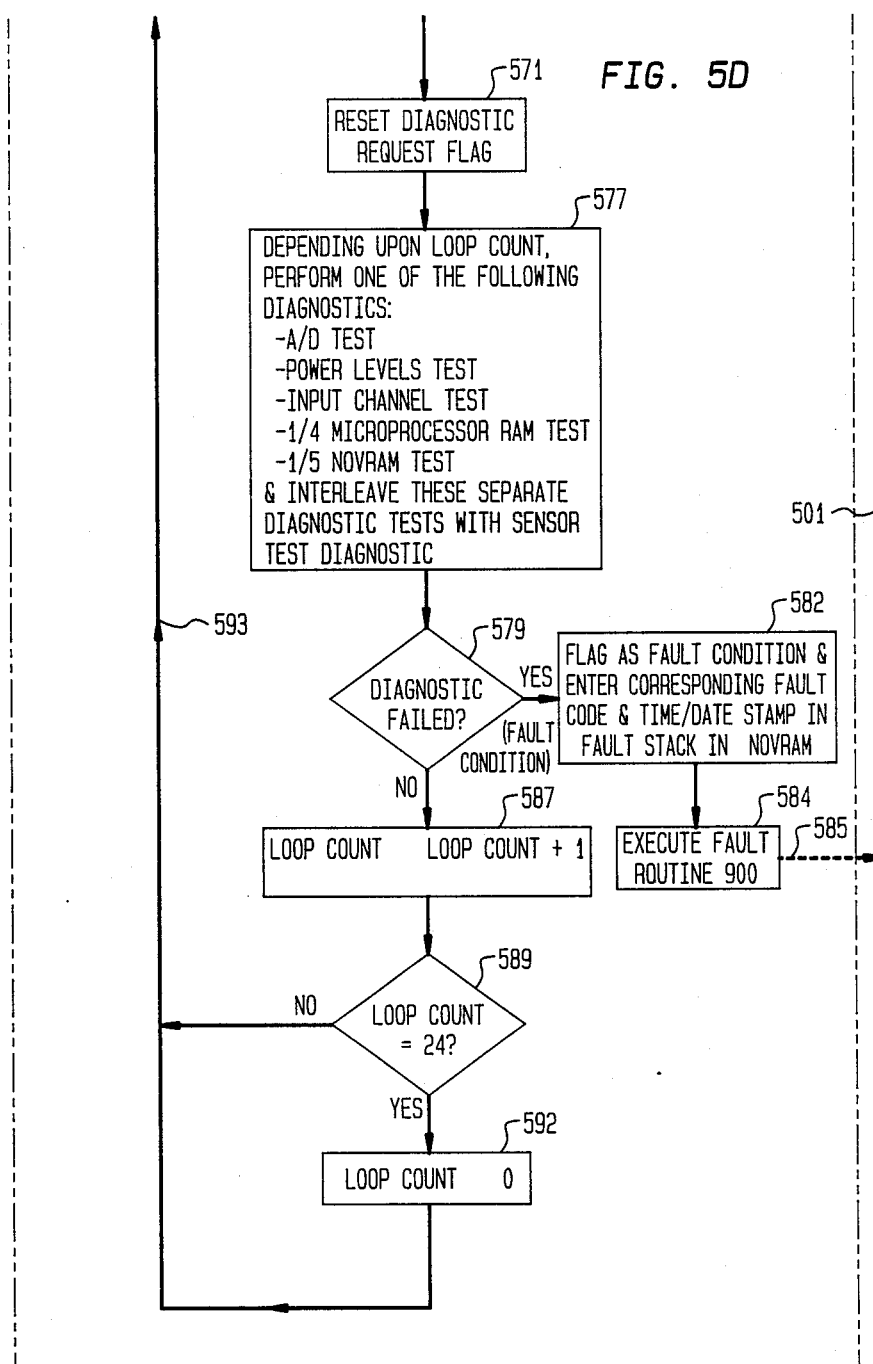

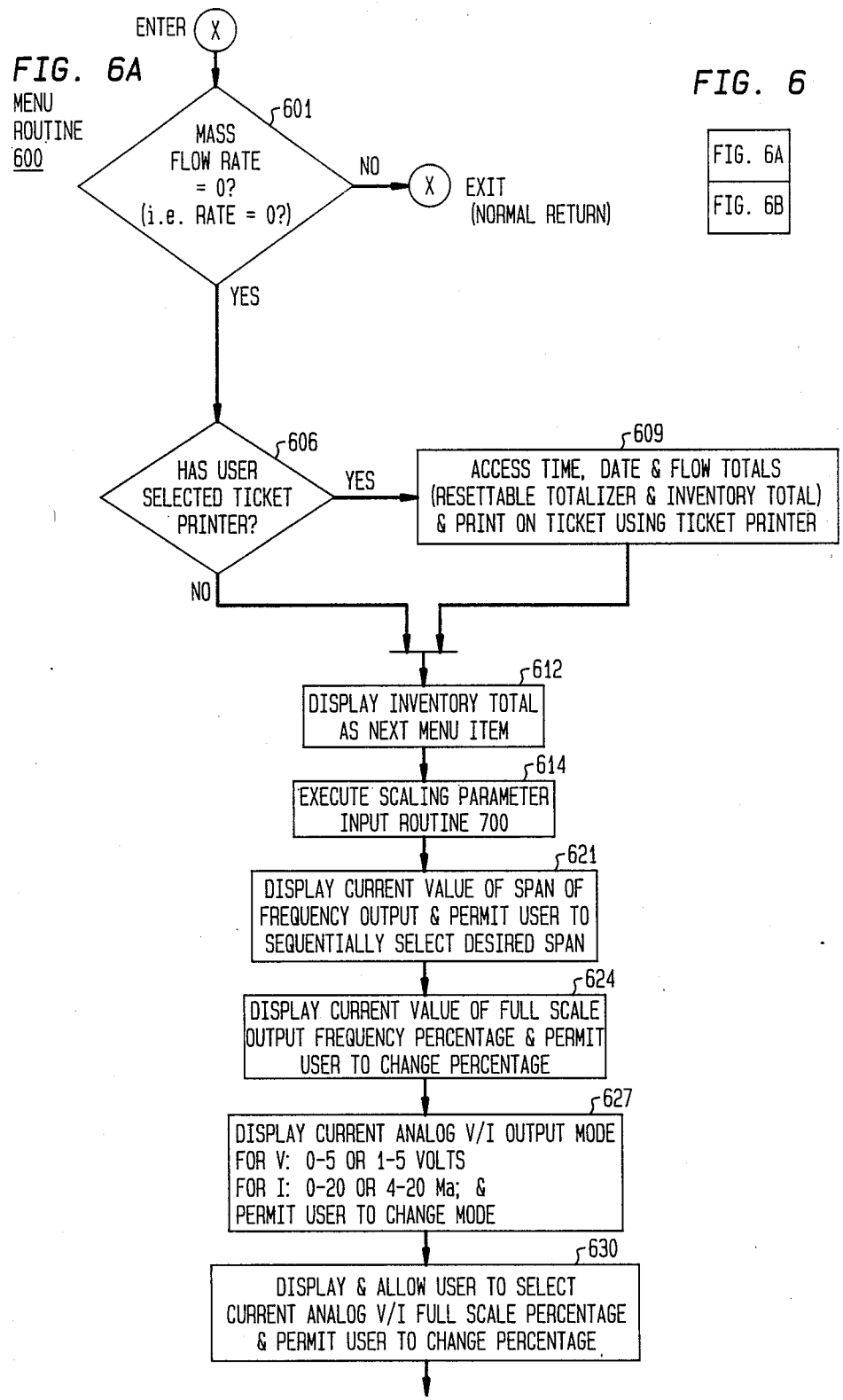

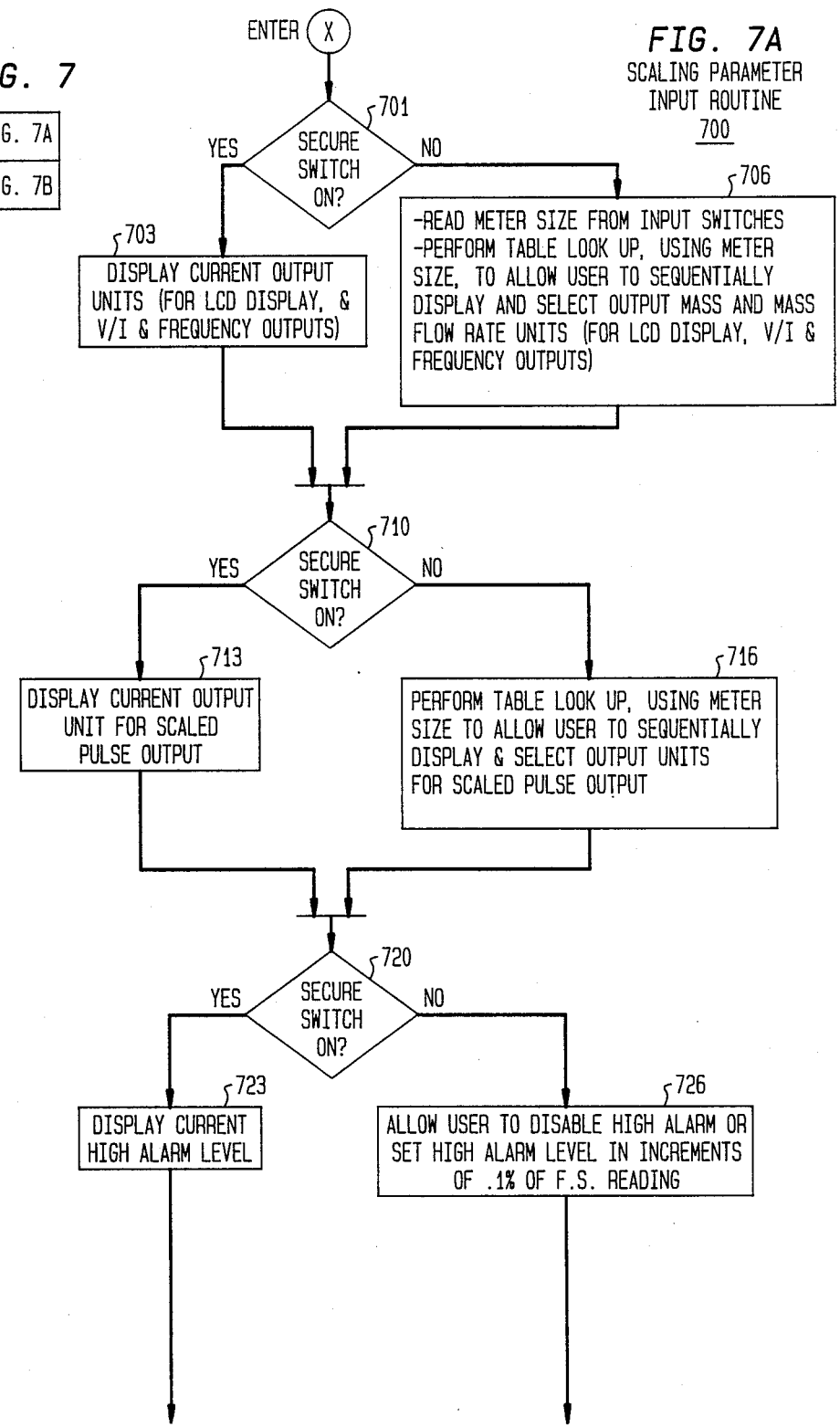

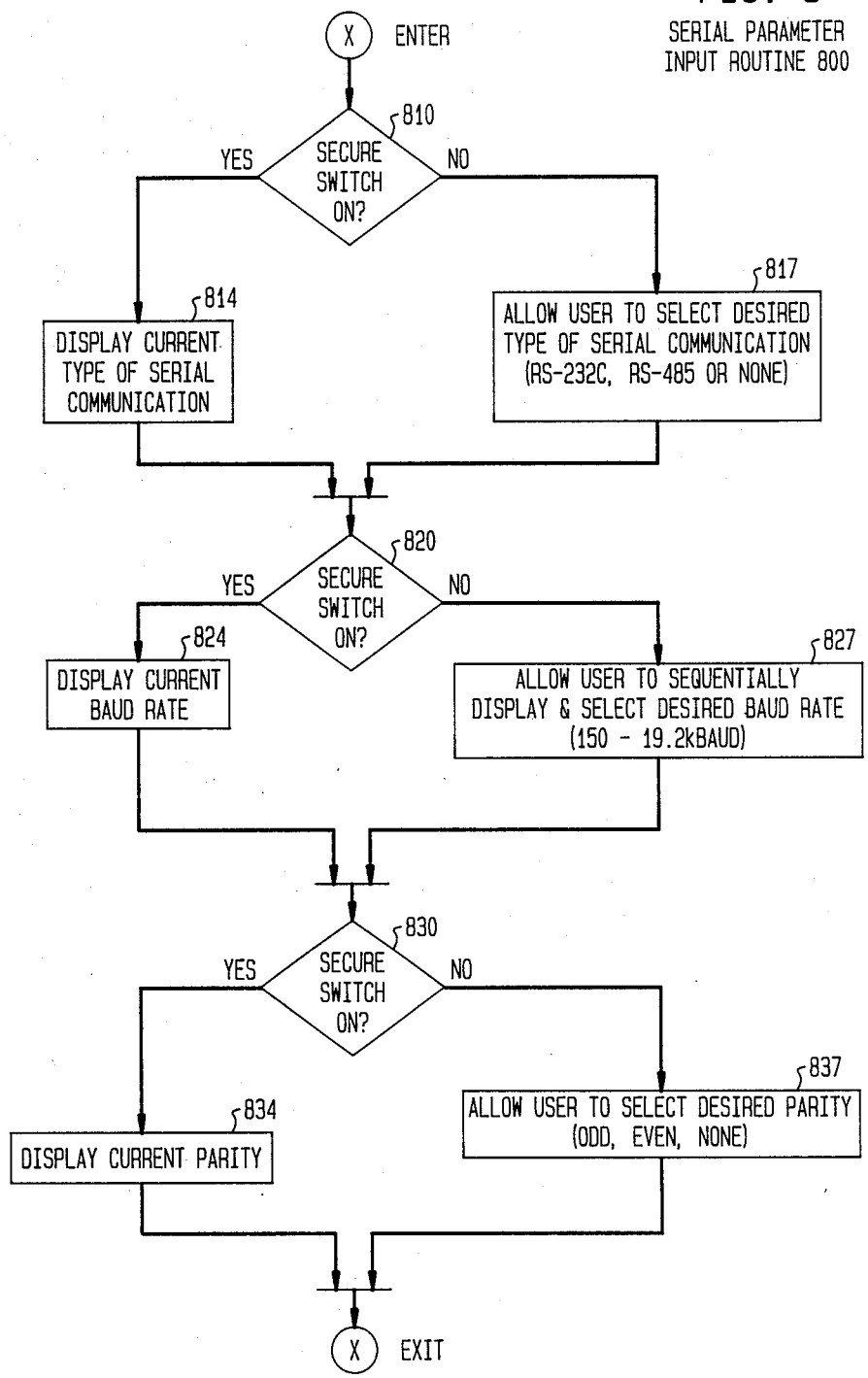

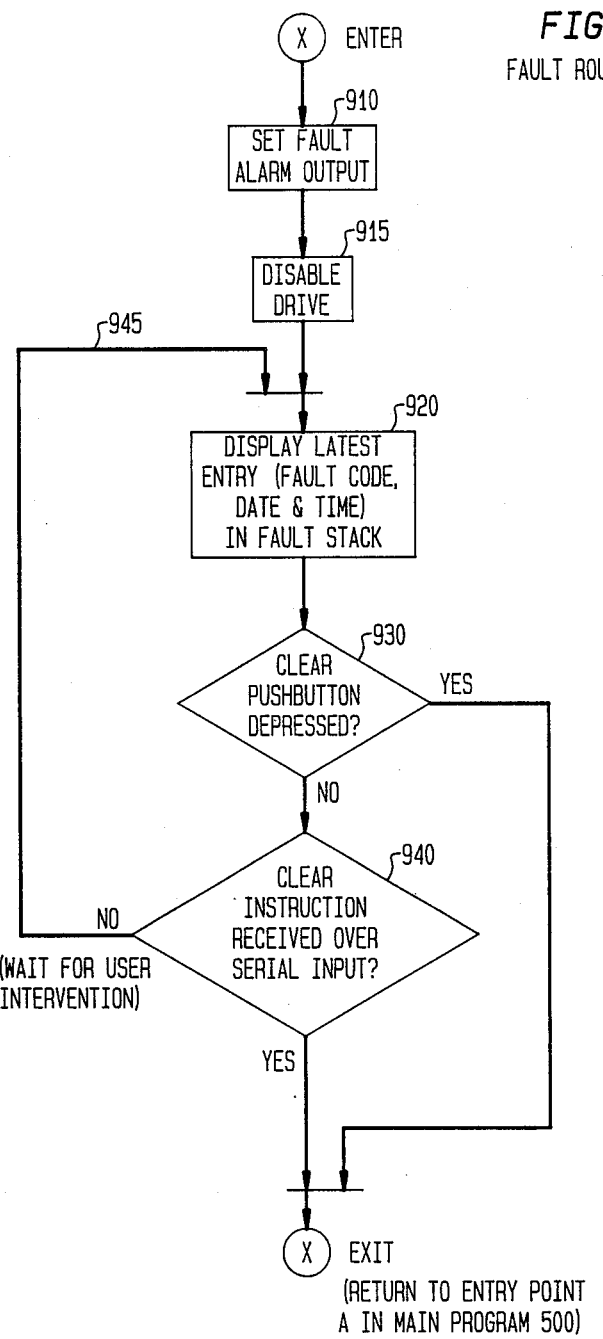

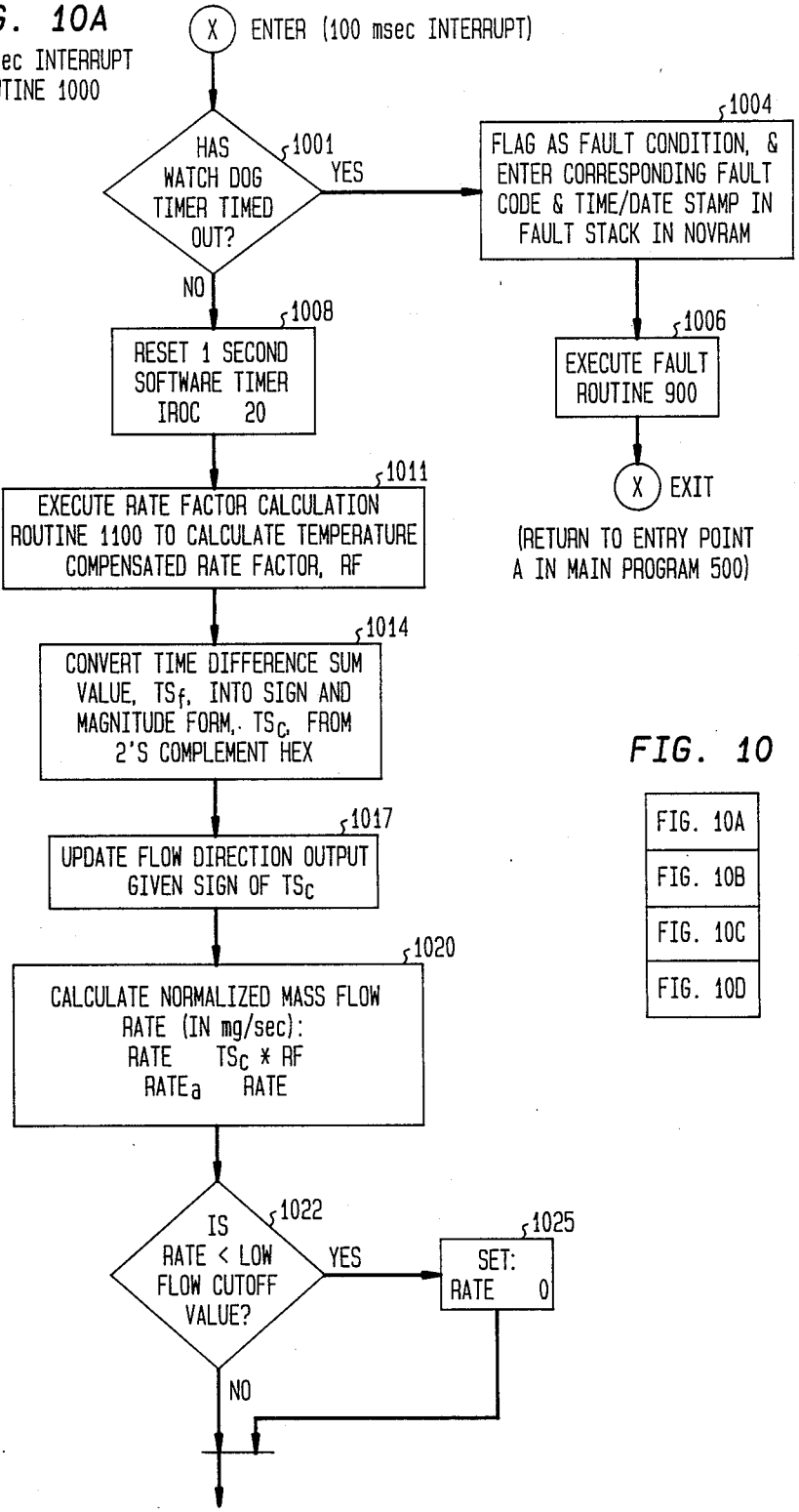

FIG. 12

FILTER ROUTINE 1200

(X) ENTER
↓
1210 ACCESS APPROPRIATE DIGITAL FILTER PARAMETERS ($T_1$ & $T_2$) FOR TIME DIFFERENCE OR TEMPERATURE MEASUREMENT DEPENDING UPON INPUT VARIABLE ($T_{sum}$ OR $T_{a/d}$) TO BE FILTERED
↓
1220 SET:
D ← VALUE OF INPUT VARIABLE ($T_{sum}$ OR $T_{a/d}$)
↓
1230 CALCULATE:
D ← D − $T_1$
↓
1240 READ VALUE OF FILTER TIME CONSTANT, TC, FROM NOVRAM
↓
1250 CALCULATE:

$$T_1 \leftarrow T_1 + \frac{D}{2^{TC}}$$

$$T_2 \leftarrow T_2 + \frac{(T_1 - T_2)}{2^{TC}}$$

↓
1260 STORE VALUES OF FILTER PARAMETERS ($T_1$ & $T_2$) IN NOVRAM FOR SUBSEQUENT USE
↓
1270 SET:
FILTER OUTPUT VARIABLE ← $T_2$ ($T_f$, $T_{Sf}$) IN NOVRAM
↓
(X) EXIT (RETURN)

| FIG. 13A |
| FIG. 13B |

ZERO FLOW OFFSET
ROUTINE 1300

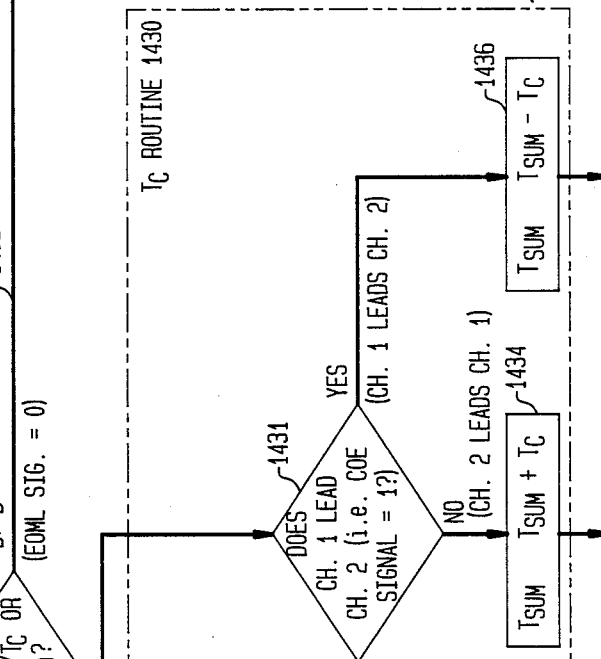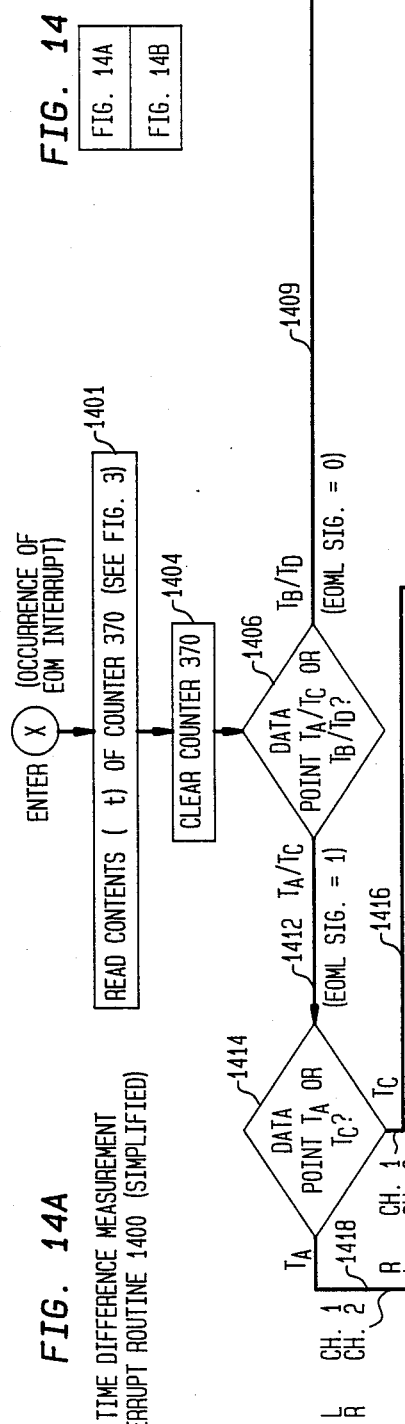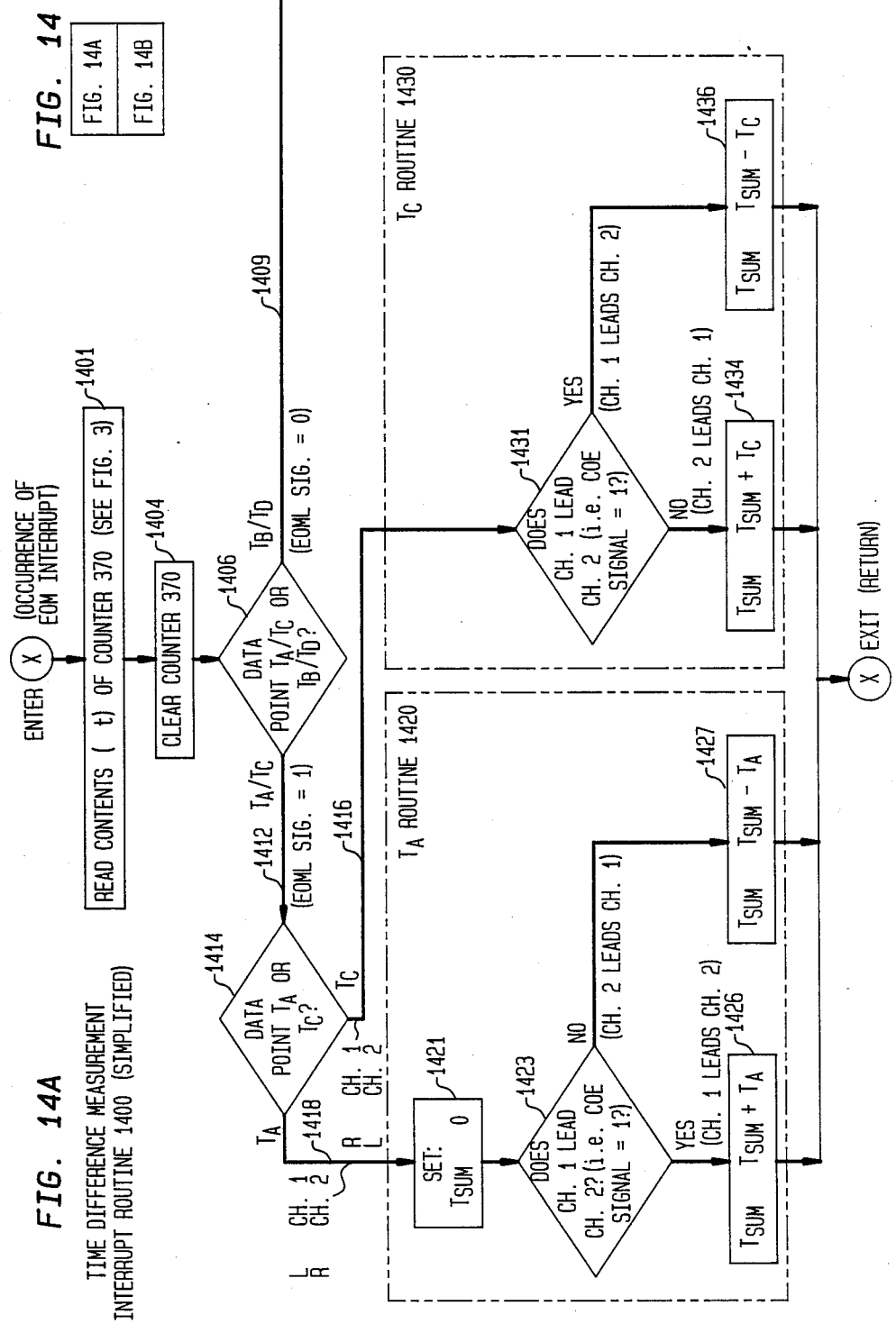
FIG. 14A
TIME DIFFERENCE MEASUREMENT
INTERRUPT ROUTINE 1400 (SIMPLIFIED)

TIME DIFFERENCE MEASUREMENT
INTERRUPT ROUTINE 1400 (DETAILED)

CUSTODY TRANSFER METER

CROSS REFERENCE TO RELATED APPLICATION

This application is a division of our copending patent application Ser. No. 06/915,345; filed on: Oct. 3, 1986 and entitled "CUSTODY TRANSFER METER".

BACKGROUND OF THE INVENTION

1. Field of the Invention

The present invention relates to both apparatus for a custody transfer metering system that utilizes a Coriolis mass flow rate meter and provides accurate totalized mass flow measurements and substantial fault detection capability, and various methods for use therein.

2. Description of the Prior Art

Frequently, whenever a product is being transferred in bulk between two parties, such as in a custody transfer, both parties measure the product to ensure that the proper amount is being transferred and that none of the product has been lost in transit between the parties.

For example, if a rail tank car or container ship load of a liquid commodity, such as oil, is being transferred between two parties, the oil is first passed through a meter, typically a volumetric totalizing flow meter, located at a loading station to ensure that the tank car is filled with the correct amount of oil. After the tank car or ship has reached its destination, the oil is pumped therefrom and then passed through a second flow meter, generally another volumetric totalizing meter, to measure the quantity of oil being received. The total produced by the second flow meter is then compared against the amount of oil that has been shipped to detect any loss that occurred in transit and/or in loading. Similar custody transfers occur when oil or another fluid is moved through a pipeline between two points.

Unfortunately, the density of many products varies with temperature. Inasmuch as the mass of a substance always remains constant, the volume of the substance will vary inversely with temperature. Therefore, temperature variations will disadvantageously cause discrepancies to occur between the totalized volumetric readings taken from both flow meters. In recognition of this, the temperature and density of the product is measured at both the origin and destination points and the totalized volumetric readings are appropriately converted at both points into totalized mass readings. Frequently, this conversion is performed manually using tabulated data. Alternatively, sufficient capability is often incorporated into the flow meters to automatically measure temperature and density of the product and thereafter perform the required conversion to provide mass readings. Unfortunately, this conversion, whether performed manually or automatically, is rather inaccurate and often injects error into the mass readings. Therefore, the art has turned to meters that measure mass directly.

Unfortunately, many commercially available mass flow meters process incoming signals using analog circuitry. Unfortunately, analog circuit components are susceptible to offsets. Moreover, electrical characteristics of these components often change due to drift, aging and temperature variations. As such, all of these factors disadvantageously inject a unacceptable degree of long term inaccuracy and instability into the performance of the flow meter.

Furthermore, various government agencies in many countries, such as PTB located in the Federal Republic of Germany, strictly regulate the performance of metering devices that are used for custody transfers occurring within that country. These regulations not only govern accuracy of the device, but also govern access and importantly fault detection. To obtain government approval, such a metering device must first exhibit a certain minimum accuracy. Second, such devices must be substantially tamper-proof and thereby frustrate attempts made by unauthorized persons to gain access to the device in order to change a metered reading and/or a totalized quantity. Third, the metering device must possess the capability to detect faults that might occur in its performance, stop totalizing at the occurrence of the fault and thereafter provide an indication to the user that a fault has occurred. In this manner, the user is alerted to ignore the reading. In fact, the German agency PTB, requires that such a meter must be able to detect at least 95% of the possible single faults that could occur before the meter can be approved for use in custody transfer applications in the Federal Republic of Germany. While many presently available commercial flow meters possess requisite accuracy and are sufficiently tamper-proof, they do not detect single faults at all. Once a fault occurs, these meters simply ignore the fault and continue to totalize until someone happens to subsequently discover that the meter is operating erroneously and then takes the meter out of service. Other commercially available flow meters that do possess fault detection are generally incapable of detecting single faults to the 95% fault level. Consequently, to the extent that any commercially available flow meter is unable to detect a single fault or can not do so to the 95% level, then such a meter simply could not be used in custody transfer applications, particularly in the Federal Republic of Germany.

Therefore, a need exists in the art for a highly accurate and stable custody transfer metering system that provides direct mass flow measurements and is also substantially tamper-proof and has substantial single fault detection capability.

SUMMARY OF THE INVENTION

Accordingly, an object of the present invention is to provide a custody transfer metering system that is highly accurate.

Another object is to provide such a system that is highly stable inasmuch as its performance is substantially unaffected by circuit offsets.

A specific object is to provide such a system in which its performance is substantially unaffected by drift, aging and temperature variations.

An additionl object is to provide such a system that is substantially tamper-proof.

An additional object is to provide such a system that has fault detection capability.

Lastly, a specific object is to provide such a system that can detect at least 95% of its possible single operational faults.

These and other objects are achieved in accordance with the principles of the present invention by a metering system which illustratively utilizes a dual tube Coriolis mass flow rate meter and provides accurate totalized mass flow measurements and fault detection capability. Specifically, this system senses time differences occurring in the movement of both flow tubes. Four such time difference measurements are taken and combined in a pre-defined manner so as to eliminate differences appearing in the electrical characteristics of analog circuitry connected to each of two sensors used to detect tube movement and thereby to advantageously increase measurement accuracy. Mass flow rate of the fluid passing through the meter is determined, as a function of the combined time measurements, in terms of normalized mass and time units and thereafter converted into user specified mass units/unit time. The resulting converted value is used to compute totalized mass flow and to set and/or update various system outputs. Thereafter, the converted value is multiplied by an appropriate time factor to provide mass flow rate in terms of user specified mass and time units. By use of normalized calculations, processing time is advantageously saved and the number of unit conversions is advantageously reduced which, in turn, increases system accuracy. A sequence of diagnostic tests is continually performed to detect a variety of fault conditions and appropriately alert the user and inhibit further totalization.

In accordance with a specific embodiment of the invention, a time difference measurement circuit measures the time interval occurring between corresponding zero crossings in left and right tube velocity signals. The time difference is substantially proportional to the Coriolis forces imparted to the flow tubes by the mass flow rate of the fluid passing therethrough. Each velocity signal is applied through an input switch to a respective input channel of the time difference measurement circuit. Four such time differences are obtained with the setting of the switch being reversed after every two successive measurements.

This measurement circuit is connected to a microprocessor system, which executes two interrupt routines: a time difference measurement interrupt routine and a 100 msec interrupt routine. The time difference interrupt routine, when executed, obtains each time difference measurement and appropriately sums four successive measurements so as to cancel any differences in electrical characteristics in the analog circuitry that forms each input channel.

The 100 msec interrupt routine, which executes every 100 milliseconds, multiplies the value of the sum by an appropriate pre-defined rate factor to yield a mass flow rate value that is normalized in both mass and time units. The rate factor is determined as a linear function of the meter factor, the value of which depends upon the size of the Coriolis meter then being used, and the value of a temperature compensated mass flow tube spring constant. Once the normalized mass flow rate has been calculated, its value is compared against a zero flow cutoff value and, if less than zero, the normalized rate value is then set to zero. Thereafter, this normalized mass flow rate value is used to determine the existence of various alarm conditions and set various outputs, such as frequency and scaled pulse outputs. In addition, the normalized mass flow rate value is then converted into units of user mass units per second. The appropriate conversion factor depends upon the output mass units selected by the user. The resulting converted value is then totalized to provide totalized mass flow information. Once totalization has been completed, the converted mass flow rate is then converted into appropriate time units that have been selected by the user. Advantageously, a significant amount of processing time is saved by totalizing and setting various outputs using normalized quantities.

In accordance with a feature of the invention, the microprocessor system can be connected to form a metering network. In particular, each metering system contains an RS-485 serial interface. As such, several separate metering systems can be networked through their respective RS-485 interfaces to a common two wire differential line (such as a twisted pair) which is, in turn, connected through a respective RS-485 interface to a processor located within a host computer. As a result, the host computer can appropriately configure each metering system by, for example, setting various scaling and measurement parameters, and can also receive measurement data from each metering system. In this manner, the host computer can remotely control and monitor all the metering systems that form the network.

BRIEF DESCRIPTION OF THE DRAWING

The teachings of the present invention may be clearly understood by considering the following detailed description in conjunction with the accompanying drawing, in which:

FIG. 3B depicts waveforms of various signals that occur in time difference measurement circuit 30 shown in FIG. 3A;

FIG. 5 shows the proper alignment of the drawing sheets for FIGS. 5A-5D;

FIGS. 5A-5D collectively depict a flowchart of Main Program 500 executed by microprocessor 205 located within meter electronics 20 shown in FIG. 2;

FIG. 6 shows the proper alignment of the drawing sheets for FIGS. 6A-6B;

FIGS. 6A-6B collectively depict a flowchart of Menu Routine 600 that is executed as part of main program 500 shown in FIGS. 5A-5D;

FIG. 7 shows the proper alignment of the drawing sheets for FIGS. 7A and 7B;

FIGS. 7A and 7B collectively depict a flowchart of Scaling Parameter Input Routine 700 that is executed as part of menu routine 600 shown in FIGS. 6A-6B;

FIG. 8 depicts a flowchart of Serial Parameter Input Routine 800 that is also executed as part of menu routine 600 shown in FIGS. 6A-6B;

FIG. 9 shows a flowchart of Fault Routine 900;

FIG. 10 shows the proper alignment of the drawing sheets for FIGS. 10A-10D;

FIGS. 10A-10D collectively depict a flowchart of 100 msec Interrupt Routine 1000;

FIG. 12 depicts a flowchart of Filter Routine 1200 that is executed as part of rate factor calculation routine 1100 shown in FIG. 11 and as part of time difference measurement interrupt routine 1400 shown in FIGS. 14A and 14B and in FIGS. 15A-15E;

FIG. 14 shows the proper alignment of the drawing sheets for FIGS. 14A and 14B;

FIGS. 14A and 14B collectively depict a simplified flowchart of the Time Difference Measurement Interrupt Routine;

FIG. 15 shows the proper alignment of the drawing sheets for FIGS. 15A–15E;

To facilitate understanding, identical reference numerals have been used to denote identical elements common to the figures.

DETAILED DESCRIPTION

A. Hardware Description

Figure 1:
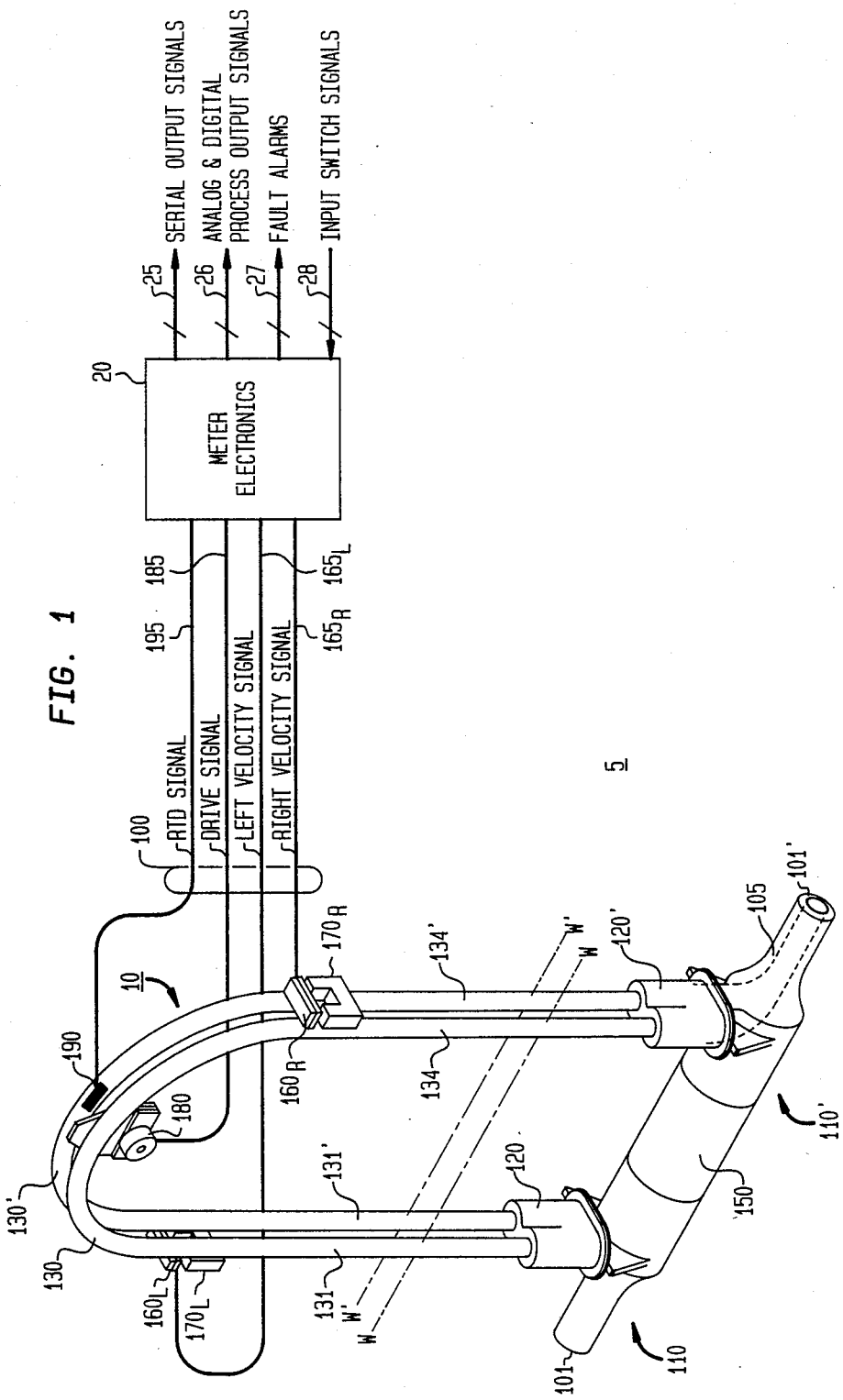
FIG. 1 depicts an overall diagram of custody transfer metering system 5 which embodies the teachings of the present invention.

FIG. 1 shows an overall diagram of a custody transfer metering system 5 that embodies the teachings of the present invention.

1. Overall System Description

As shown, system 5 consists of two basic components: Coriolis meter assembly 10 and meter electronics 20. Meter assembly 10 measures the mass flow rate of a fluid product being transferred. This fluid can be all liquid or an emulsion. Meter electronics 20, connected to meter assembly 10 via leads 100, provides mass flow rate and totalized mass flow information. For custody transfer applications, totalized flow information is provided through two separate totals: a user resettable flow total and a generally non-resettable inventory flow total (which can only be reset under very limited conditions, as set forth in detail below). Both totals and the mass flow rate information are visually displayed by meter electronics 20 and are also available in serial form, over leads 25. Mass flow rate information is also provided over leads 26 in frequency form and in scaled pulse form. In addition, mass flow rate information is also provided in analog form (selectable V/I form) over leads 26, for easy connection to downstream process control and/or measurement equipment. Furthermore, the inventive system continually performs diagnostic operations to advantageously permit it to detect in excess of 95% of the permissible single faults that could occur during its operation. To indicate a fault condition, contact closures are provided on leads 27 for connection to an appropriate alarm. User input (for example, to select measurement units) is provided through various input switches which are connected through leads 28 to meter electronics 20.

2. Coriolis Meter Assembly 10

Specifically, as shown, Coriolis meter assembly 10 includes a pair of manifolds 110 and 110'; tubular member 150; a pair of parallel flow tubes 130 and 130'; drive mechanism 180; a pair of velocity sensing coils $160_L$ and $160_R$; and a pair of permanent magnets $170_L$ and $170_R$. Tubes 130 and 130' are substantially U-shaped and have their ends attached to tube mounting blocks 120 and 120', which are in turn secured to respective manifolds 110 and 110'. Both flow tubes are free of pressure sensitive joints.

With the side legs of tubes 130 and 130' fixedly attached to tube mounting blocks 120 and 120' and these blocks, in turn, fixedly attached to manifolds 110 and 110', as shown in FIG. 1, a continuous closed fluid path is provided through Coriolis meter assembly 10. Specifically, when meter 10 is connected, via inlet end 101 and outlet end 101', into a conduit system (not shown) which carries the fluid that is being measured, fluid enters the meter through an orifice in inlet end 101 of manifold 110 and is conducted through a passageway therein having a gradually changing cross-section to tube mounting block 120. There, the fluid is divided and routed through flow tubes 130 and 130'. Upon exiting flow tubes 130 and 130', the fluid is recombined in a single stream within tube mounting block 120' and is thereafter routed to manifold 110'. Within manifold 110', the fluid flows through a passageway having a similar gradually changing cross-section to that of manifold 110—as shown by dotted lines 105—to an orifice in outlet end 101'. At end 101' the fluid reenters the conduit system. Tubular member 150 does not conduct any fluid. Instead, this member serves to axially align manifolds 110 and 110' and maintain the spacing therebetween by a pre-determined amount so that these manifolds will readily receive mounting blocks 120 and 120' and flow tubes 130 and 130'.

U-shaped flow tubes 130 and 130' are selected and mounted so as to have substantially the same moments of inertia and spring constants about bending axes W-W and W'-W', respectively. These bending axes are perpendicularly oriented to the side legs of the U-shaped flow tubes and are located near respective tube mounting blocks 120 and 120'. The U-shaped flow tubes extend outwardly from the mounting blocks in an essentially parallel fashion and have substantially equal moments of inertia and equal spring constants about their respective bending axes. Inasmuch as the spring constant of the tubes changes with temperature, resistive temperature detector (RTD) 190 (typically a platinum RTD device) is mounted to one of the flow tubes, here tube 130', to continuously measure the temperature of the tube. The temperature of the tube and hence the voltage appearing across the RTD, for a given current passing therethrough, will be governed by the temperature of the fluid passing through the flow tube. The temperature dependent voltage appearing across the RTD is used, as discussed in detail later, by meter electronics 20 to appropriately compensate the value of the spring constant for any changes in tube temperature. The RTD is connected to meter electronics 20 by lead 195.

Figure 4:
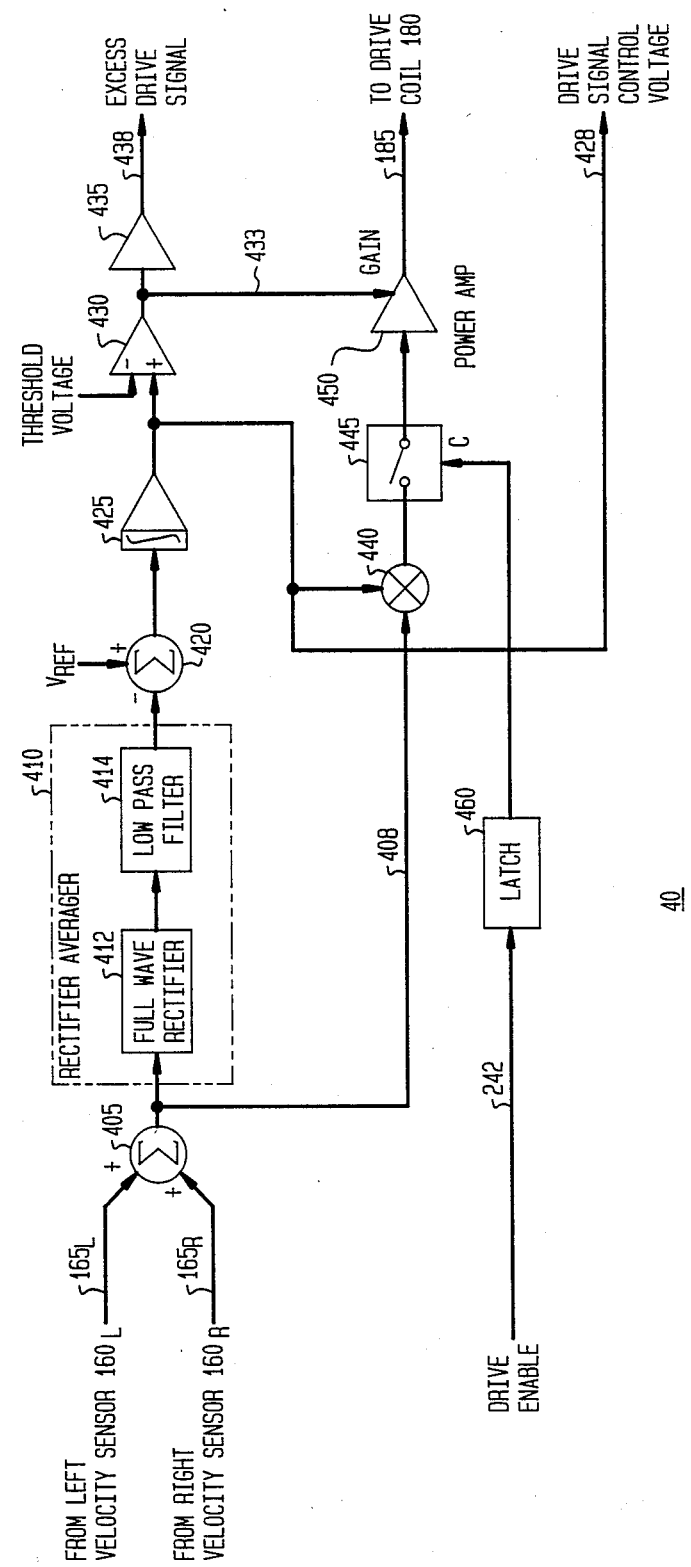
FIG. 4 depicts a block diagram of Drive Circuit 40, also shown in FIG. 2.

Both of these flow tubes are sinusoidally driven in opposite directions about their respective bending axes and at essentially their common resonant frequency. In this manner, both flow tubes will vibrate in the same manner as do the tines of a tuning fork. Drive mechanism 180 supplies the sinusoidal oscillatory driving forces to tubes 130 and 130'. This drive mechanism can consist of any one of many well known arrangements, such as a magnet and a coil through which an alternating current is passed, for sinusoidally vibrating both flow tubes at a common frequency. A suitable oscillatory drive signal, as discussed in detail below in conjunction with FIG. 4, is applied by meter electronics 20, via lead 185, to drive mechanism 180.

As long as fluid flows through both tubes while these tubes are sinusoidally driven in opposite directions, Coriolis forces will be generated along adjacent side legs of each of flow tubes 130 and 130' but in opposite directions, i.e. the Coriolis force generated in side leg 131 will oppose that generated in side leg 131'. This phenomenon occurs because although the fluid flows through the flow tubes in essentially the same parallel direction, the angular velocity vectors for the oscillating flow tubes are situated in opposite though essentially parallel directions. Accordingly, during one-half of the oscillation cycle of both flow tubes, side legs 131 and 131' will be twisted closer together than the minimum distance occurring between these legs produced by just the oscillatory movement of the tubes generated by drive mechanism 180. During the next half-cycle, the generated Coriolis forces will twist the side legs 131 and 131' further apart than the maximum distance occurring between these legs produced by just the oscillatory movement of the tubes generated by drive mechanism 180.

During oscillation of the flow tubes, the adjacent side legs, which are forced closer together than their counterpart side legs, will reach the end point of their travel, where their velocity crosses zero, before their counterparts do. The time interval which elapses from the instant one pair of adjacent side legs reaches their end point of travel to the instant the counterpart pair of side legs, i.e. those forced further apart, reach their respective end point is proportional to the total mass flow rate of the fluid flowing through meter assembly 10. This time interval is readily measured, as discussed in detail below, by measuring the time interval that occurs between corresponding zero crossings in both the left and right velocity signals. The reader is referred to the U.S. Pat. No. 4,491,025 (issued to J. E. Smith et. al. on Jan. 1, 1985) for a far more detailed discussion of the principles of operation of parallel path Coriolis flow meters than that just presented and, specifically, for the teaching that the mass flow rate can be determined from time interval measurements.

To measure the time interval occurring between passage of the flow tube side-legs through their respective end points of travel, coils $160_L$ and $160_R$ are attached to either one of tubes 130 and 130' near their free ends, and permanent magnets $170_L$ and $170_R$ are also attached near the free ends of the other one of the tubes. Magnets $170_L$ and $170_R$ are disposed so as to have coils $160_L$ and $160_R$ located in the volume of space that surrounds the respective permanent magnets and in which the magnetic flux fields are essentially uniform. With this configuration, the electrical signal outputs generated by coils $160_L$ and $160_R$ provide a velocity profile of the complete travel of the tube and can be processed, as set forth in detail later, to determine the time interval and, in turn, the mass flow rate of the fluid passing through the meter. In particular, coils $160_L$ and $160_R$ produce the left and right velocity signals that appear on leads $165_L$ and $165_R$, respectively. The fact that the end point of travel (where the velocity signal crosses zero) is used as a reference point should not be considered as a limitation. Any predetermined point in the velocity signal can be used as the reference point for measuring the time interval between these two signals.

2. Meter Electronics 20

As noted, meter electronics 20 accepts as input the RTD signal appearing on lead 195, and left and right velocity signals appearing on leads $165_L$ and $165_R$, respectively. Meter electronics 20 also produces, as noted, the sinusoidal drive signal appearing on lead 185. Leads $165_L$, $165_R$, 185 and 195 are collectively referred to as leads 100. The meter electronics, as explained below, processes both the left and right velocity signal and the RTD temperature to determine the mass flow rate and totalized mass flow of the fluid passing through meter assembly 10. This mass flow rate is provided by meter electronics 20 on associated lines within leads 26 in analog form, either user selectable 0–20 mA/4–20 mA or user selectable 0–5/1–5 volt signals, and in serial form over leads 25. Mass flow rate information is provided in frequency form (typically with a maximum range of 0–10 KHz), over an appropriate line within leads 26 for connection to downstream equipment. In addition, scaled pulses (typically with a maximum range of 0–10 Hz) are also provided on another line within leads 26 for connection to a remote mechanical totalizer. Each scaled pulse, as explained in detail later, represents that a known totalized quantity of fluid has passed through meter assembly 10. Totalized flow information (inventory and resettable totals) are also provided in serial form over leads 25. In addition, normally open and normally closed contacts are separately provided over leads 27 for connection to appropriate alarm circuits for indicating the presence and/or absence of a fault condition.

Figure 2:
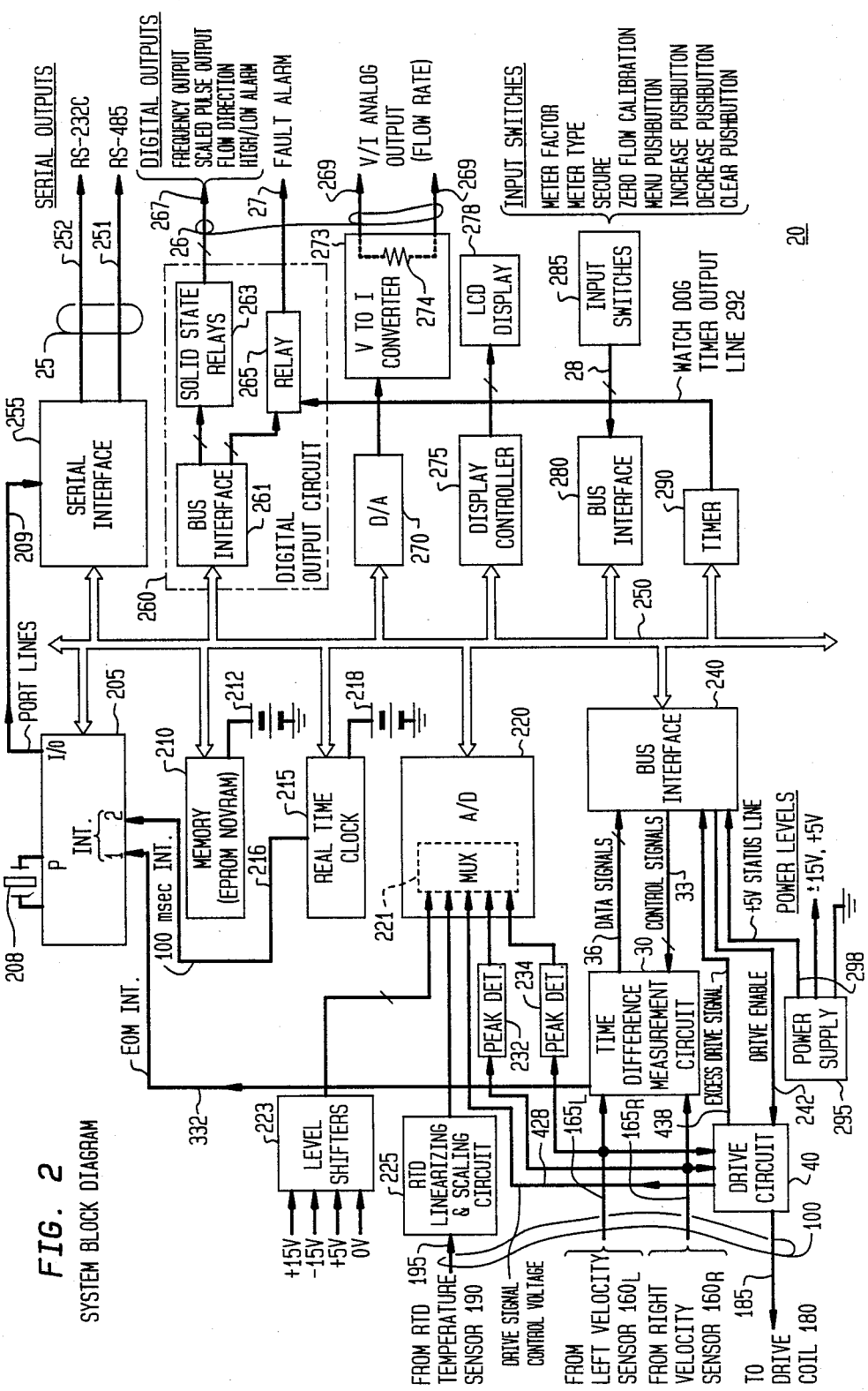
FIG. 2 depicts a block diagram of Meter Electronics 20, shown in FIG. 1.

A block diagram of meter electronics 20 is depicted in FIG. 2. The electronics employs an 8-bit microprocessor based system. The system illustratively contains common bi-directional address and data busses 250 that link 8-bit microprocessor 205, memory 210, real time clock 215, analog-to-digital (A/D) converter 220, bus interface 240, serial interface 255, digital output (D/O) circuit 260, digital-to-analog converter 270, display controller 275, bus interface 280 and timer 290. Appropriate clock signals are generated by microprocessor 205 using crystal 208.

Memory 210 contains non-volatile random access memory (NOVRAM) for temporary data storage and erasable programmable read only memory (EPROM) for program storage. The NOVRAM consists of conventional random access memory (e.g. CMOS random access memory) that is powered through battery 212 in the event of a power outage. Consequently, the NOVRAM is operated in the same manner as conventional random access memory but advantageously retains its contents in the event system power fails. New values, both constants and data, are routinely written into the NOVRAM during program execution.

Real time clock 215, provides time/date information and 100 msec timing pulses. As explained in detail below, the time/date information is read by microprocessor 205 in logging fault data. Specifically, the real time clock applies the time/date information to the data busses that form part of busses 250 upon request of the microprocessor and whenever it detects a fault condition. The 100 msec timing pulses are applied, via line 216, to an interrupt input of microprocessor 205. At the occurrence of each 100 msec timing pulse, microprocessor 205 executes 100 msec interrupt routine 1000, as shown in FIGS. 10A–10D. In essence, this routine calculates the latest value of mass flow rate, updates the flow totals and output values, displays new results and performs various diagnostics. This routine will be fully explained later. In the event of a power failure, real time clock 215 will be powered by battery 218 and therefore will advantageously continue to operate during this time.

Analog input information is provided to the microprocessor through 10 bit A/D converter 220. This converter contains internal multiplexer 221 which is connected to various analog inputs: the outputs of level shifters 223, the output of RTD linearizing and scaling circuit 225, DRIVE SIGNAL CONTROL VOLTAGE produced by drive circuit 40 and appearing on lead 428, and outputs of peak detectors 232 and 234. Under control of the microprocessor, A/D converter 220 selects one of these analog inputs, through multiplexer 221, samples the selected input, converts the value of that input to an equivalent digital form and thereafter applies the resulting digital value to the data bus that forms part of busses 250.

Level shifters 223, consisting of four individual level shifters, shift the level of each of the power supply voltages (e.g. ±15 V, +5 V and 0 V) to an appropriate analog value located within the input range of A/D converter 220. These shifted values are then periodically tested by the microprocessor, as part of the diagnostics routinely executed by the inventive metering system. In the event any of these levels is outside of a pre-defined range, then the microprocessor signifies such as a fault condition.

Tube temperature information is provided to A/D 220 through RTD linearizing and scaling circuit 225. In particular, RTD 190 is connected, via lead 195, to an input of circuit 225. Inasmuch as the voltage appearing across the RTD varies non-linearly with temperature, circuit 225 linearizes the voltage, in a well known fashion, and thereafter scales it by a pre-determined constant to yield a resolution of 0.5 degree C./bit (after conversion by A/D 220) and referenced to 0 degrees C. The resulting scaled RTD voltage is applied to an input of A/D converter 220. This voltage is converted and read by the microprocessor every 100 msec during execution of 100 msec interrupt routine 1000, shown in FIGS. 10A-10D and discussed in detail later.

The DRIVE SIGNAL CONTROL VOLTAGE appearing on lead 428 is produced, as an intermediate control signal, by drive circuit 40. The value of this signal is periodically digitized by A/D 220 and tested by microprocessor 205 to determine, for diagnostic purposes, whether the value remains within acceptable bounds. If the value exceeds these bounds, then a fault has occurred, specifically that the velocity sensors are producing insufficiently high voltage—because of a failure in a power amplifier located within the drive circuit itself, a mechanical failure in the tubes themselves or a failure in either of the velocity sensors.

As noted, the voltages appearing at the outputs of peak detectors 232 and 234 are also applied as inputs to A/D converter 220. These detectors repetitively sample the sinusoidal voltages produced by the left and right velocity sensors, appearing over leads $165_L$ and $165_R$, and store the peak values thereof occurring during any cycle. As discussed below, the peak values produced by each detector are continuously digitized by the A/D converter and tested by the microprocessor, during execution of the system diagnostics, to determine whether the voltages produced by both sensors lie within predetermined bounds. If not, then a fault has occurred.

The outputs of left and right velocity sensors $160_L$ and $160_R$, are also applied, via leads $165_L$ and $165_R$, to time difference measurement circuit 30. This circuit, as discussed in detail in conjunction with FIG. 3 and with time difference measurement interrupt routine 1400 shown in FIGS. 15A-15E, measures the time difference occurring between the waveforms produced by both velocity sensors. As noted, the mass flow rate is substantially proportional to this time difference. The time difference measurements and COE information (as discussed below) are provided by circuit 30 as data signals over leads 36. Furthermore, at the conclusion of each time difference measurement, circuit 30 generates a pulse on (end of measurement—EOM) interrupt lead 332. This pulse causes microprocessor 205 to execute Tube Measurement Interrupt Routine 1400 shown in detail in FIGS. 15A-15E and discussed below. In essence, this routine calculates the sum of four time difference measurements, digitally filters the resultant sum, subtracts the zero flow offset from the sum and executes various diagnostics. The filtered sum is subsequently used by 100 msec interrupt routine 1000 to update the mass flow rate. In addition, various control signals, appearing over leads 33, are applied to time difference measurement circuit 30, as discussed below in conjunction with FIG. 3, to control its operation.

Drive circuit 40, as discussed in detail with FIG. 4, utilizes the left and right velocity sensor signals to produce a sinusoidal voltage that is applied, via lead 185, as the drive signal to drive coil 180. The drive circuit is essentially an integral controller that produces a drive signal that is in phase with the sum of the left and right velocity sensor waveforms. The drive circuit also produces an EXCESS DRIVE control signal appearing on lead 438. This signal is high whenever the value of the drive signal is substantially increased, such as for example during initial excitation of the flow tubes during power-up, and is continually monitored for diagnostic purposes by microprocessor 205. The microprocessor can also disable the drive signal applied to drive coil 180 by applying a low level to DRIVE ENABLE signal appearing on lead 242. This occurs both during system initialization and during a fault condition.

Power supply 295 generates the necessary power levels used by the inventive system, namely ±15 and +5 volts. In addition, the power supply provides a +5 V STATUS signal over lead 298. This signal represents the status of the +5 volt supply and will fall from a high to a low level approximately 4-5 msec before the +5 volt supply level collapses. This signal is continuously tested by microprocessor 205 as part of the system diagnostics.

Bus interface 240 provides a bi-directional interface, via busses 250, between microprocessor 205 and the data signals appearing over leads 36, the control signals appearing over leads 33, the EXCESS DRIVE signal appearing on lead 438, the DRIVE ENABLE signal appearing on lead 242 and the +5 VOLT STATUS signal appearing on lead 298. Through this interface, the microprocessor can selectively detect or establish the level of each of these signals, as appropriate.

Figure 16:
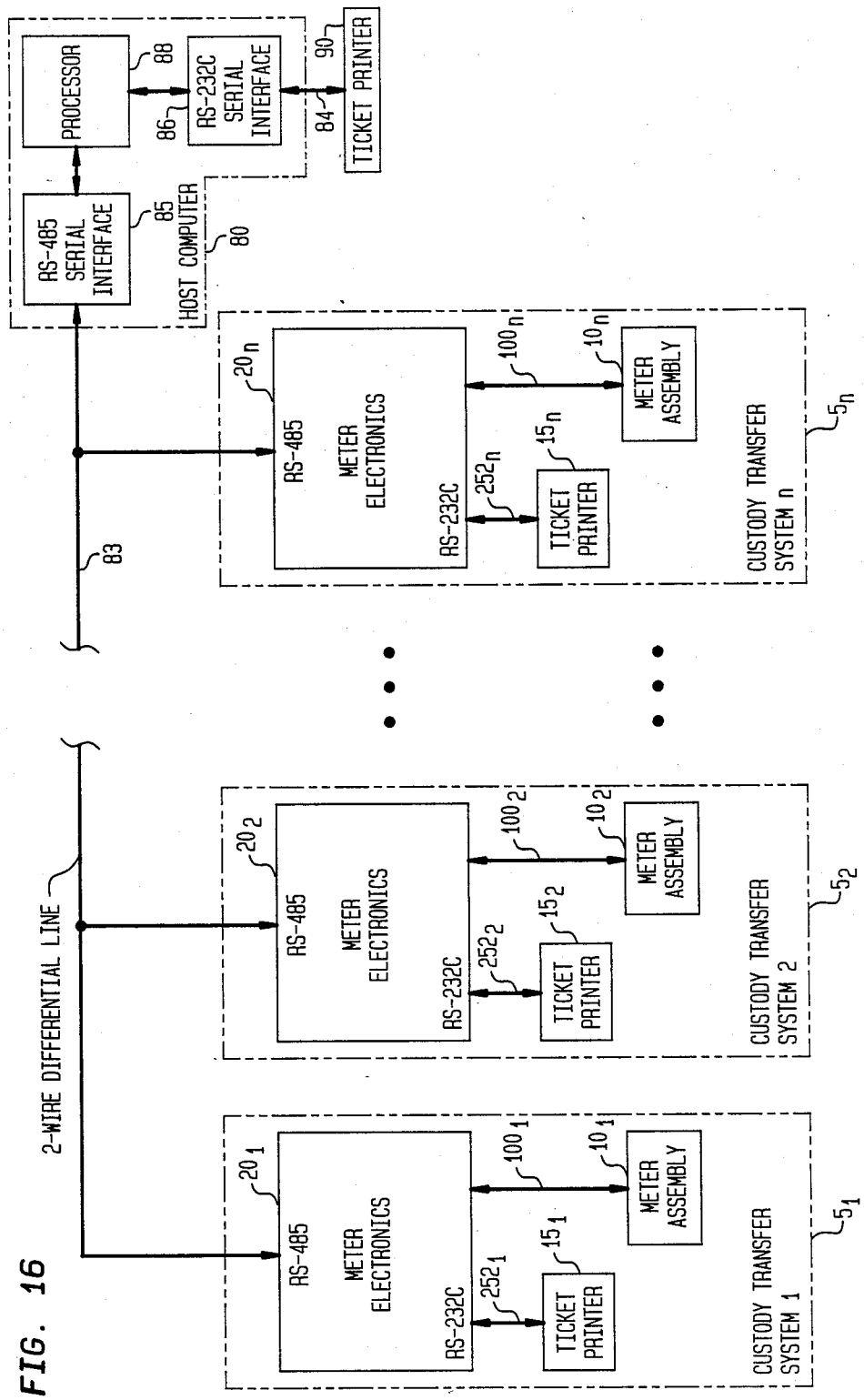
FIG. 16 shows a network of several inventive custody transfer systems all interconnected to a host processor.

Serial interface 255 provides serial communication, over leads 25, between the microprocessor and an external device. The mode (RS-232C or RS-485), baud rate (150 baud-19.2 kBaud) and parity (even, odd or none) of the serial interface are all programmed through appropriate instructions received from the microprocessor over busses 250. Once programmed, the serial interface, receives data from the microprocessor, over I/O port lines 209, for subsequent serial transmission. Two alternate two modes of serial communication exist: RS- 232C for communication to a single external device, such as a ticket printer, and RS-485 for interconnection to a network of metering systems and a host computer. As shown in FIG. 16 and discussed in detail below, a ticket printer is connected to leads 252 for RS-232C communication; while a network connection is made to leads 251 for RS-485 communication. The network may advantageously contain a number of separate metering systems all interconnected, through appropriate RS-485 ports, over a common differential line (such as a twisted pair) to a host computer that can obtain data from each metering system while simultaneously controlling the operation of that system.

Digital output circuit 260 provides various digital output signals. Specifically, the frequency output, the scaled pulse output, flow direction and high/low alarms are provided, over leads 267, through solid state relays 263. Normally open and normally closed mechanical fault alarm contacts are provided by mechanical relay 265 over leads 27. The normally closed contacts are used to indicate a fault condition. The solid state relays and the mechanical relay are selectively energized by microprocessor 205 through bus interface 261. In addition, relay 265 can also be disabled, to indicate a fault condition, by an appropriate signal appearing over lead 292 from (watch-dog) timer 290. This signal occurs in the event this timer reaches the end of its timing interval (i.e. it times out).

Analog V/I output signals are provided by D/A converter 270 and voltage-to-current converter 273. Incoming digital information is provided to the D/A converter through busses 250 and is thereafter converted into an equivalent analog form. The resulting voltage is converted into a current signal by converter 273. Microprocessor 205 can be instructed by the user to set the maximum range of this current signal to either 0–20 mA or 4–20 mA. An appropriate resistor, such as resistor 274, can be inserted between the outputs of this converter, which are preferably isolated and appear on leads 269, in order to change the output current signal into a voltage signal having a corresponding range of 0–5 volts or 1–5 volts.

Display 278, typically a well known liquid crystal display (LED), displays various output information such as mass flow rate and totalized mass flow. The displayed mass flow rate and totalized mass flow information is updated every 100 milliseconds by microprocessor 205. The user can select other information to be displayed (such as illustratively high/low alarm limits, current output units, low flow cutoff value and input filter time constant) through operation of menu routine 600, as shown in FIG. 6 and discussed in detail below. At these times, new data is placed on the data bus, that forms part of busses 250, by the microprocessor and is thereafter loaded into display controller 275 which, in turn, controls the operation of displays 278.

The user enters information into the metering system through various switches. The state of each of these switches is read by microprocessor 205 through bus interface 280. In particular, certain of these switches are advantageously located on a front panel of the metering system and include: menu pushbutton, increase/decrease pushbuttons and clear pushbutton. The menu pushbutton allows the user to step the system through a pre-defined menu to display various operating parameters and totalized values. The clear pushbutton, when depressed, allows the user to clear the resettable totalized mass flow reading to zero. The remaining switches which include meter factor, meter type, zero flow calibration invoke switch and secure switch (all discussed in detail below) are all located within the enclosure that contains meter electronics 20. To deter tampering, this enclosure is one that preferably provides access only through a single cover which can be sealed closed with a governmental seal. As such, the seal must be broken to gain entry to the internal switches. The secure switch, when placed in an appropriate position (the secure position) and read by the microprocessor, inhibits the user from changing any of the system parameters. In this case, the system will only display the values of these parameters but will not permit the user to change any of them. By placing the secure switch within the enclosure, the system becomes substantially tamper-proof. The increase/decrease switches are used to increase or decrease the values of any system parameter whenever the secure switch is not placed in the secure position.

Timer 290 functions as a watch-dog timer. In particular, this timer is set to provide a pulse after 100 msec elapses but, in normal operation, is reset approximately every 20 msec by execution of tube measurement interrupt routine 1400. In the event this timer reaches the end of its timing cycle before being reset, then a fault has occurred; namely that micro-processor 205 has ceased functioning. In this case, the timer provides a signal over leads 292 which de-energizes fault relay 265 to appropriately indicate this fault condition.

3. Time Difference Measurement Circuit 30

Figure 3A:
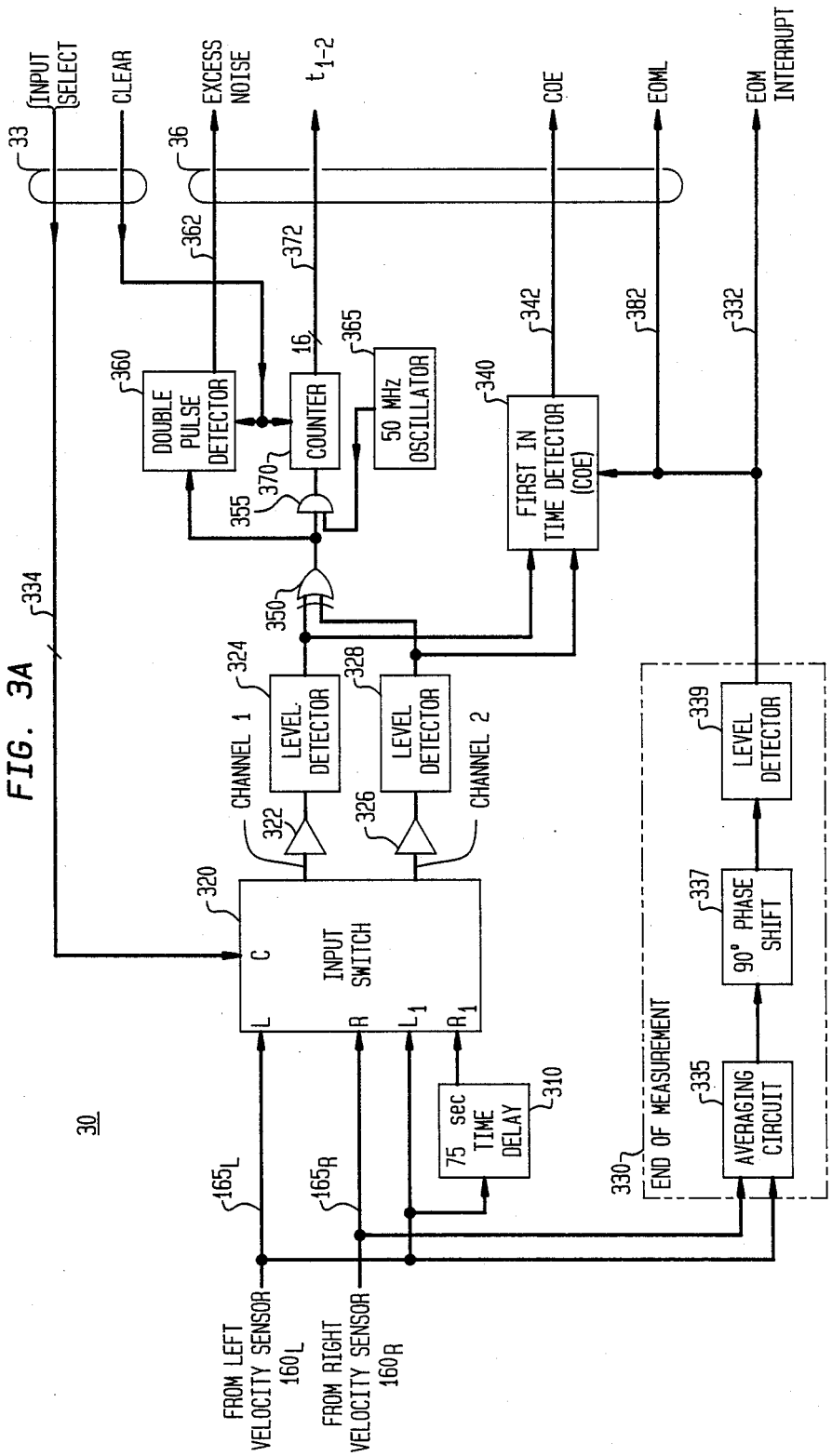
FIG. 3A depicts a block diagram of Time Difference Measurement Circuit 30, shown in FIG. 2.

A block diagram of Time Difference Measurement Circuit 30 is depicted in FIG. 3A. This circuit measures the time difference occurring between the waveforms produced by left and right velocity sensors $160_L$ and $160_R$ and appearing on leads $165_L$ and $165_R$, respectively. As noted, this time difference is substantially proportional to the mass flow rate of the fluid passing through meter assembly 10 (see FIG. 1).

In essence, as shown in FIG. 3A, this circuit consists of two input analog channels each of which is connected through an input switch (generally implemented using FET—field effect transistors—devices) to only one of the velocity sensors, i.e. either the left and right velocity sensor. The sinusoidal outputs of both sensors are alternately switched between the two channels on successive sinusoidal cycles. Four separate time difference measurements are successively taken and appropriately combined either through addition or substraction, by microprocessor 205 during execution of time difference measurement interrupt routine 1400, which is discussed in detail later in conjunction with FIGS. 15A–15E. As a result of this combination, the affects of any differences in the electrical characteristics between the two channels—resulting from various factors such as offsets, aging, drift and/or temperature induced variations in the characteristics of the analog components used in each channel—are advantageously canceled. The resulting combined time difference measurement is also substantially proportional to the mass flow rate of the fluid that is then flowing through the meter assembly. To reduce noise and to increase resolution, the combined value is digitally filtered by microprocessor 205 and thereafter used to determine mass flow rate all during execution of 100 msec interrupt routine 1000 shown in FIGS. 10A–10D and discussed in detail later.

Now, to easily understand the operation of time difference measurement circuit 30, the manner in which this circuit measures a time difference will first be discussed followed by a discussion of the manner in which this circuit cancels inter-channel differences.

To simplify the following discussion, assume for the moment that input switch 320 routes the left and right velocity sensor signals appearing on leads $165_L$ and $165_R$ to an input of buffers 322 and 326, respectively. to measure a time difference between the left and right velocity sensor signals, each sensor signal is applied, through input switch 320, to a channel consisting of amplifier 322 or 326 and a level detector 324 or 328, respectively. The level detectors are both identical. Each level detector produces a high valued output signal whenever its respective input velocity signal increases above a pre-defined threshold level. Preferably, each level detector is a zero crossing detector, inasmuch as zero crossings provide convenient measurement points. Clearly, other reference points can be used in lieu of zero crossings. In any event, the outputs of level detectors 324 and 328 are routed to respective inputs of exclusive OR (EXOR) gate 350. This gate produces a high level (logical one) output whenever the levels applied to its two inputs are different (one input being at logical zero and the other being at logical one). Consequently, the output signal produced by EXOR gate 350 is a pulse train in which the width of each pulse equals the time difference between the outputs of level detectors 324 and 328 and, in turn, the time difference between the signals produced by the left and right velocity sensors. This operation is evident in waveforms A, B and D-F shown in FIG. 3B.

To quantitatively measure this time difference, oscillator 365 produces a stream of 50 MHz timing pulses which are selectively gated, by AND gate 355, into 16 bit counter 350 whenever the output of EXOR gate 350 is high. Hence, whenever a non-zero time interval occurs between corresponding zero crossings in the signals produced by both level detectors, i.e. while the output of $\overline{EXOR}$ gate 350 is high, 50 MHz timing pulses are gated during this time interval through AND gate 355 and counted by counter 370. Use of 50 MHz timing pulses provides sufficient resolution to yield an accurate time difference measurement. The frequency of oscillator 365 can be changed with corresponding changes occurring in the resolution of the time difference measurements. This oscillator is preferably crystal controlled. The 16-bit contents of counter 370 are applied to leads 372. Shortly after the conclusion of one measurement and prior to beginning of the next measurement, end of measurement circuit 330 generates an end of measurement (EOM) signal both on lead 332 and on EMOL signal lead 382. This signal, when applied to the microprocessor, via lead 332, generates an interrupt which, in turn, causes the microprocessor to execute tube measurement interrupt routine 1400 to first read the contents of counter 370 appearing on leads 372 and thereafter, in preparation for the next measurement, to reset counter 370 to zero by applying a clear pulse to the clear lead within leads 33.

End of measurement circuit 330 generates an EOML signal on lead 382 that changes state at approximately ninety degrees after the occurrence of the zero crossings of both velocity signals. The ninety degree point is approximate inasmuch as the EOM circuit first generates a waveform, through averaging circuit 335, that represents the average of both the left and right velocity signals appearing on leads $165_L$ and $165_R$, respectively. The EOML signal (waveform C in FIG. 3B) changes level ninety degrees after each zero crossing in this average signal at times T. Specifically, as shown in FIG. 3A, the average signal is applied as input to ninety degree phase shift circuit 337 and, from there, to an input of zero crossing level detector 339. During normal operation of the flow meter, the time difference between the left and right velocity signals remains quite small (much smaller than that shown in waveforms A and B in FIG. 3B—in which the time difference has been significantly exaggerated for purposes of illustration). Consequently, the zero crossing points in both velocity signals occur within a narrow time interval around the zero crossing point in the average signal. Hence, the zero crossing points in the average signal occurs approximately ninety degrees after corresponding zero crossings in both velocity signals. By generating the EOM pulse ninety degrees after each zero crossing in the average signal, this ensures that the time difference measurement will have been completed well before the first zero crossing in either velocity signal that marks the start of the next time difference measurement. Double pulse detector 360 (generally comprising two D type flip/flops) produces a high level on EXCESS NOISE signal appearing lead 362 in the event two pulses occur in the output of EXOR gate 350 before counter 370 has been reset. In this case, one of these pulses is attributable to a time difference ($T_A$, $T_B$, $T_C$ or $T_D$) occurring between the input velocity signals, as shown in waveform F in FIG. 3B, while the second pulse is a noise pulse. The status of the EXCESS NOISE signal is checked for diagnostic purposes during execution of time difference measurement interrupt routine 1400, as shown in FIGS. 15A–15E and discussed below. Detector 360 is cleared simultaneously with counter 370 by the application of a pulse on the CLEAR line, that forms part of leads 33, by the microprocessor.

Variations between the electrical characteristics (gain, offset, drift, temperature variations and the like) of amplifiers 322 and 326 and level detectors 324 and 328, respectively situated in channels 1 and 2, introduce errors into the time differences measured by counter 370. To eliminate these errors, input switch 320 successively reverses the connections of the velocity sensors between these two channels. The setting of this switch is controlled by the level of appropriate INPUT SELECT signals applied over leads 334. Specifically, in operation, the left and right velocity sensors are connected to amplifiers 322 and 326, respectively, for one complete cycle of the average signal. Thereafter, in response to the rising edge of the EOML signal produced by EOM circuit 330, microprocessor 205 provides appropriate input select signals to leads 334 to reverse the switch setting (i.e. left and right velocity signals appearing on leads $165_L$ and $165_R$ are connected to amplifiers 326 and 322, respectively) for the next sinusoidal cycle of the average signal. As shown in FIG. 3B, two time difference measurements, denoted $T_A$ and $T_B$, are taken during one cycle of the average signal and two different time difference measurements, denoted $T_C$ and $T_D$, are taken during the next successive cycle. These four measurements are then combined, either through addition or subtraction, in a manner discussed below, to cancel any variations in the electrical characteristics occurring between the channels and hence any errors caused thereby in the time difference measurements. This process of obtaining four new time difference measurements and combining these measurements is repeated every two cycles of the average signal.

Now, to better appreciate the error cancelling properties of this circuit, assume fluid is flowing in a positive or normal direction through the meter, i.e. into inlet port 101 shown in FIG. 1. For this condition, consider the following definitions: TR(L) and TR(R) represent the true rise time of squared left and right velocity signals ideally produced by the level detectors 324 and 328; TER(1) and TEF(1) represent timing errors in the respective rise and fall times measured by amplifier 322 and level detector 324; and TER(2) and TEF(2) represent timing errors in the respective rise and fall times measured by amplifier 326 and level detector 328. With these definitions in mind, and with the assumption that these errors are small compared to the time differences produced by the actual flow, the four time differences for positive flow will be given by the following equations:

$$T_A = \text{abs.}([TF(R) + TEF(1)] - [TF(L) + TEF(2)]) \quad (1)$$

$$T_B = \text{abs.}([TR(R) + TER(1)] - [TR(L) + TER(2)]) \quad (2)$$

$$T_C = \text{abs.}([TF(R) + TEF(2)] - [TF(L) + TEF(1)]) \quad (3)$$

$$T_D = \text{abs.}([TR(R) + TER(2)] - [TR(L) + TER(1)]) \quad (4)$$

Additively combining these equations will produce a sum, $T_{SUM}$, in which all the time errors, TER(1), TEF(1), TEF(1) and TEF(2), have cancelled out. Hence, the value of the sum will not be adversely affected by any variations in the electrical characteristics between the two channels. The form of the equation for producing $T_{SUM}$, as implemented by microprocessor 205, is given by:

$$T_{SUM} = \pm T_A \pm T_B \pm T_C \pm T_D \quad (5)$$

First in time detector 340 (a well known sequential logic circuit which is sometimes aptly referred to as the chicken or egg or COE circuit) dictates whether each individual time difference measurement, $T_A$, $T_B$, $T_C$ or $T_D$; is positive or negative, i.e. whether the signal appearing on channel 1 precedes the signal appearing on channel 2, and hence whether the value of each time difference measurement is either added or subtracted to produce the sum, $T_{SUM}$. COE circuit 340 uses the EOML signal as a reference signal and provides a COE signal whose level is dictated by whether the sinusoidal signal applied to channel 1 leads that applied to channel 2. The COE signal appears on lead 342 which forms part of the data signals on leads 36. Using the information provided by the COE signal, time difference measurement interrupt routine 1400 shown in FIGS. 15A-15E and discussed below, properly combines the four individual time difference measurements to produce $T_{SUM}$.

Furthermore, reference signals are periodically injected into both channels as part of the diagnostics executed by the inventive system. These reference signals appear at inputs L1 and R1 of input switch 320 and respectively consist of the left velocity signal appearing on lead 165$_L$ and the same signal that has been delayed 75 usec by the time delay element 310. The time difference measured by the input circuit is then compared by microprocessor 205 (see FIG. 2) against pre-determined minimum and maximum values. In the event the measured time difference lies outside these values, then a fault condition occurs and is appropriately signaled to the user by the microprocessor. The reader is referred to our pending U.S. patent application entitled "Auto Zero Circuit for Flow Meter", Ser. No. 06/903,337; filed Sept. 3, 1986, which is directed to and describes in detail the operation of a time difference measurement circuit that has the same error cancelling property as that discussed above.

4. Drive Circuit 40

FIG. 4 depicts a block diagram of drive circuit 40. As noted, this circuit produces a sinusoidal voltage which is applied to drive coil 180, via lead 185, to keep both flow tubes oscillating at their natural frequency. In essence, as discussed, the drive circuit is essentially an integral controller that produces a drive signal that is in phase with the sum of the left and right velocity sensor waveforms. By operating linearly and producing a sinusoidal drive voltage, drive circuit 40 drives the flow tubes at their natural resonant frequency, thereby introducing minimal harmonic modes.

Specifically, both velocity signals are combined through summer 405 with the resultant sum applied to rectifier averager 410 consisting of full wave rectifier 412 followed by low pass filter 414. The output signal generated by the rectifier averager tracks the average amplitude in the combined rectified velocity signals produced by summer 405. This output signal is then subtracted from a reference signal, $V_{ref}$, by summer 420. The resulting difference is then integrated by integrator 425. This integrator includes appropriate well known compensation circuitry to prevent drive circuit 40 from oscillating. The integrated difference signal is fed to one input of multiplier 440 which multiplies the integrated signal by the amplitude of the combined velocity signals appearing on lead 408 and produced by summer 405. In addition, the output of the integrator is the DRIVE SIGNAL CONTROL VOLTAGE appearing on lead 428. This voltage, as noted previously, is continually tested by the microprocessor during execution of the system diagnostics. Through the use of integral control, and particularly here where the output of the integrator is multiplied by the combined velocity signals, the resulting error signal, which is applied through switch 445 to an input of power amplifier 450, is quite sensitive to any differences between peak value of the combined velocity signals and the reference voltage. In operation, the output of the power amplifier will appropriately change to maintain the peak amplitude of combined velocity signals at the reference level. In the event the combined signals produced by both velocity sensors are too low, indicating that the tubes are not vibrating over a sufficiently large distance, then the power amplifier will increase its peak output to correspondingly increase the peak vibratory amplitude of the flow tubes. Likewise, if the peak vibratory amplitude is too large, then the output of power amplifier 450 will be correspondingly reduced.

Switch 445 is controlled through the DRIVE ENABLE signal applied to lead 242. This signal is applied through latch 460 to the control input of switch 445. Whenever this signal is high, the output of latch 460 is high and switch 445 is closed thereby feeding the error signal produced by multiplier 440 to an input of power amplifier 450. To disable the drive circuit, a low level is applied to lead 242 which causes switch 445 to apply ground potential to the input of power amplifier 450. As a result, power amplifier 450 reduces its output signal to zero which, in turn, allows the flow tubes to cease vibrating.

Whenever the flow tubes are to be initially placed into vibratory motion from a stationary position, the tubes would require approximately 10 seconds for the amplitude of the vibratory motion to reach and stabilize at a desired peak value. To shorten this time period, the output of integrator 425 is applied to one input of comparator 430. A pre-defined threshold voltage is applied to the other input of the comparator. Whenever, the output of the integrator exceeds the threshold voltage, the output of the comparator assume a high level which, in turn, is applied, over lead 433, to the variable gain input of power amplifier 450. This increases the gain of the power amplifier by approximately tenfold. As such, the tube is driven with a much higher amplitude drive signal than under steady state operation, which, in turn, shortens the period for the tubes to stabilize at a desired peak vibratory motion to between 2-3 seconds. To indicate that a high amplitude drive condition is occurring, the output of comparator 430 is also fed to buffer 435 which produces the digital EXCESS DRIVE signal on lead 438. The status of this signal is continually read, as described in detail below, by the microprocessor as part of the system diagnostics.

B. Software Description

The software for the inventive metering system is essentially broken into three components: main program 500 shown in FIGS. 5A-5D, 100 msec interrupt routine shown in FIGS. 10A-10D and time difference measurement interrupt routine 1400 shown in detail in FIGS. 15A-15E.

Main program 500 performs functions related to power-up or recovery from a fault condition, such as initializing the system, executing various system diagnostics, accessing parameters from NOVRAM memory, validating accessed parameters, obtaining user parameters and enabling the drive circuit. In addition, once interrupts are enabled (unmasked), main program 500 continuously executes various system diagnostics whenever neither of the two interrupt service routines (100 msec interrupt routine 1000 and time difference measurement routine 1400) is executing.

When executed, 100 msec interrupt routine 1000 calculates the latest value of mass flow rate, updates the flow totals and output values, displays new results, and performs various diagnostics.

Time difference measurement interrupt routine 1400, when executed, calculates the sum ($T_{SUM}$) of the four time difference measurements ($T_A$, $T_B$, $T_C$ and $T_D$) provided through time difference measurement circuit 30 (as discussed above), digitally filters the resultant sum, subtracts the zero flow offset from the filtered sum and executes various diagnostics. The resulting time difference sum value, $TS_f$, is subsequently used by 100 msec interrupt routine 1000 to update the mass flow rate.

1. Main Program 500

Figure 5C:
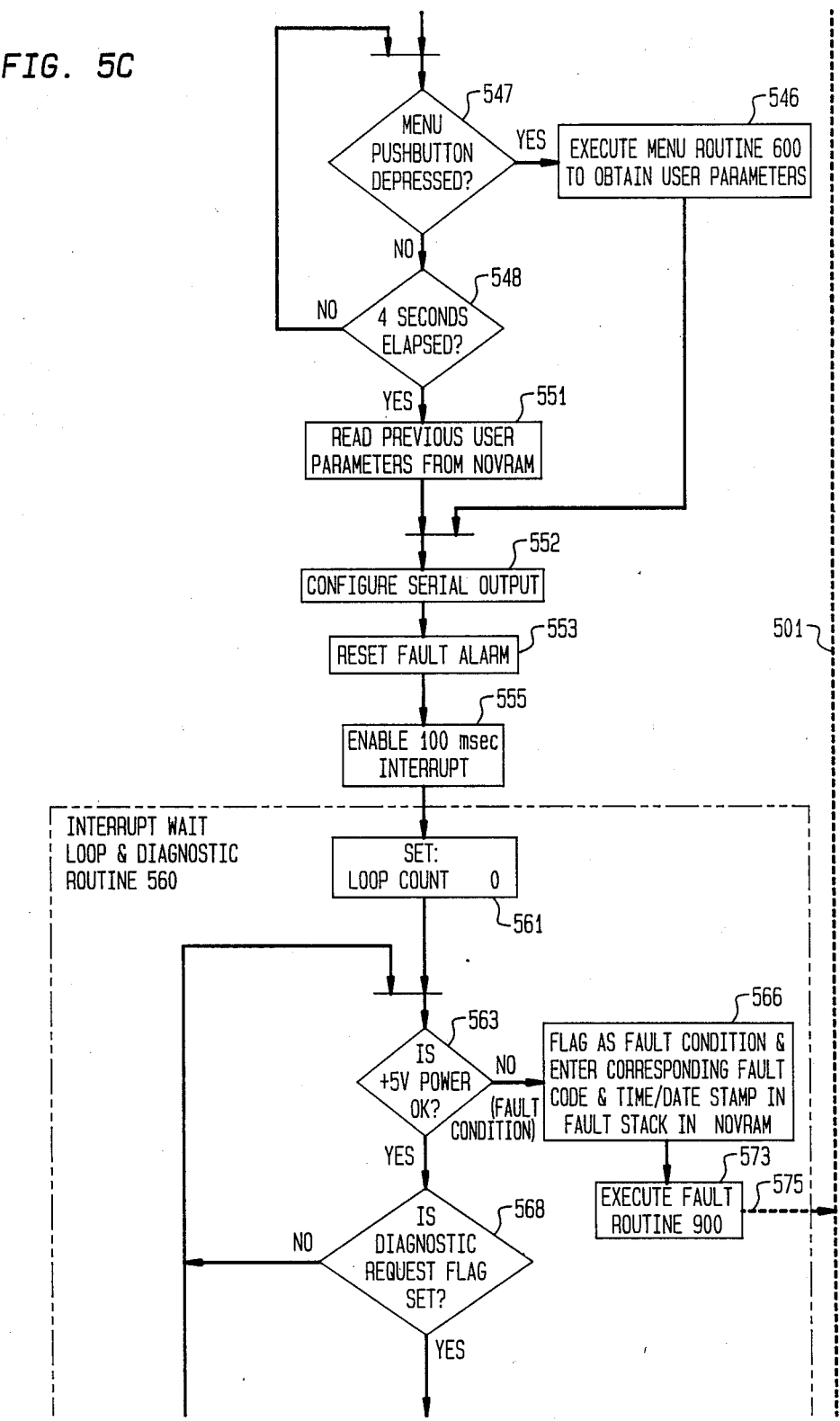

A flowchart of main program 500 is shown in FIGS. 5A-5D with the correct alignment of the drawing sheets for these figures being shown in FIG. 5.

As shown, upon a power on reset condition or recovery from a fault condition through path 501 (as discussed below), execution is first routed to block 502. This block initializes the system by setting various temporary memory locations (such as those used for the digital filter) to zero and also disables the drive circuit. In addition, this block also configures the microprocessor by first enabling it to read from EPROM memory and second establishing a software map which maps all the other bus devices (such as A/D converter 220 and real time clock 215) into appropriate NOVRAM memory locations. At this point, the fault alarm is set inasmuch as relay 265 (see FIG. 2) has not been energized to open its normally closed contact and de-energize the fault alarm. Next, block 503 is executed which resets the LCD display and thereafter causes an initial message, such as "INITIALIZING", to be displayed.

Execution then proceeds to block 504 which performs various diagnostics. These diagnostics include a display test, a check of the power supply levels, an EPROM test (typically a read checksum test), microprocessor RAM tests and an A/D test. During the A/D test, the microprocessor selects ground as the input signal to the A/D converter and measures both the conversion time, using a software timing loop, and the digitized output voltage. If the conversion time is too long or the digitized voltage exceeds a certain predefined noise value, then a fault condition occurs. In fact, if any of these diagnostics fail as indicated by decision block 505, then a fault condition occurs and execution proceeds, via the YES path from this decision block to block 506. This latter block, when executed, displays a code on the LCD display that corresponds to the particular fault that has occurred. In addition, the time/date and fault code are stored in a 25 level (last in first out) fault stack situated in NOVRAM memory for subsequent retrieval and analysis. Thereafter, execution proceeds to block 507 which executes fault routine 900, which will be discussed below. Once the user intervenes to reset the system (i.e. clear the fault), execution returns to block 502 (entry point A) via paths 508 and 501. Alternatively, if all the diagnostics are satisfactorily completed, then execution proceeds via the NO path from decision block 505 to block 509. This latter block, when executed, retrieves various system parameters (such as alarm limit values and the time constant of the input digital filter all as discussed in detail below) from NOVRAM.

At this point, execution proceeds to parameter validation routine 510 which checks each parameter that has been accessed from NOVRAM to determine whether the value of that parameter lies within acceptable bounds. Specifically, upon entry into this routine, block 511 is executed to reset counter n to zero. At this point, execution passes to decision block 515 which tests whether any accessed parameter lies outside the boundary values of a pre-determined range for that parameter. These boundary values are stored in EPROM for each parameter and are appropriately read during execution of this block. In the event an accessed parameter is found to lie outside its corresponding range, then execution proceeds, via the YES path from decision block 511 to decision block 517. Since a transient voltage pulse (commonly referred to as a "glitch") can occur which will obliterate the contents of a memory location, decision block 517 determines whether such a glitch has occurred or whether the accessed value does indeed lie outside its range. Specifically, decision block 517 determines whether the accessed parameter has only been read once; if so, then counter n will equal zero and execution will proceed, via the NO path from this block to execution block 518. This latter block, when executed, will reread the accessed parameter from NOVRAM. Thereafter, block 513 is executed to set the value of counter n to one. Execution then loops back to decision block 515 which determines whether all the accessed parameters lie within their corresponding ranges. If the accessed parameter again falls outside its range, then execution proceeds to decision block 517. In this case, the parameter will have been accessed twice and will have failed on both occasions to lie within its range. As such, a failure rather than a glitch has occurred. The microprocessor will now notify the user of this failure. Specifically, at this time, the value of counter n will equal one. Consequently, execution will proceed, via the YES path from decision block 517, to execution block 519. This block, when executed, will record the fault condition in terms of a corresponding fault code and the time and date that the fault has occurred. This information will then be stored in the fault stack in NOVRAM. This stack can subsequently be read by the user for diagnostic and analysis purposes, as described below in conjunction with menu routine 600, shown in FIGS. 6A-6B. Once block 519 has been executed, as shown in FIGS. 5A-5D, execution proceeds to block 520 which invokes fault routine 900. Execution proceeds from this routine, as discussed below in conjunction with FIG. 9, via dotted path 501 to entry point A only after the user has intervened to reset the system. Now, alternatively if all the accessed parameters fall within their corresponding ranges, then execution proceeds from parameter validation routine 510, via NO path 516 from decision block 515, to execution block 521.

When executed, block 521 enables drive circuit 40 (see FIG. 4) to place the flow tubes into vibration. Inasmuch as both flow tubes require a finite amount of time for their vibratory motion to reach a desired peak value, execution proceeds to decision block 522. This block resets a software counter j to the value one. This counter will be incremented by one every second. The EXCESS DRIVE signal is also tested once per second. If the EXCESS DRIVE signal is on after thirty seconds have elapsed, then a fault condition has occurred. Specifically, after the software counter has been reset by block 522, decision block 523 is executed to determine whether one second has elapsed. If not, execution loops back to the beginning of the decision block. Once one second has elapsed, then execution proceeds to decision block 526, via the YES path from decision block 523. Decision block 526, when executed, tests the status of the EXCESS DRIVE signal. In the event the EXCESS DRIVE signal is high, then execution is routed, via the YES path from decision block 526, to decision block 527. This latter decision block determines whether thirty seconds have elapsed by testing whether the contents of software counter j have been incremented to thirty. If the contents of this counter have not reached thirty, execution proceeds to block 525, via the NO path from decision block 527. Block 525 increments the contents of the software counter after which execution loops back to decision block 523. In the event thirty seconds have elapsed, then execution proceeds to decision block 529 to test the status of the EXCESS DRIVE signal. Now, during the start of the thirty second period the EXCESS DRIVE signal is on which indicates that drive circuit 40 is applying a high valued drive signal to initially place the flow tubes in vibration. During normal operation, this signal will only remain high for a few seconds at most (typically 2 to 3 seconds) after which the peak amplitude of the flow tube vibration will have reached its proper steady state value. In the event the EXCESS DRIVE signal remains on after thirty seconds have elapsed, then a fault exists either in the flow tubes which is inhibiting their vibration or in the drive circuitry. Consequently, execution proceeds, via the YES path from decision block 529, to execution block 528, to flag this fault condition and store the corresponding fault code and time/date stamp in the fault stack in NOVRAM. Thereafter, execution proceeds to block 530 to invoke fault routine 900. As with block 520, the user must intervene to reset the system before execution will proceed from block 530, via dotted paths 533 and 501, to entry point A. Alternatively, in the event the flow tubes are properly vibrating, execution will proceed to block 535, either via the NO path from decision block 526, if the EXCESS DRIVE signal goes low during the thirty second interval, or, via the NO path from decision block 529, once this interval has elapsed.

Block 535, when executed, will set up the interrupt mask, i.e. establish the priority between the two incoming interrupts, namely the 100 msec interrupt and the EOM interrupt. Thereafter, execution proceeds to block 537 which enables the EOM interrupt, which when it occurs invokes time difference measurement interrupt routine 1400. After block 537 has been executed, block 539 is executed to establish a one second software timer. To do so, a software counter, IROC, is set to 20. This counter is decremented and then tested during execution of time difference measurement interrupt routine 1400 which typically executes once every 5 msec. The value of this counter is set to 20 every time 100 msec interrupt routine 1000 is executed. Now, in the event the counter has been decremented to zero, then routine 1400, as discussed below, will have detected a fault, probably occurring in the real time clock, and will respond accordingly.

Now, after block 539 has been executed in main program 500, control passes to block 541 which performs sensor diagnostics. Here, the microprocessor 205 (see FIG. 2) instructs A/D converter 220 to successively sample and digitize the peak value of each of the velocity signals produced by peak detectors 232 and 234. Each digitized peak value is compared against pre-defined limits stored in EPROM. Thereafter, the microprocessor instructs the A/D converter to sample and digitize the DRIVE SIGNAL CONTROL VOLTAGE. The resulting digitized value is also compared against pre-defined limtis also stored in EPROM. In the event this diagnostic fails, then execution proceeds, through the YES path of decision block 542 to execution block 543. This latter block, when executed, flags the occurrence of a fault condition and stores the corresponding fault code for the failed diagnostic along with its time/date stamp in the fault stack in NOVRAM. Thereafter, block 544 is executed which invokes fault routine 900. At this point, the user must intervene to reset the system, before execution will proceed from block 544, via dotted paths 545 and 501, to entry point A. Alternatively, in the event the sensor diagnostic was satisfactorily completed, then execution proceeds to decision block 547.

Decision block 547 detects whether the user has depressed the menu pushbutton. If this pushbutton has been depressed, then execution is passed, via the YES path from this decision block, to block 546. When executed, block 546 invokes menu routine 600 to successively display entries on an input menu on the LCD display and, if a "secure" switch—as discussed in detail below—is in the "off" position, to permit the user to change the value of any of these parameters. Thereafter, execution proceeds to block 552. If on the other hand, the user has not depressed the menu pushbutton, the execution proceeds, via the NO path from decision block 547, to decision block 548. This latter decision block, when executed, implements a four second software timer. During the four second interval, block 547 is continuously re-executed to determine if the user has depressed the menu pushbutton during this time. Once the timer reaches the end of the four second interval, then execution proceeds, via the YES path, from decision block 548, to block 551. This block, when executed, accesses the previously stored values of all the user parameters (such as output measurement units, alarm levels, baud rate, parity and serial communication type) from NOVRAM for subsequent use by the system. Execution now proceeds to block 552 which appropriately configures the serial output using the user parameters either obtained from NOVRAM or supplied from the user. Thereafter, execution proceeds to block 553 which resets (de-energizes) the fault alarm by energizing relay 265 (see FIG. 2) and thereby opening its normally closed contact. As noted, up to this point, relay 265 has not been energized and hence the fault alarm has remained on. Execution next proceeds to block 555, as shown in FIGS. 5A–5D, to enable the 100 msec interrupt.

Now, at this point, execution enters interrupt wait loop and diagnostic routine 560. While this routine executes, interrupts are allowed to occur and are then appropriately serviced. Whenever an interrupt is not being serviced, this routine, when executing, performs a pre-determined sequence of system diagnostics. Specifically, upon entry into this routine, block 561 is executed to reset the value of a loop counter, LOOP COUNT, to zero. The value of this counter is incremented by one every time this loop is executed and rolls over at 24. The particular diagnostic that is to be executed during any pass through this routine is governed by the count then existing in this counter. Now, once the loop counter has been reset, execution proceeds to decision block 563. This decision block tests the status of the +5 volt supply by checking the level of the +5 VOLT STATUS LINE. In the event the level is low, which indicates an imminent collapse of the +5 supply voltage, then a fault occurs. In this case, execution proceeds, via the NO path from decision block 563, to block 566. This latter block, when executed, flags the occurrence of a fault condition and then stores a corresponding fault code and time/date stamp in the fault stack in NOVRAM. Execution then proceeds to block 573 which invokes fault routine 900. After suitable user intervention, execution exits from block 573 and proceeds, via dotted paths 575 and 501, to entry point A. Alternatively, if the level of the +5 STATUS LINE indicates proper operation of the +5 volt supply, then execution proceeds, via the YES path from decision block 563, to decision block 568. This latter decision block tests whether diagnostics are to be executed by checking the status of the diagnostic request flag. This flag is set during execution of 100 msec interrupt routine 1000. Therefore, as long as this interrupt routine is being executed (the flow rate is being updated and the mass flow is being totalized), diagnostics are to be performed. If this interrupt routine is not executing, then the flag remains reset and diagnostics will not to be performed. In the event the diagnostic request flag is not set, then execution merely loops back to block 563, via the NO path from decision block 568. In the event the diagnostic request flag has been set, then execution proceeds to block 571, via the YES path from decision block 568. Block 571, when executed, resets the diagnostic request flag.

At this point, block 577 is executed. This block executes any one of a variety of diagnostic tests depending upon the current value of the loop counter. These diagnostic tests include, as described above: an A/D test, a test of all the power levels, tests of both input channels, a microprocessor RAM memory test (to save execution time, this test is performed on one quarter of the RAM capacity at a time) and NOVRAM test (again to save execution time, one fifth of the NOVRAM is tested at a time). Inasmuch as sensor errors (faulty tube or velocity sensor) are expected to occur more frequently in the inventive system than any other fault, a sensor diagnostic test, i.e. comparisons of both the peak velocity sensor amplitudes and the DRIVE SIGNAL CONTROL VOLTAGE against corresponding limit values—as described above, is interleaved between the execution of any two other diagnostics. Moreover, inasmuch as the diagnostic request flag is reset every 100 milliseconds by 100 msec interrupt routine 1000, a new diagnostic is executed every 100 milliseconds. Twenty four iterations of routine 560 (occurring over a period 2.4 seconds) are required to fully execute all these diagnostics once. During this period, the sensor diagnostics will have been executed during every other iteration for a total of 12 times and all the remaining diagnostics will execute once during the remaining 12 iterations: one iteration for the A/D test, one iteration for the test of the power levels, one iteration for the input channel test, four iterations for one complete microprocessor RAM test and five iterations for one complete EPROM test. Now, in the event the diagnostic being executed during any iteration fails, decision block 579 routes execution, via its YES path, to block 582. This block flags the occurrence of a fault condition, and stores the corresponding fault code for the failed diagnostic along with the time/date stamp in the fault stack in NOVRAM. Execution then proceeds to block 584 to invoke fault routine 900. This routine is terminated only after user intervention, in which case, execution proceeds, via dotted paths 585 and 501, to entry point A. Alternatively, if this diagnostic is satisfactorily completed, then execution proceeds, via the NO path from decision block 579, to execution block 587 to increment the value of the loop counter by one. Thereafter, decision block 589 is executed to test the value of the loop counter. If the value of the loop counter has not reached 24, then execution proceeds, via the NO path to path 593 and from there back to block 563. If however, the value of this counter has reached 24, then execution proceeds, via the YES path from decision block 589, to block 592 which resets the value of the loop counter to zero. Thereafter, execution is routed back to block 563 via path 593 to essentially re-execute interrupt wait loop and diagnostic routine 560 while waiting for the next interrupt to occur.

2. Menu Routine 600

Figure 6B:
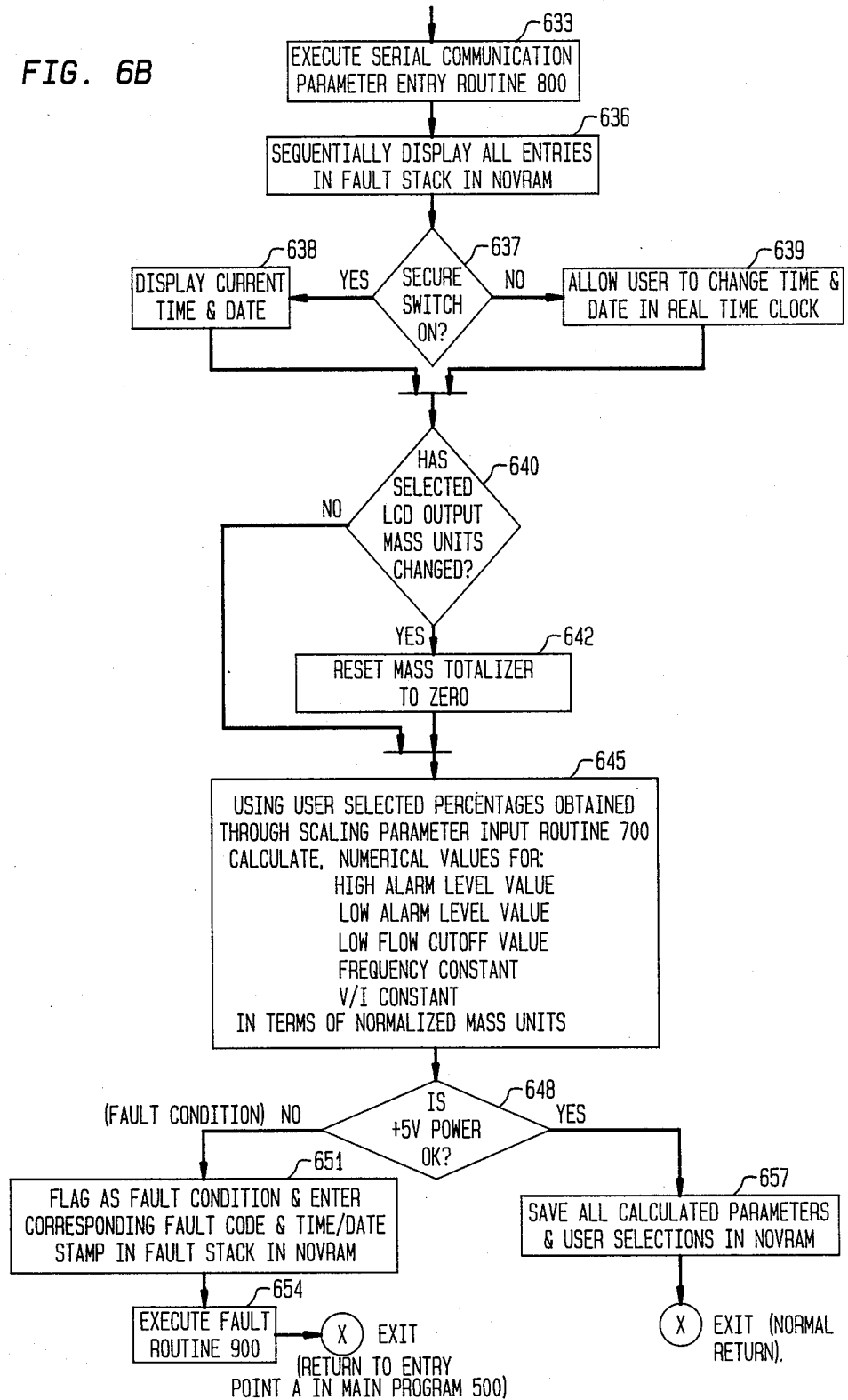

A flowchart of menu routine 600 is depicted in FIGS. 6A–6B, with the correct alignment of the drawing sheets for these figures shown in FIG. 6. This routine, as noted, essentially displays a sequential menu of user parameters and selectively allows the user to change the value of these parameters. In addition, given various selections made by the user, this routine also calculates corresponding alarm limit values and output scaling constants for subsequent use.

Menu Routine 600 is only executed when the current mass flow rate equals zero or, via block 547, whenever the system is reset. Therefore, upon entry into this routine, decision block 601 is executed to determine whether the current value of the mass flow rate equals zero. Specifically, the value of the variable RATE is accessed from NOVRAM. This value, as discussed below in connection with 100 msec interrupt routine 1000, is the current measured value of the mass flow rate unless its value is below a zero flow cutoff value, in which case, the value of RATE is set to zero. If the value of RATE is not zero, then execution exits from menu routine 600, via the NO path from decision block 601. Alternatively, if the value of RATE equals zero, then execution proceeds to block 606, via the YES path from decision block 601, to execute the rest of menu routine 600.

Next, execution proceeds to decision block 606. This block determines whether the user has requested the system to print a ticket. Specifically, a ticket printer can be interfaced to the system, via the RS-232C port. When instructed to do so by the user, the system will print totalized flow information and a time/date stamp on a ticket. Immediately prior to the transfer of a product, the value of the resettable totalizer can be reset to zero and will thereafter totalize the mass flow of the product that will be then be transferred. After the custody transfer has taken place, the ticket can be given to the party receiving the product as documentary evidence of the contemporaneous transfer. Hence, if the user has instructed the system to print a ticket, execution proceeds, via the YES path from decision block 606, to block 609. This latter block accesses the value of both totalizers (the resettable and inventory totalizers) stored in NOVRAM and the time/date values from the real time clock and appropriately instructs the ticket printer to print this information. Alternatively, if a ticket is not to be printed, then execution proceeds, via the NO path from this decision block, to block 612. When the user pushes the menu pushbutton, block 612 executes and displays the value of the inventory totalizer on the LCD display.

At this point, execution proceeds to block 614 to execute scaling parameter input routine 700 shown in detail in FIG. 7. As discussed in detail below, this routine displays one of a succession of scaling parameters, i.e. mass flow and mass flow rate output measurement units and alarm level values, at each successive depression of the menu pushbutton. The user can change the value of any of these scaling parameters only if the secure switch is in an "off" position. Thereafter, blocks 621 and 624 are executed to allow the user to program the frequency output. In particular, block 621, when executed, displays the current value of the span of the frequency output and permits the user to select any desired span (e.g. 500 Hz, 1 KHz, 5 KHz, 10 KHz), using the increase/decrease pushbuttons. Once the span has been selected, execution proceeds to block 624. This block, after the menu pushbutton has been depressed again, displays the full scale percentage for the frequency output and permits the user to change the value of the percentage using the increase/decrease pushbuttons. This value of this percentage equals the percentage of the full scale flow that will produce the full scale output frequency. Once the frequency output has been fully programmed, execution proceeds to block 627 to program the V/I analog output, i.e. V/I converter 273 shown in FIG. 2. As discussed, this converter is configured in hardware to provide either a current or a voltage output signal. The output modes for this converter are either 0-20 mA or 4-20 mA for current output and either 0-5 volts or 1-5 volts for voltage output. As shown in FIGS. 6A-6B, block 627, executed after the user again presses the menu pushbutton, displays the current output mode of the converter and permits the user to select a desired mode using the increase/decrease pushbuttons. Thereafter, when the user again presses the menu pushbutton, execution proceeds to block 630 which, when executed, displays the full scale percentage for the V/I output and permits the user to change the value of the percentage using the increase/decrease pushbuttons. This value of this percentage equals the percentage of the full scale flow that will produce a full scale output signal on the V/I output. Now, after the user again presses the menu pushbutton, execution proceeds to block 633 which invokes serial communication parameter entry routine 800 which is shown in FIG. 8 and discussed in detail below. This routine successively displays one of the following parameters at each depression of the menu pushbutton: the type, baud rate and parity for serial communication. The user can change the value of these parameters only if the secure switch has been placed in its "off" position. Thereafter, execution proceeds to block 636 which permits the user to sequentially display the last 25 entries (fault code and associated time/date stamp) in the fault stack. The user can examine these entries both forward (the oldest entry to the most recent) and backward by appropriately depressing the increase or decrease pushbuttons.

Now, after the user again depresses the menu pushbutton, execution proceeds to decision block 637 to determine if the secure switch is in its "on" position. If not, execution passes to block 639. This block reads the current time and date from real time clock 215 (see FIG. 2) and displays the resulting information on the LCD display. The user can change the date using the increase/decrease pushbuttons to increment or decrement the date and thereafter, once the menu pushbutton has been depressed, change the time in a similar fashion. After the menu pushbutton has been depressed, the new time and date values are loaded by the microprocessor into the real time clock. Execution then proceeds to decision block 640. Alternatively, if the secure switch is not in its "on" position, then execution is routed, via the YES path from decision block 637, to block 638 which, when executed, merely displays the current time and date on the LCD display.

At this point, execution now proceeds to decision block 640 which determines whether the user has changed the mass output units from those previously selected. If so, then execution proceeds, via the YES path from this decision block, to block 642 to reset the total stored in the inventory and resettable totalizers both situated in NOVRAM. If this totalizer was not reset, then the past and present output measurement units would not match and a conversion of the inventory total to the present units would be necessary to insure continued accurate historical totalization. To simplify processing, the contents of the totalizer are simply reset to zero at this point. This is the only point, in the software, at which the inventory totalizer is reset. Inasmuch as the output measurement unit can only be changed with the secure switch in the "off" position, the value of the totalizer will only be reset, if at all, during the time when the secure switch was in its "off" position. Execution then proceeds from block 642 to block 645. In the event the output measurement unit has not been changed, then execution simply proceeds, via the NO path from decision block 639, to block 645.

Block 645, when executed, calculates numerical values of high/low alarm limits, low flow cutoff, and the frequency and V/I scaling constants in terms of normalized mass units. The user has previously selected a percentage value in terms of a full scale reading, for each of these two limits, the low flow cutoff value and the two scaling constants, during execution of scaling-parameter input routine 700. Block 645 simply multiplies each selected percentage by an appropriate factor, which has been previously stored in EPROM, to obtain an associated normalized numerical value.

At this point, execution proceeds to decision block 648 which checks the status of the +5 volt supply by detecting the level of +5 VOLT STATUS LINE 298 (see FIG. 2). In the event the power supply is properly operating, execution proceeds, via the YES path from decision block 648 shown in FIGS. 6A-6B, to block 657 which, when executed saves all the calculated parameters and user selections in NOVRAM for subsequent use. Thereafter, execution exits from menu routine 600 and returns to main program 500 in a normal fashion, i.e. to block 552 (see FIGS. 5A-5D). In the event the level of line 298 (see FIG. 2) is low, a fault has occurred in the +5 volt supply. In this case, as shown in FIGS. 6A-6B, execution proceeds, via the NO path from decision block 648, to block 651. This block, when executed, flags the occurrence of a fault condition and stores the corresponding fault code and time/date stamp as the most recent entry in the fault stack in NOVRAM. Thereafter, block 654 is executed to invoke fault routine 900. After the user has intervened to clear the fault, execution passes from block 654 to entry point A in main program 500.

3. Scaling Parameter Input Routine 700

Figure 7B:
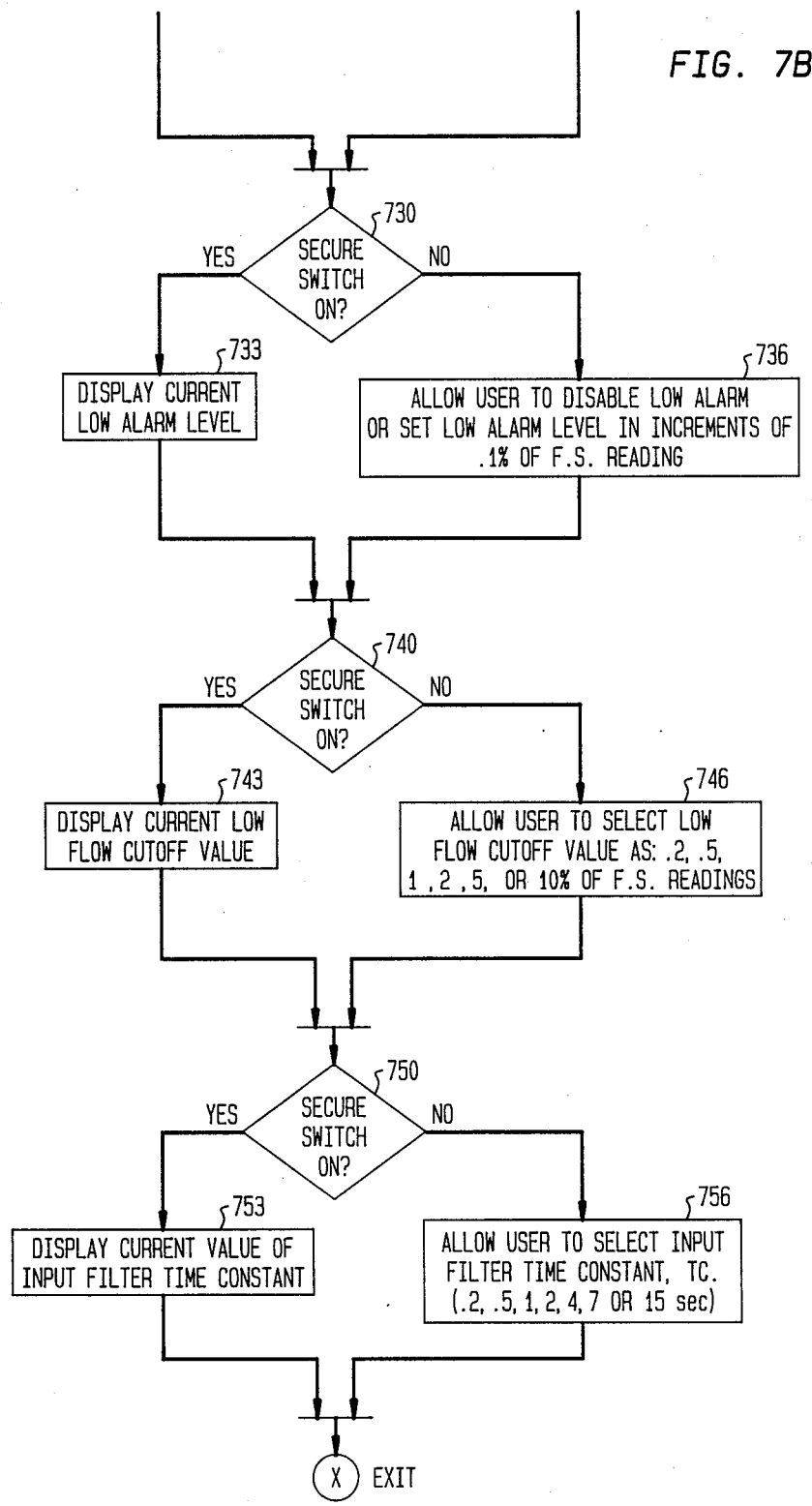

A flowchart of Scaling Parameter Input Routine 700 collectively appears in FIGS. 7A and 7B, with the correct alignment of the drawing sheets for these figures shown in FIG. 7. As previously discussed, this routine displays a sequence of output parameters and permits the user to change the value of any of these parameters only if the secure switch is in its "off" position.

Specifically, upon entry into this routine, decision block 701 is first executed to determine whether the secure switch is in its "on" position. If this switch is off, indicating that the user has access to change various output parameters, then execution proceeds, via NO path from decision block 701, to block 706 to permit the user to select desired output mass flow and mass flow rate measurement units for purposes of the LCD display, scaled pulse output unit, frequency output and V/I analog output. In particular, this block first reads the meter size parameter from a set of input switches (typically two hex switches). These switches have been set at the factory to a particular value that corresponds to the size (maximum flow rate) of meter assembly 10 (see FIG. 1) that is to be connected to meter electronics 20. All possible values are stored in a measurement unit table in EPROM. The particular value read from these switches is used to sequentially access a set of permissible output measurement units for that meter from that table. For example, for a D600 size Coriolis mass flow meter manufactured by Micro Motion, Incorporated (the present assignee), the permissible mass units would be pounds, tons, and kilograms; and the permissible mass flow units would be pounds/second, tons/second, tons/minute, kilograms/second and kilograms/minute. For a relatively small meter, such as the D12 size meter also manufactured by Micro Motion, Incorporated, the permissible mass units would be pounds, ounces and kilograms; and the permissible mass flow units would be pounds/minute, pounds/hour, ounces/second, ounces/minute, ounces/hour, kilograms/minute, and kilogram/hour. The user can step through the accessed set of units using the increase/decrease pushbuttons. Once appropriate selections have been made, the user presses the menu pushbutton which advances execution to decision block 710. Alternatively, if the secure switch is in its "on" position, then execution proceeds, via the YES path from decision block 701, to block 703 which, when executed, merely displays the current output mass and mass flow measurement units on the LCD display. Pressing the menu pushbutton causes execution to proceed to block 710.

Decision block 710 again tests the status of the secure switch. If the switch is in its "off" position, execution then proceeds, via the NO path from this decision block, to block 716. This latter block, when executed, uses the previously read meter size value to sequentially access the measurement unit table stored in EPROM to provide a corresponding list of output measurement units for the scaled pulse output (such as one scaled pulse output per every 0.001, 0.01, 0.1, 1, 10, 100 or 1000 totalized units with a maximum scaled pulse output frequency of 10 Hz). The user can step through this list and select an appropriate measurement unit using the increase/decrease pushbuttons. Alternatively, if the secure switch is in its "on" position, then execution proceeds, via the YES path from decision block 710, to block 713 which, when executed, merely displays the current scaled pulse output measurement unit. Thereafter, at the next depression of the menu pushbutton, execution proceeds to decision block 720 from either block 713 or 716. Decision block 720 again tests the status of the secure switch. Depending upon the status of this switch, execution will proceed either to block 726 or 723 if the switch is respectively in its "off" or "on" position. If block 726 is executed, the user can either selectively disable the high alarm or set the high alarm level in increments of 0.1% from 5% to 150% of the full scale reading using the increase/decrease pushbuttons to incrementally raise or lower the high alarm level as desired. After the menu pushbutton is depressed, execution then proceeds to decision block 730. Alternatively, if block 723 is executed, then the current value (percentage of full scale reading) of the high alarm level is merely displayed on the LCD display. Thereafter, the user depresses the menu pushbutton to pass execution to block 730. Blocks 730, 733 and 736 function in a similar manner to blocks 720, 723 and 726 to either permit the user to either selectively disable the low alarm or select an appropriate value of the low alarm limit in increments of 0.1% from 1 to 100% of full scale reading, or merely display the current value of the low alarm level.

Execution advances to decision block 740 at the next depression of the menu pushbutton. This block again tests the status of the secure switch. If the switch is in its "off" position, execution then proceeds, via the NO path from this decision block, to block 746. This latter block, when executed, allows the user to set the low flow cutoff value to 0.2, 0.5, 1, 2, 5 or 10% of the full scale reading using the increase/decrease pushbuttons to respectively step up or down through the permitted low flow cutoff values as desired. In the event the measured mass flow rate falls below the selected low flow cutoff value, then as discussed in detail below in conjunction with the 100 msec interrupt routine 1000, the displayed flow rate is set to zero and totalizing stops. In this case, the frequency and scaled pulse outputs are also set to zero. Only the analog V/I and flow direction outputs continue to provide an indication of the actual mass flow. All these outputs return to normal as soon as the measured flow exceeds the low flow cutoff value. Alternatively, if the secure switch is in its "on" position, then execution proceeds, via the YES path from decision block 740 to block 743 which merely displays the current value of the low flow cutoff as a percentage of full scale reading. As soon as the user depresses the menu pushbutton, execution proceeds from block 743 to decision block 750.

Block 750 again tests the status of the secure switch. If the switch is in its "off" position, execution then proceeds, via the NO path from this decision block, to block 756. This latter block, when executed, allows the user to set the time constant of the input digital filter to 0.2, 0.5, 1, 2, 4, 7 or 15 seconds using the increase/decrease pushbuttons to incrementally select a larger or smaller time constant as desired. Alternatively, if the secure switch is in the "on" position, then execution proceeds, via the YES path from decision block 750, to block 753 which merely displays the current value of the input filter time constant. Once block 753 or 756 is executed, execution exits from this Scaling Parameter Input Routine 700.

4. Serial Parameter Entry Routine 800

A flowchart of Serial Parameter Entry Routine 800 appears in FIG. 8. As previously discussed, this routine sequentially displays the type, baud rate and parity that defines the operation of serial interface 255 (see FIG. 2). This routine permits the user to change the value of any of these items only if the secure switch is in its "off" position.

In particular, upon entry into this routine as shown in FIG. 8, the microprocessor selectively displays or changes the values of three successive parameters used for serial communication: the type of serial communication, the baud rate and the parity. Specifically, decision block 810 is first executed to determine if the secure switch is in its "on" position. If not, execution passes to block 817. This block, when executed, allows the user to select the type of serial communication that will be provided by the inventive system through serial interface 255 (see FIG. 2), i.e. none for no serial communications, or either RS-232C for local communication or RS-485 for network communication. The user makes his choice by depressing either the increase or decrease pushbutton to toggle between the two alternatives. Alternatively, if the secure switch is in its "on" position, then execution is routed as shown in FIG. 8, via the YES path from decision block 810, to block 814 which merely displays the type of serial communication that is presently in use. Depressing the menu pushbutton advances execution to decision block 820.

Decision block 820, when executed, determines if the secure switch is in its "on" position. If not, execution passes, via the NO path from this decision block, to block 827. This latter block, when executed, allows the user to set the baud rate to any standard value between 150 baud-19.2 kBaud inclusive (e.g. 150, 300, 1200 2400, 4800, 9600 and 19.2 kBaud) using the increase/decrease pushbuttons to raise or lower the baud rate as desired. Alternatively, in the event the secure switch is in its "on" position, then execution proceeds to block 824 via the YES path from decision block 820. Block 824, when executed, merely displays the current baud rate on the LCD display. Thereafter, at the next depression of the menu pushbutton, execution advances to decision block 830. This last decision block when executed, determines if the secure switch is in its "on" position. If not, execution passes, via the NO path from this decision block, to block 837. This latter block, when executed, allows the user to set the parity to odd, even or none by depressing either the increase or decrease pushbuttons to successively step through the permitted parity choices as desired. Alternatively, in the event the secure switch is in its "on" position, then execution proceeds to block 834 via the YES path from decision block 830. Block 834,, when executed, merely displays the current parity on the LCD display. Once block 834 or block 837 is executed, execution exits from Serial Parameter Entry Routine 800.

5. Fault Routine 900

A flowchart of Fault Routine 900 is shown in FIG. 9. As discussed, this routine sets the fault alarm, disables drive circuit 40 (see FIG. 4) and then continuously displays the latest entry in the fault stack (fault code and corresponding time/date stamp) until the user intervenes to reset the system which clears the fault.

Specifically, as shown in FIG. 9, upon entry into routine 900 execution first proceeds to block 910. This block, when executed, sets the fault alarm by merely de-energizing fault relay 265 (see FIG. 2) through bus interface 261. Since the fault alarm is connected through the normally closed contacts of this relay, de-energizing this relay will activate the alarm. Thereafter, execution passes to block 915 to disable drive circuit 40 by applying a low level as the DRIVE ENABLE signal appearing on lead 242 (see FIG. 2). This, in turn, as noted above, allows the flow tubes to cease vibrating. This also advantageously prevents the tubes from being damaged throughout the remainder of the fault condition. Once block 915 has executed, execution passes, as shown in FIG. 9, to block 920 to display the latest entry in the fault stack (fault code and accompanying time/date stamp) on the LCD display. Thereafter, execution proceeds to decision block 930 which tests whether the user has depressed the clear pushbutton. If the user has depressed this pushbutton, then execution proceeds, via the YES path of this decision block, to exit routine 900 and return to entry point A in main program 500 to subsequently re-initialize the system. Alternatively, in the event the user has not depressed the clear pushbutton, then execution proceeds, from the NO path of decision block 930, to decision block 940. This latter decision block tests whether a clear instruction has been received by serial interface 255 (see FIG. 2) over either an local (RS-232C) or network (RS-485) connection. If, on the one hand, such an instruction has been serially received, then execution proceeds, via the YES path from this decision block, to exit routine 900. On the other hand, if a clear instruction has not been serially received, then execution loops back to block 920 via the NO path from decision block 940. As long as the system has not been reset, execution remains in a loop consisting of blocks 920, 930 and 940.

6. 100 msec Interrupt Routine 1000

Figure 10B:
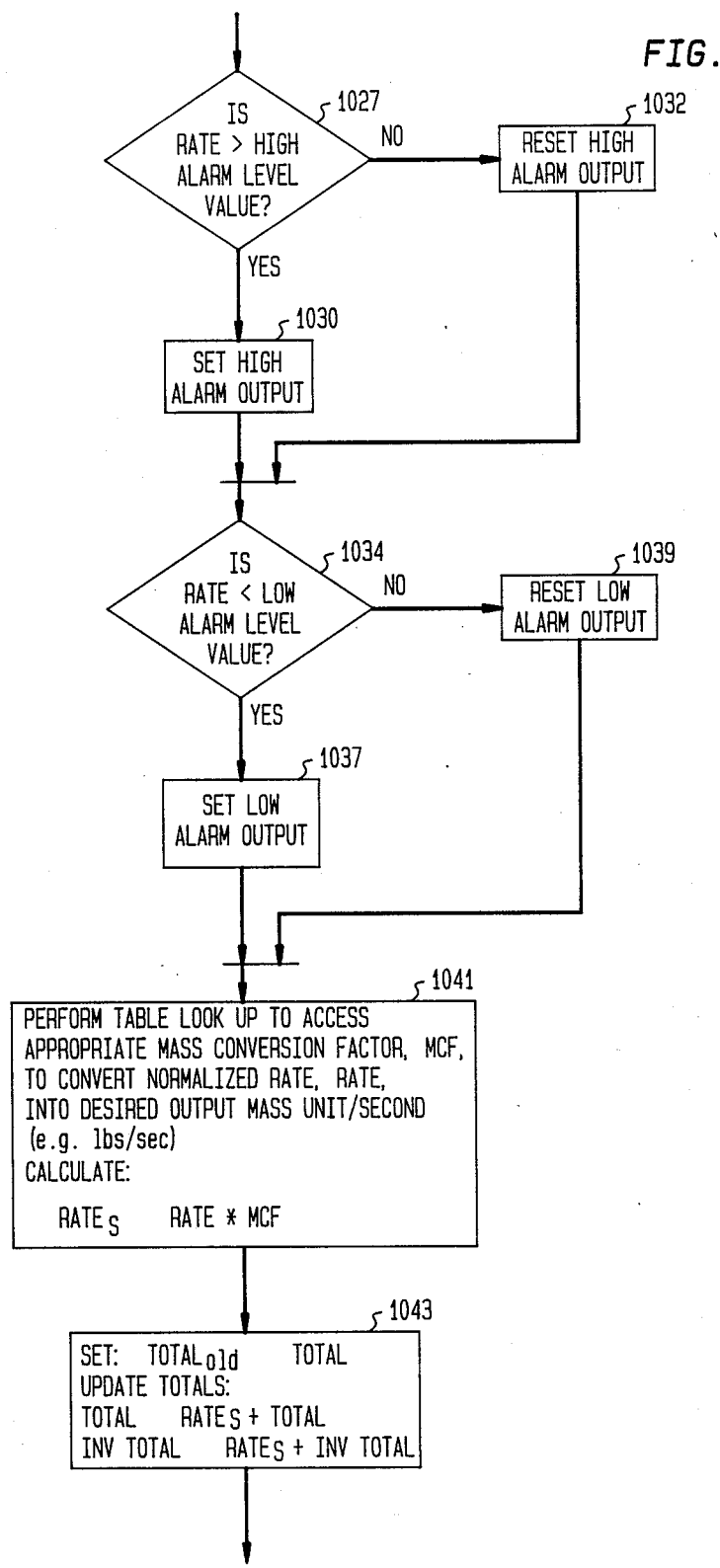
Figure 10C:
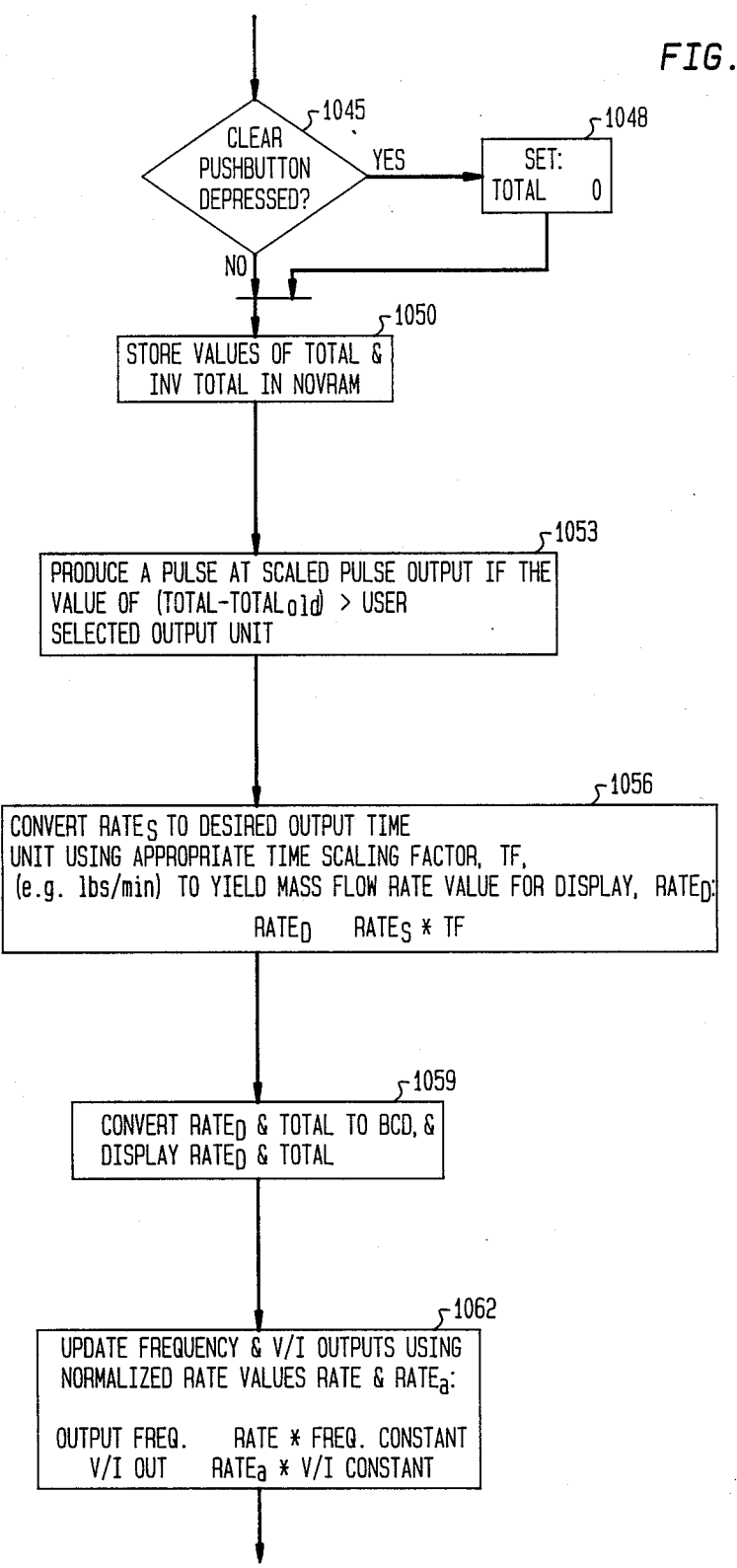
Figure 10D:
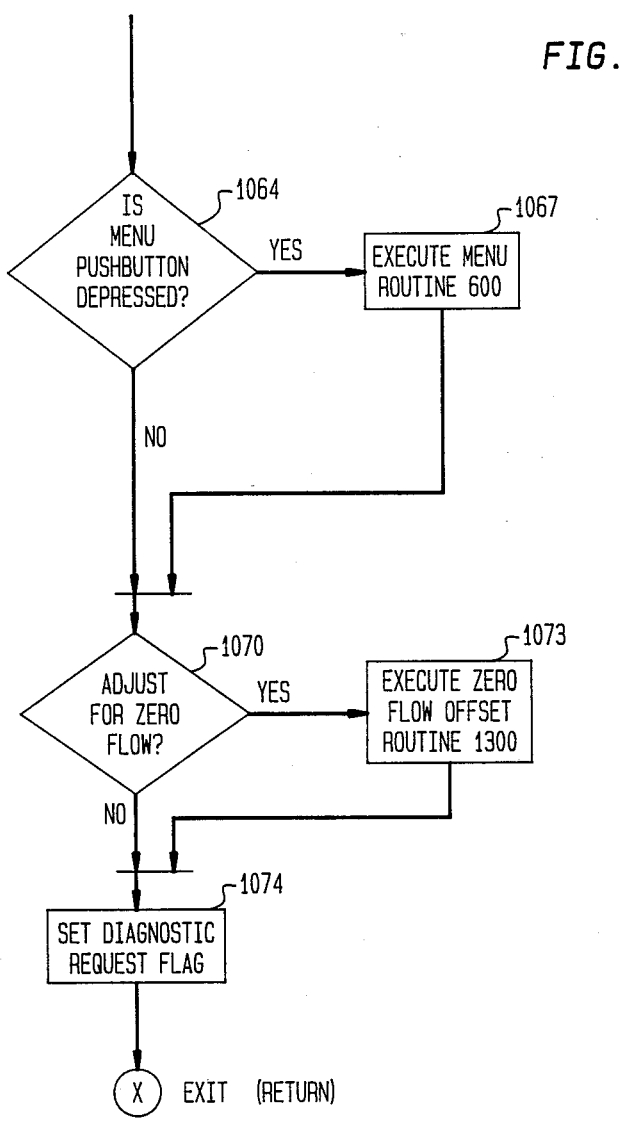

A flowchart of 100 msec Interrupt Routine 1000 is depicted in FIGS. 10A–10D, with the proper alignment of the drawing sheets shown in FIG. 10. Execution of this routine is initiated every 100 milliseconds by the occurrence of a timing pulse from real time clock 215, as previously discussed below, and applied to an interrupt line of microprocessor 205 (see FIG. 2). During its execution, this routine, as discussed, calculates the latest value of mass flow rate, updates the flow totals and displays the results, and performs various diagnostics.

Specifically, decision block 1001 is first executed upon entry into this routine as shown in FIGS. 10A–10D. This block checks the output of timer 290 (the watch dog timer see FIG. 2) to determine whether the timer has reached the end of its 100 millisecond timing interval. This timer is reset to zero approximately every 20 milliseconds by each execution of time difference measurement routine 1400 as described in detail below. If the watch dog timer has timed out, this indicates that time difference interrupt routine 1400 is not executing. Since this is a fault condition, execution proceeds, via the YES path from decision block 1001, to block 1004. This block flags the fault condition and enters the corresponding fault code and time/date stamp as the latest entry in the fault stack in NOVRAM. Execution then proceeds to block 1006 which invokes fault routine 900. After the user has intervened to clear the fault, execution is routed from block 1006 to entry point A in main program 500. In addition, if watch dog timer 290 times out, it also causes a fault alarm by applying a low level to WATCH DOG TIMER OUTPUT line 292 which directly de-energizes relay 265. This direct link to relay 265 from timer 290 is necessary to indicate a fault in the event the microprocessor has ceased to operate. Alternatively, in the event the watch dog timer has not reached the end of its timing interval, then execution proceeds, as shown in FIGS. 10A–10D, via the NO path from decision block 1001 to block 1008.

Block 1008, when executed, resets the value of the software timer, IROC, to 20. As discussed, this timer is a software counter which is decremented during each iteration of time difference measurement interrupt routine 1400. In the event the value of this timer reaches zero during any iteration of routine 1400, then this indicates that 100 msec interrupt routine 1000 is not executing, due most likely to a failure in the real time clock. As discussed in connection with routine 1400, this causes a fault condition to occur. After this timer has been reset, execution then proceeds from block 1008 to block 1011.

Execution block 1011 invokes rate factor calculation routine 1100, shown in FIG. 11 and discussed in detail below. In essence, this routine determines the temperature compensated rate factor for the particular meter assembly in use. The rate factor is a linear factor that proportionally relates the measured time difference produced by circuit 30 (discussed above in connection with FIG. 3) to the actual mass flow rate of a fluid passing through the meter assembly. To easily calculate mass flow rate for any one of a wide variety of meter sizes, each one of which can have a number of different permissible user selectable output measurement units associated therewith, the rate factor is calculated in normalized units so as to yield a normalized mass flow rate measurement of milligrams/second which is subsequently converted to the appropriate measurement unit just prior to totalization, as will be explained in detail below. Use of normalized calculations advantageously eliminates the need for any intermediate unit conversions of the mass flow rate which, in turn, saves processing time. In any event, the rate factor depends upon the spring constant of the flow tubes. Inasmuch as this constant varies with temperature, rate factor calculation 1100 utilizes the tube temperature measurement provided by RTD temperature sensor 190 in calculating the rate factor. Once the rate factor calculation has been completed, execution proceeds to block 1014. This block, when executed, first accesses the most recent time difference sum value ($TS_f$) previously provided by time difference measurement interrupt routine 1400 from NOVRAM. Thereafter, this block converts this sum value from the two's complement form in which it was previously calculated into sign and magnitude form to yield $TS_C$. At this point, block 1017 is executed to set the flow direction output corresponding to the sign of $TS_C$.

Now, execution proceeds to block 1020 which calculates the mass flow rate, RATE, normalized in units of milligrams/second, using the following formula:

$$RATE = TS_C * RF \qquad (6)$$

where: RF is the rate factor and also sets the value of a temporary variable, $RATE_a$, equal to the calculated mass flow rate. Thereafter, the calculated mass flow rate is compared against the low flow cutoff value. If the magnitude of the calculated mass flow rate is less than or equal to the low flow cutoff value, then execution is routed, via the YES path from decision block 1022, to block 1025 which sets the value of the variable RATE to zero. By contrast, the value of variable $RATE_a$ always remains equal to the actual value of the calculated mass flow rate, regardless of its magnitude. As noted below, the value of variable RATE is used to update all the system outputs (frequency, displayed mass flow and mass flow rate and totalized mass flow) with exception of the analog mass flow rate V/I output which is updated using the value of variable $RATE_a$. Execution then proceeds from block 1025 to decision block 1027. Alternatively, if the calculated value of the mass flow rate exceeds the low flow cutoff value, then execution proceeds, via the NO path from decision block 1022, directly to decision block 1027.

Decision blocks 1027 and 1034 determine whether the value of variable RATE falls between the values of the high and low alarm levels. If not, an appropriate alarm is energized. Specifically, decision block 1027 tests the value of the variable RATE against the value of the high alarm level. In the event the value of the variable RATE exceeds this alarm level, then execution proceeds, via the YES path from decision block 1027, to block 1030 which sets the high alarm output, i.e. energizes one of solid states relays 263 (see FIG. 2) to activate the high level alarm. Alternatively, if the value of the variable RATE is less than the high level alarm value, then, as shown in FIGS. 10A–10D, execution proceeds to block 1032 which merely resets the high level alarm, i.e. deenergizes it. After either block 1030 or 1032 has been executed, decision block 1034 is executed to test whether the value of the variable RATE is less than the low alarm level value. In the event the value of the variable RATE is less than the low alarm level value, then execution proceeds, via the YES path from decision block 1034, to block 1037 which sets the low alarm output, i.e. energizes one of solid states relays 263 (see FIG. 2) to activate the low level alarm. Alternatively, if the value of the variable RATE is greater than the low level alarm value, as shown in FIGS. 10A-10D, then execution proceeds to block 1039 which merely resets the low level alarm, i.e. de-energizes it. At this point, execution proceeds from either block 1037 or 1039, to block 1041.

Block 1041 accesses an appropriate mass conversion factor, MCF, from a look up table given the output mass measurement unit that has been selected by the user. This mass conversion factor, is multiplied by the value of the normalized flow rate variable RATE to provide the mass flow rate in the desired output mass units (e.g. pounds, tons, ounces, kilograms, metric tons) on a per second basis, i.e. $RATE_s$, for easy totalization. Thereafter, block 1043 is executed to update the mass flow totals. As discussed previously, two mass flow totals are maintained: a user resettable total, TOTAL, and an inventory total, INV TOTAL. First, the previous value of the resettable total is saved in the variable $TOTAL_{old}$ for subsequent use. Then, the scaled mass flow rate is used to update both totals as follows:

$$TOTAL = RATE_s + TOTAL \quad (7)$$

$$INV\ TOTAL = RATE_s + INV\ TOTAL \quad (8).$$

At this point, execution proceeds to decision block 1045 to determine whether the user has depressed the clear pushbutton in order to reset the value of the resettable totalizer. If this pushbutton has been depressed, execution is routed, via the YES path from decision block 1045, to block 1048 to clear the value of the resettable totalizer to zero and thereafter to block 1050. As such, the user can reset the value of the resettable total at any time; however, as discussed, the value of the inventory totalizer is reset only in the event the mass output unit has been changed. In the event the user has not depressed the clear pushbutton, then execution proceeds directly, via the NO path from decision block 1045, to block 1050. Block 1050, when executed, saves the current values of both totalizers in appropriate locations in NOVRAM. Thereafter, execution passes to block 1053 to update the scaled pulse output given the current value of mass flow. Specifically, the difference between the previous and current values of totalized mass flow is calculated to yield the current incremental mass flow that passed through the meter. In the event this incremental mass flow is greater than or equal to the scaled pulse output measurement unit selected by the user (i.e. one scaled pulse output per every 0.001, 0.01, 0.1, 1, 10, 100 or 1000 totalized units), then one pulse is provided at the scaled pulse output. In the event the incremental mass flow is less than the selected unit, then no pulse will be produced at this output. As noted, the maximum frequency of this output is limited to 10 Hz to permit mechanical totalizers to be driven by this output.

Now, at this point, the value of the scaled mass flow rate, $RATE_s$, which is measured in seconds, is now scaled to the appropriate time unit (e.g. minutes, hours) previously selected by the user to yield a mass flow rate measurement, $RATE_D$, scaled to both the mass and time units that have been selected by the user. This is accomplished within block 1056 which, when executed, multiplies the scaled mass flow rate, $RATE_s$, by an appropriate time conversion factor, TF. All the permitted values of conversion factor TF (e.g. 60 or 3600) are stored in a table. The appropriate value of this factor is accessed using the output unit that has been previously selected by the user during execution of menu routine 600, as discussed above. Once these operations have been completed, execution proceeds to block 1059 to convert the current value of $RATE_D$ and TOTAL to binary coded decimal (BCD) values and then display the current values of $RATE_D$ and the mass flow total in the resettable totalizer. Thereafter, block 1062 is executed to update the frequency and analog V/I outputs. These outputs are updated by multiplying normalized mass flow rate values RATE and $RATE_a$ by respective scaling constants, FREQ. CONSTANT and V/I CONSTANT, to yield values for the frequency output variable, OUTPUT FREQ, and V/I output variable, V/I OUT, respectively. The values of these constants have been previously calculated by execution of block 645 in menu routine 600 (see FIG. 6) and are now merely read from NOVRAM. Since, the value of $RATE_a$ (which is reset to zero if the mass flow rate is below the zero flow cutoff value) is multiplied by the V/I CONSTANT to generate the value of variable V/I OUT, the analog V/I output provides a proportional representation of the mass flow rate even if the mass flow rate is less than the zero flow cutoff value. In contrast, since the value of the variable RATE is used to generate the value of variable OUTPUT FREQ, the frequency output becomes zero for any measured mass flow rate less than or equal to the low flow cutoff value. The value of variable OUTPUT FREQ is used by the microprocessor to set the output frequency of the frequency output.

Thereafter, execution proceeds to decision block 1064 which determines whether the user has depressed the menu pushbutton. In the event this pushbutton has been depressed, execution proceeds to block 1067 which, when executed, invokes menu routine 600. This permits the user to sequence through the menu after system initialization has been completed and execution remains within interrupt wait loop and diagnostic routine 560 (see FIG. 5A-5D). Thereafter, as shown in FIGS. 10A-10D, execution proceeds to decision block 1070. In the event the menu pushbutton has not been depressed, then execution proceeds directly to decision block 1070. Block 1070, when executed, checks the status of a zero flow calibration switch, which as discussed is located within the enclosure of the meter electronics, to determine whether the meter electronics should initiate a zero flow calibration. If this switch is appropriately positioned, execution proceeds to block 1073, via the YES path from decision block 1070, to invoke Zero Flow Offset Routine 1300, shown in FIGS. 13A and 13B and discussed in detail later. In essence, this routine measures the time difference associated with a zero mass flow through the meter and stores the resulting offset value in NOVRAM. This offset value is subsequently used by time difference measurement interrupt routine 1400 to calculate the filtered sum of the four time difference values ($TS_f$) that is attributable to actual mass flow through the meter. From there, as shown in FIGS. 10A-10D, execution proceeds to block 1074. Alternatively, if a zero flow calibration is not to be performed, then execution directly proceeds to block 1074, via the NO path from decision block 1070. Lastly, block 1074, when executed, sets the diagnostic flag so as to appropriately instruct the microprocessor to execute diagnostics while it is subsequently waiting for interrupts to occur, i.e. during execution of interrupt wait loop and diagnostic routine 560 within main program 500 (see FIGS. 5A–5D). Once this flag has been set, execution exits from 100 msec Interrupt Routine 1000.

7. Rate Factor Calculation Routine 1100

Figure 11:
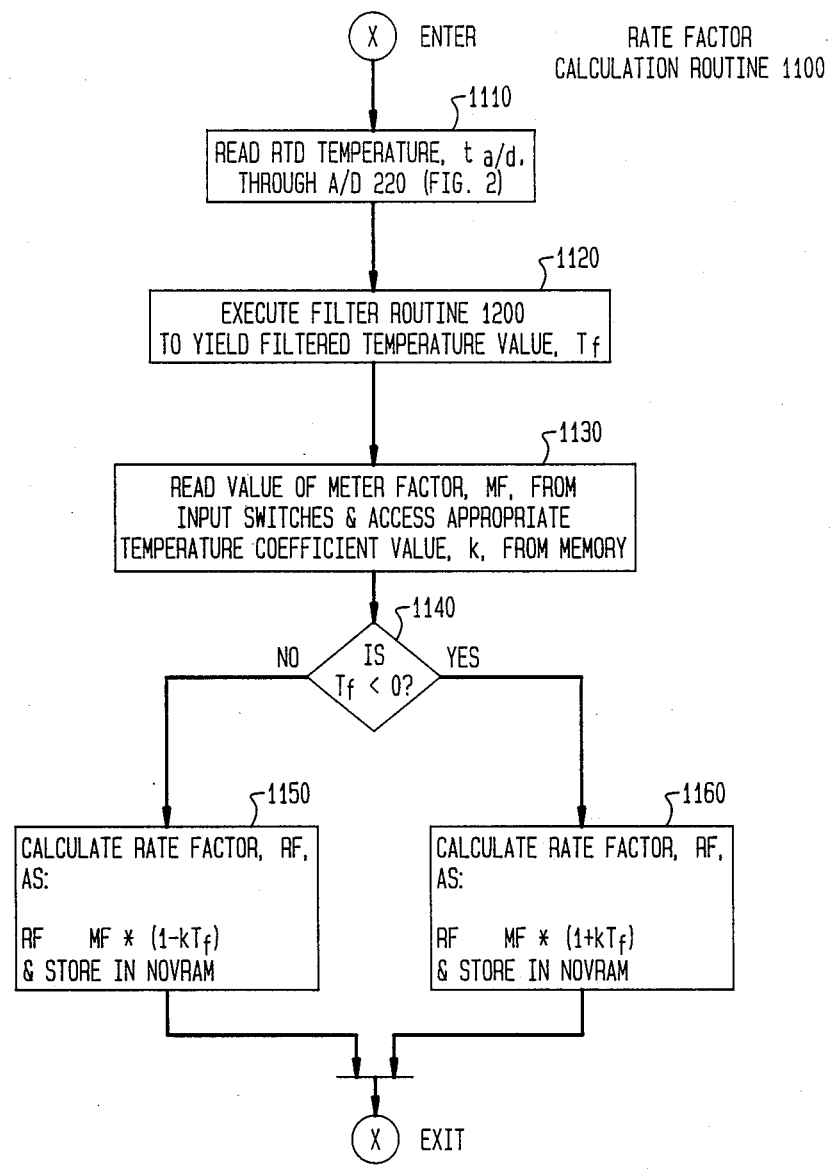
FIG. 11 depicts a flowchart of Rate Factor Calculation Routine 1100 that is executed as part of 100 msec interrupt routine 1000 shown in FIGS. 10A-10D.

A flowchart of Rate Factor Calculation Routine 1100 is depicted in FIG. 11. As discussed, this routine calculates a temperature compensated rate factor (RF) for the particular size meter assembly that is connected to the meter electronics.

Upon entry into this routine, block 1110 is executed which reads the tube temperature as measured by RTD 190 (see FIGS. 1 and 2) and digitized by A/D converter 220. The resulting measured temperature, $T_{a/d}$, is then digitally filtered by block 1120, as shown in FIG. 11, to yield filtered temperature value $T_f$. This block, when executed, invokes digital filter routine 1200, shown in FIG. 12 and discussed below. Thereafter, block 1130, as shown in FIG. 11, is executed to read the meter factor (MF) which has been pre-programmed through a series of input switches (typically five BCD switches) located within the enclosure of the meter electronics. The meter factor is a gain factor which is determined during factory calibration of the particular meter assembly that will be used with the meter electronics. Specifically, this factor represents the gain required by the meter electronics to produce the minimum electrical output value at the minimum flow rate specified for the meter assembly and is specified in units of grams/microsecond/second. This factor will vary from between 0.12639 for a D6 size meter to 1262.5 for the D600 which are the smallest and largest meter manufactured by the present assignee. In addition, given the meter type, block 1130 accesses the value of the spring constant, k, that is appropriate for the meter assembly in use, specifically the spring constant of the material used to construct the flow tubes, from a look up table stored in EPROM. For example, if this meter has 316L type stainless steel flow tubes, the spring constant of stainless steel, 0.000513, is used.

At this point, execution passes to decision block 1140 to calculate the rate factor, RF. This factor is a linear function of the meter factor, the spring constant and the filtered temperature value. Since the midpoint of the measured temperature range is referenced to 0 degrees Centigrade, the measured temperature and hence the filtered temperature values can be either positive or negative. To properly calculate the rate factor which increases with decreasing temperature (the flow tubes become stiffer at colder temperatures), execution first proceeds to decision block 1140 which tests the sign of the filtered temperature value, $T_f$. If the filtered temperature value is positive, then block 1150 is executed to calculate the rate factor as:

$$RF = MF * (1 - k\, T_f). \quad (9)$$

Alternatively, if the measured temperature value, $T_f$, is negative, then block 1160 is executed to calculate the rate factor as:

$$RF = MF * (1 + k\, T_f). \quad (10)$$

Once the rate factor is calculated, its value is stored in the microprocessor RAM for subsequent use. Thereafter, execution exits from Rate Factor Calculation Routine 1100 from either block 1150 or block 1160.

8. Filter Routine 1200

A flowchart of Filter Routine 1200 is depicted in FIG. 12. As discussed, this routine is separately used to digitally filter time difference sum and temperature measurements. This routine implements a two pole critically damped digital filter.

Upon entry into this routine, block 1210 is executed to access either one of two sets of values from NOV-RAM based upon whether the incoming measurement is either a time difference sum ($T_{SUM}$) or a tube temperature value ($T_{a/d}$). Each set contains values of two filter parameters, $T_1$ and $T_2$. The values of all four of these filter parameters are initially set to zero during system initialization. Once the desired set of two values of filter parameters $T_1$ and $T_2$ has been accessed, block 1220 is executed to set the value of variable D equal to the value of the incoming measurement. Thereafter, block 1230 is executed to update the value D as being the difference between the incoming measurement value and the current value of filter parameter $T_1$. Next, block 1240 is executed to access the value of the filter time constant (TC) that has been previously selected by the user and stored in NOVRAM. Once this occurs, block 1250 is executed to calculate the following equations, which together implement a two pole critically damped filter:

$$T_1 = T_1 + \frac{D}{2^{TC}} \quad (11)$$

and $$T_2 = T_2 + \frac{T_1 - T_2}{2^{TC}}. \quad (12)$$

Once these equations have been calculated, block 1260 is executed to store the new values of filter parameters $T_1$ and $T_2$ in appropriate locations NOVRAM for the use during the next iteration through the filter for the same type of incoming measurement (i.e. $T_{SUM}$ or $T_{a/d}$). Finally, block 1270 is executed to appropriately store the filter output value, i.e. the value of filter parameter $T_2$, as either the value of the filtered time difference sum, $TS_f$, or the value of the filtered tube temperature, $T_f$, in NOVRAM. Thereafter, execution exits from Filter Routine 1200.

9. Zero Flow Offset Routine 1300

Figures 13, 13A:
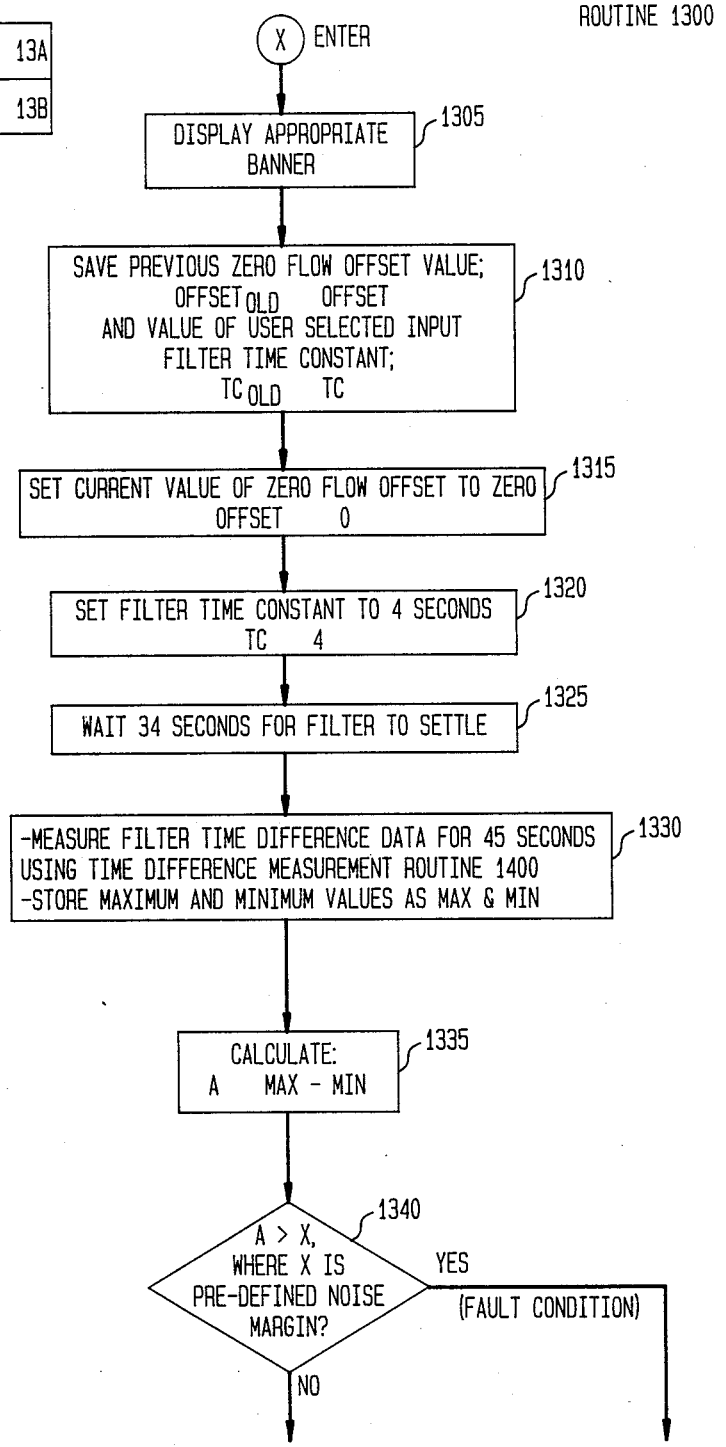
FIG. 13 shows the proper alignment of the drawing sheets for FIGS. 13A and 13B.
FIGS. 13A and 13B collectively depict a flowchart of Zero Flow Offset Routine 1300 that is executed as part of 100 msec interrupt routine 1000 shown in FIGS. 10A–10D.
Figure 13B:
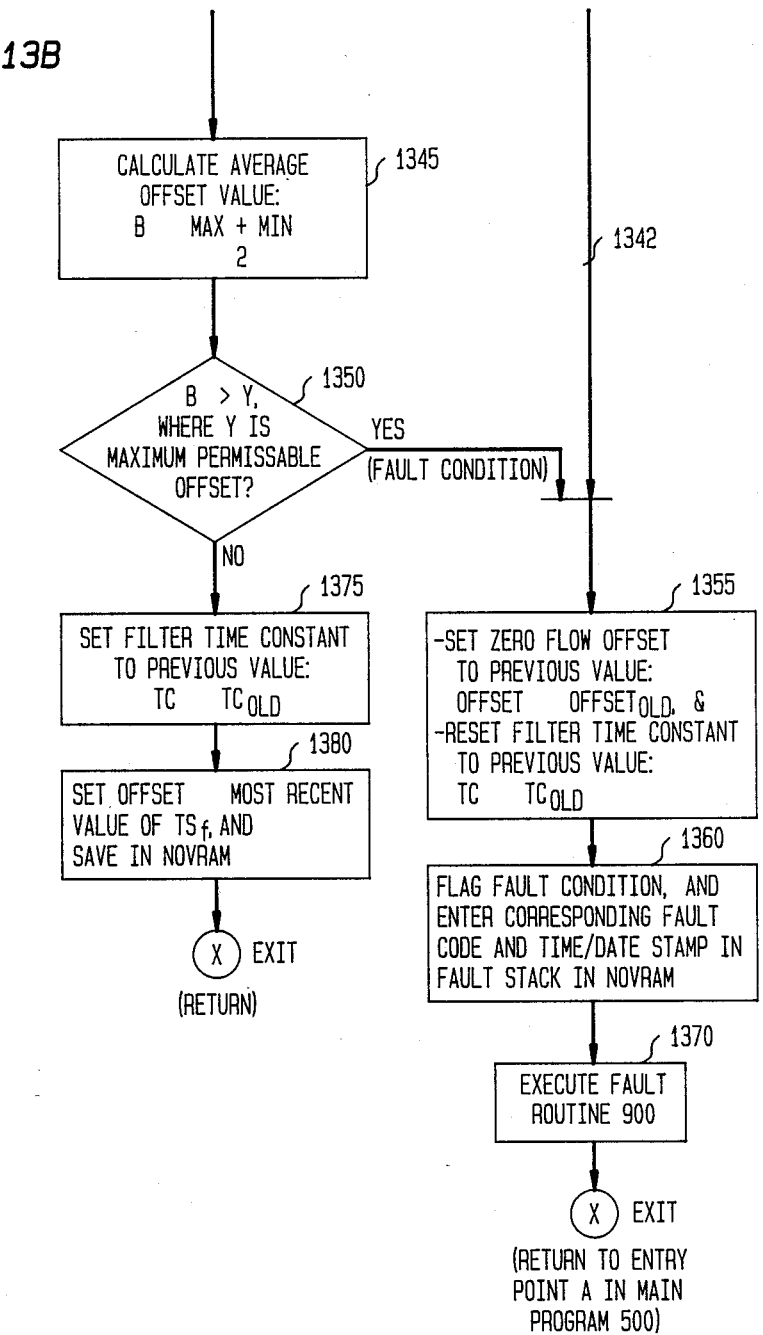

A flowchart of Zero Flow Offset Routine 1300 is depicted in FIGS. 13A and 13B, with the correct alignment of the drawing sheets for these figures shown in FIG. 13. As discussed, this routine measures time differences associated with zero flow through the meter assembly and thereafter generates an appropriate offset value, OFFSET, which is stored in NOVRAM for subsequent use. As discussed, this routine is invoked by setting the zero flow calibration switch, located within the enclosure of the meter electronics, to an appropriate position. No flow must be occurring through the meter during the entire interval of time that this routine is executing.

Upon entry into this routine, block 1305 is executed to display an appropriate banner, such as "ZERO FLOW CAL. IN PROGRESS" in order to indicate the status of the system to the user during execution of this routine. Thereafter, execution proceeds to block 1310 which, when executed, saves the previous values of the zero flow offset and the filter time constant as OFFSET$_{old}$ and TC$_{old}$, respectively. These values are preserved for possible subsequent use as the current zero flow offset and filter time constant in the event of a fault condition, as described below. Next, block 1315 is executed to set the current value of the zero flow offset to zero. Thereafter, execution passes to block 1320 which sets the filter time constant to four seconds. Once this has occurred, block 1325 is executed which merely times a thirty four second interval (a period equal to 8.5 time constants) to enable the output of the filter to settle to 0.1% of its steady state value.

At this point, block 1330 is executed. This block repetitively allows time difference measurement interrupt routine 1400, as shown in FIGS. 15A–15E, to execute for forty five seconds. Each value of the filtered time difference sum, TS$_f$, produced by routine 1400 is compared to past values that have been generated during this forty five second interval. At the conclusion of this interval, the resulting maximum and minimum values of the filtered time difference sum are stored as values MAX and MIN, respectively, by block 1330. Next, block 1335 is executed to compute the difference between the MAX and MIN values and assign that difference to temporary variable A. Once this has occurred, execution passes to decision block 1340 which tests whether the value of A exceeds a pre-determined noise margin value, X, that has been previously stored as a constant in EPROM. If the MAX-MIN difference is larger than the value X, this indicates excess noise has occurred and has corrupted the time difference measurements that had been obtained through execution of block 1330. This represents a fault condition. As a result, execution passes, via YES path 1342 from decision block 1340, to block 1355. This block accesses the previous value of the zero flow offset, OFFSET$_{old}$, and sets the current value of the zero flow offset equal to the previous value. In addition, this block also resets the filter time constant to its previous value, TC$_{old}$, as selected by the user. Thereafter, block 1360 is executed which flags the occurrence of a fault condition, and enters the corresponding fault code and its time/date stamp as the latest entry in the fault stack in NOVRAM. At this time, execution then passes to block 1370 which invokes fault routine 900, as shown in FIG. 9 and previously discussed. After the user has intervened to appropriately clear the fault, execution exits from Zero Flow Offset Routine 1300 and returns to entry point A in main program 500.

Alternatively, if the MAX-MIN difference is less than or equal to the pre-defined noise margin, thereby indicating proper operation, execution proceeds, via the NO path from decision block 1340, to block 1345. This latter block, when executed, calculates the average offset value as being the average of the MAX and MIN values and assigns the average value to temporary variable B. Next, decision block 1350 is executed to determine whether the magnitude of the average value exceeds a pre-defined value, Y, i.e. whether the average offset value is simply too large either positively or negatively. The value of Y has been previously stored as a constant in EPROM. In the event the average value of the offset is too large in either direction, then a fault has occurred. In this case, execution proceeds, via the YES path from decision block 1350, to block 1355 which has been discussed above. Alternatively, if the magnitude of the average offset value is sufficiently small, then execution proceeds, via the NO path from decision block 1350, to block 1375. This latter block, when executed, restores the filter time constant to the previous value as selected by the user. Thereafter, block 1380 is executed which sets the value of the zero flow offset equal to the value of the most recent filtered time difference, measured through execution of block 1330. This new zero flow offset value is then used to update the offset value, OFFSET, that is stored in NOVRAM for subsequent use. At this point, execution exits from Zero Flow Offset Routine 1300.

10. Time Difference Measurement Interrupt Routine 1400 (simplified view)

Time Difference Measurement Interrupt Routine 1400 not only determines the value of the filtered time difference sum, TS$_f$, as discussed, but also executes a variety of diagnostic operations. For that reason, the software for this routine is rather complex. Therefore, to facilitate understanding, the operation of Time Difference Measurement Interrupt Routine 1400 will be described in two stages using two flowcharts. The discussion will begin with the first flowchart, shown in FIGS. 14A and 14B, which only includes the steps used to process individual time difference measurements T$_A$, T$_B$, T$_C$ and T$_D$ into the filtered time difference sum, TS$_f$, that is proportional to the mass flow rate of the fluid that is then flowing through the meter assembly. As such, this flowchart is a simplified version of routine 1400. Thereafter, the discussion will proceed to the second flowchart, shown in FIGS. 15A–15E, which provides a detailed depiction of routine 1400 and, for ease of understanding, incorporates the blocks shown in FIG. 14.

Figure 14B:
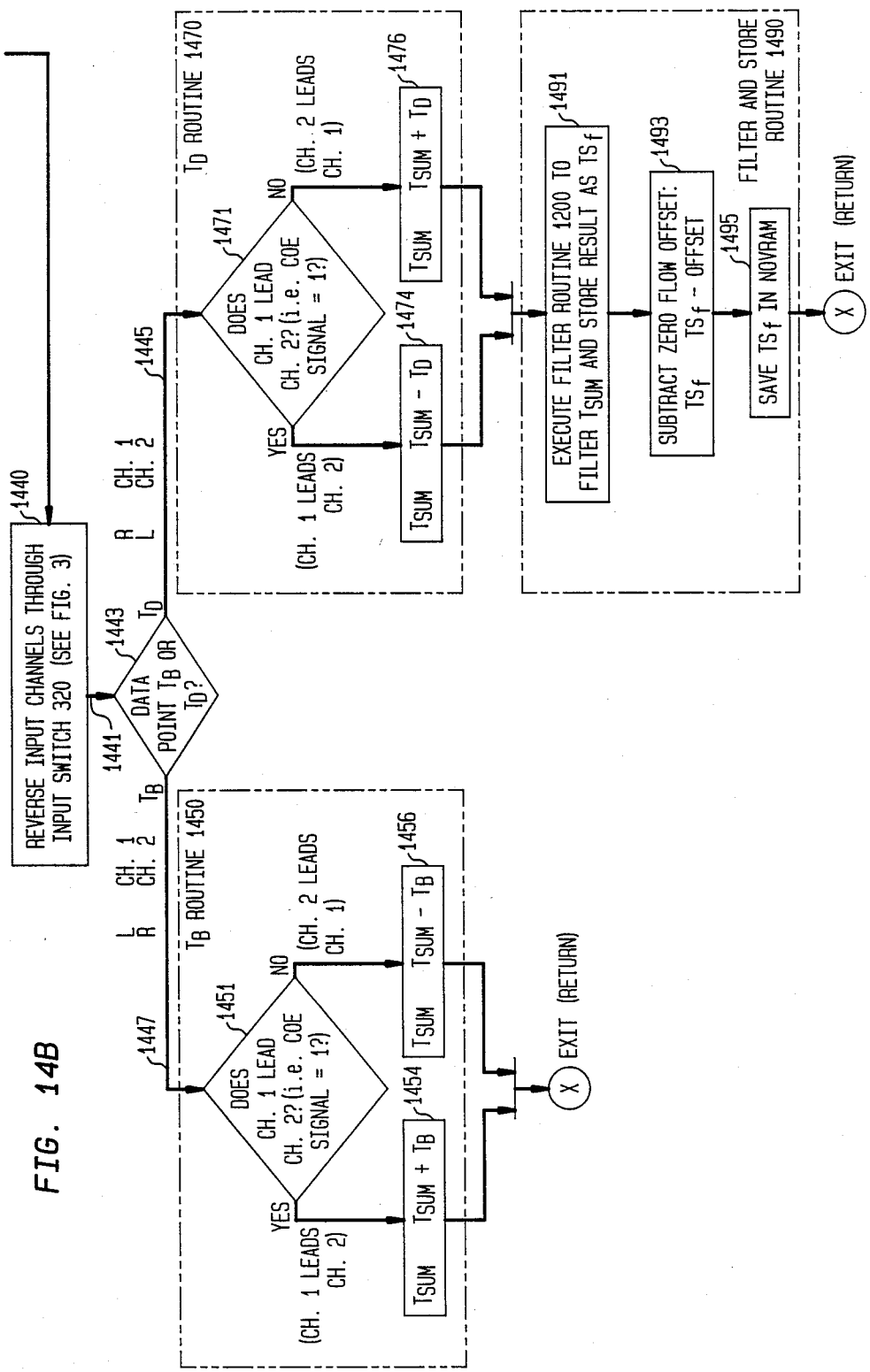

Now, as noted, a simplified flowchart of Time Difference Measurement Routine 1400 is collectively depicted in FIGS. 14A and 14B, with the correct alignment of the drawing sheets for these figures shown in FIG. 14. This flowchart shows the processing steps required to produce a time difference sum value, T$_{SUM}$, as per equation (5) above, and a filtered time difference sum value, TS$_f$, that are both substantially proportional to the mass flow rate of the fluid then passing through the meter assembly. Inasmuch as these processing steps both obtain data from and control the operation of time difference measurement circuit 30 shown in FIG. 3A, the reader should also refer to this FIG. 3 during the following discussion of FIGS. 14A and 14B and FIGS. 15A–15E.

Upon entry into routine 1400, block 1401 is executed to read the contents of counter 370 located within time difference measurement circuit 30. The contents of this counter, as discussed, represent a measured time difference between the two input channels, i.e. channel 1 and channel 2, to which the left and right velocity signals are alternately connected via input switches 320. Once the contents have been read, block 1404 is executed to reset the contents of this counter to zero in preparation for the next time difference measurement. This block also resets the contents of double pulse detector 360, as discussed above. Thereafter, decision block 1406 is executed to classify the incoming measurement obtained from counter 370 as either T$_A$ or T$_C$, or T$_B$ or T$_D$.

This classification is based upon the status of the EOML signal produced by end of measurement circuit 330 located within time difference measurement circuit 30. The EOML signal, as shown in FIG. 3B, will be high during measurements of $T_A$ and $T_C$ and low during measurements of $T_B$ and $T_D$. Consequently, the status of this signal is tested by the microprocessor during execution of decision block 1406. Therefore, depending upon whether this signal is either high or low execution proceeds, as shown in FIGS. 14A and 14B via path 1412, to decision block 1414 for measurements $T_A$ or $T_C$, or via path 1409, to block 1440, for measurements $T_B$ and $T_D$.

Now, let us consider for the moment only the measurements $T_A$ and $T_C$. Decision block 1414, when executed, determines whether the individual time difference measurement just obtained from counter 370 is either $T_A$ or $T_C$. This determination is specified by the commands provided to input switch 320 by the microprocessor. In particular, if the switch has been set to route the left and right velocity signals to channels 1 and 2, respectively, then the incoming measurement is time difference $T_A$. Alternatively, if switch 320 has been set to route the velocity signals in the reverse manner, then the incoming time difference is $T_C$. Therefore, if this measurement is $T_A$, then execution proceeds, via path 1418 from decision block 1414, into $T_A$ routine 1420. Alternatively, if this measurement is $T_C$, then execution proceeds, via path 1416 from decision block 1414, to $T_C$ routine 1430. Routines 1420 and 1430 appropriately combine the values of incoming time difference measurements $T_A$ and $T_C$, respectively, into the value of the time difference sum.

Upon entry into $T_A$ routine 1420, execution proceeds to block 1421 which resets the value of the time difference sum, $T_{SUM}$, to zero. Thereafter, execution passes to decision block 1423 to determine whether the incoming time difference measurement $T_A$ is leading or lagging and thereby should be additively or subtractively combined as part of the time difference sum. In particular, the output of COE circuit 340 specifies whether the signal appearing on channel 1 either leads or lags that appearing on channel 2. Consequently, in the event the status of the COE signal for the incoming time difference measurement is high, then the channel 1 signal leads the channel 2 signal. In this case, decision block 1423 routes execution to block 1426 which adds time difference measurement $T_A$ to the sum. Execution then exits from routine 1420 and also from routine 1440, as shown in FIGS. 14A and 14B. Alternatively, in the event the COE signal is low, then the channel 1 signal lags the channel 2 signal. In that case, decision block 1423 routes execution to block 1427 which, when executed, subtracts time difference measurement $T_A$ from the sum. Execution then exits from routine 1420 and also from routine 1400, as shown in FIGS. 14A and 14B.

Now, in the event $T_C$ routine 1430 is to be executed, execution proceeds to decision block 1431. This block tests the status of the COE signal, in the same fashion as did decision block 1423, to determine whether the value of time measurement $T_C$ should be added to or subtracted from the value of the time difference sum, $T_{SUM}$. In the event the channel 2 signal leads the channel 1 signal, then execution passes, via the NO path from decision block 1431, to block 1434, which, when executed, adds time difference measurement value $T_C$ to the value of the sum. Alternatively, if the channel 1 signal leads the channel 2 signal, then execution proceeds, via the YES path from decision block 1431, to block 1436 which, when executed, subtracts the value of time difference measurement $T_C$ from the value of the sum. After either block 1434 or block 1436 has been executed, execution exits from both $T_C$ routine 1430 and from routine 1400, as shown in FIGS. 14A and 14B.

Alternatively, if decision block 1406 has classified the incoming time difference measurement as being either $T_B$ or $T_D$, then, as noted, execution is routed from this decision block, via path 1409, to block 1440. This latter block, when executed, instructs switch 320 to reverse the input connections, i.e. if the left and right velocity signals were applied to channels 1 and 2, respectively, for two immediately prior measurements, then for the following two measurements the left and right velocity signals will be applied to channels 2 and 1, respectively. Once input switch 320 has appropriately reversed its setting, execution proceeds, via path 1441, to decision block 1443.

Decision block 1443, when executed, determines whether the individual time difference measurement just obtained from counter 370 is either $T_B$ or $T_D$. This determination is given by the commands provided to input switch 320 by the microprocessor. In particular, if the switch has been set to route the left and right velocity signals to channels 1 and 2, respectively, then the incoming time difference measurement is $T_B$. Alternatively, if switch 320 has been set to route the velocity signals in the reverse manner, then the incoming time difference measurement is $T_D$. Therefore, if this time difference measurement is $T_B$, then execution proceeds, via path 1447 from decision block 1443, into $T_B$ routine 1450. Alternatively, if this measurement is $T_D$, then execution proceeds, via path 1445 from decision block 1443, to $T_D$ routine 1470. Routines 1450 and 1470 appropriately combine the values of incoming time difference measurements $T_B$ and $T_D$, respectively, into the value of the time difference sum.

Upon entry into $T_B$ routine 1450, execution proceeds to decision block 1451 to determine whether the incoming time difference measurement $T_B$ is leading or lagging and thereby should be additively or subtractively combined as part of the time difference sum. In particular, as noted, the output of COE circuit 340 specifies whether the signal appearing on channel 1 either leads or lags that appearing on channel 2. If the COE signal is high thereby indicating that the channel 1 signal leads the channel 2 signal, then decision block 1451 routes execution to block 1454 which adds the value of time difference measurement $T_B$ to the sum. Alternatively, in the event the COE signal is low thereby indicating that the channel 1 signal lags the channel 2 signal, then decision block 1451 routes execution to block 1456. Block 1456, when executed, subtracts the value of time difference measurement $T_B$ from the sum. Once block 1454 or 1456 has been executed, execution exits from routine 1450 and also from routine 1400, as shown in FIGS. 14A and 14B.

Now, in the event $T_D$ routine 1470 is to be executed, execution proceeds to decision block 1471. This block tests the status of the COE signal, in the same fashion as did decision block 1423, to determine whether the value of time measurement $T_D$ should be added to or subtracted from the value of the time difference sum, $T_{SUM}$. In the event the channel 1 signal leads the channel 2 signal, then execution passes, via the YES path from decision block 1471, to block 1474, which, when executed, subtracts the value of time difference measurement $T_D$ from the value of the sum. Alternatively, if the channel 1 signal lags the channel 2 signal, then execution proceeds, via the NO path from decision block 1471, to block 1476 which, when executed, adds the value of time difference measurement $T_D$ to the value of the sum. After either block 1434 or block 1436 has been executed, execution exits from both $T_C$ routine 1470. At this point, the values of all four time difference measurements $T_A$, $T_B$, $T_C$ and $T_D$ have been appropriately combined to yield a time difference sum value, $T_{SUM}$.

Since the input velocity signals are switched between the channels and two time difference measurements are made through each channel and four resulting time difference values are combined into the sum value, the error components present in each individual time difference measurement will cancel in the sum value. Consequently, as discussed above in connection with equations (1)–(5), the value of the time difference sum will not be affected by any differences in the electrical characteristics between the two input channels—resulting from various factors such as offsets, aging, drift and/or temperature induced variations in the characteristics of the analog components used in each channel. Thus, a highly accurate time difference sum value results.

Execution now proceeds from $T_D$ routine 1470 to Filter and Store Routine 1490. This routine filters the time difference sum value, subtracts the zero flow offset value and stores the result in NOVRAM. Specifically, to reduce noise and increase resolution, the time difference sum value, $T_{SUM}$, is digitally filtered. This occurs by block 1491 which, when executed, invokes filter routine 1200, as discussed. The resulting filtered time difference sum value is stored in NOVRAM, by routine 1200, as variable $TS_f$. Next, execution proceeds to block 1493 which subtracts the current value of the zero flow offset, OFFSET, that has been previously stored in NOVRAM from the value $TS_f$. Thereafter block 1495 is executed to store the resulting value back in NOVRAM as the filtered time difference sum value, $TS_f$, for subsequent use by 100 msec interrupt routine 1000, as discussed above. At this point, execution exits from routine 1400, as shown in FIGS. 14A and 14B.

11. Time Difference Measurement Interrupt Routine 1400 (detailed view)

A detailed flowchart of Time Difference Measurement Interrupt Routine 1400 is collectively depicted in FIGS. 15A–15E, with the correct alignment of the drawing sheets for these figures shown in FIG. 15.

Upon entry into this routine, block 1501 is first executed to decrement the contents of a loop counter, IRDACOUNT, by one. This counter is used to monitor the number of iterations through this routine such that two diagnostic flags can be reset to zero every 16 iterations. In particular, execution proceeds to decision block 1503 which determines whether the value of this counter has just reached zero. If not, then execution proceeds, via the NO path from decision block 1503, to decision block 1510. Alternatively, if the loop counter has been decremented to zero, then execution proceeds, via the YES path from decision block 1503, to block 1506. This latter block, when executed, resets the value of both the Input Overflow and Excess Noise flags to zero. The Input Overflow flag is set by the microprocessor if it detects that a measured time difference extends beyond the maximum capacity of 16-bit counter 370 (see FIG. 3A) thereby causing the counter to overflow. The Excess Noise flag is set by the microprocessor in the event the EXCESS NOISE signal, produced by time difference measurement circuit 30 and discussed above, is high thereby indicating that either or both velocity sensor signals contain noise. Once both flags have been reset, execution proceeds to block 1508 which loads the value "16" into the loop counter for subsequent decrementation. Execution then proceeds to decision block 1510.

Figure 15A:
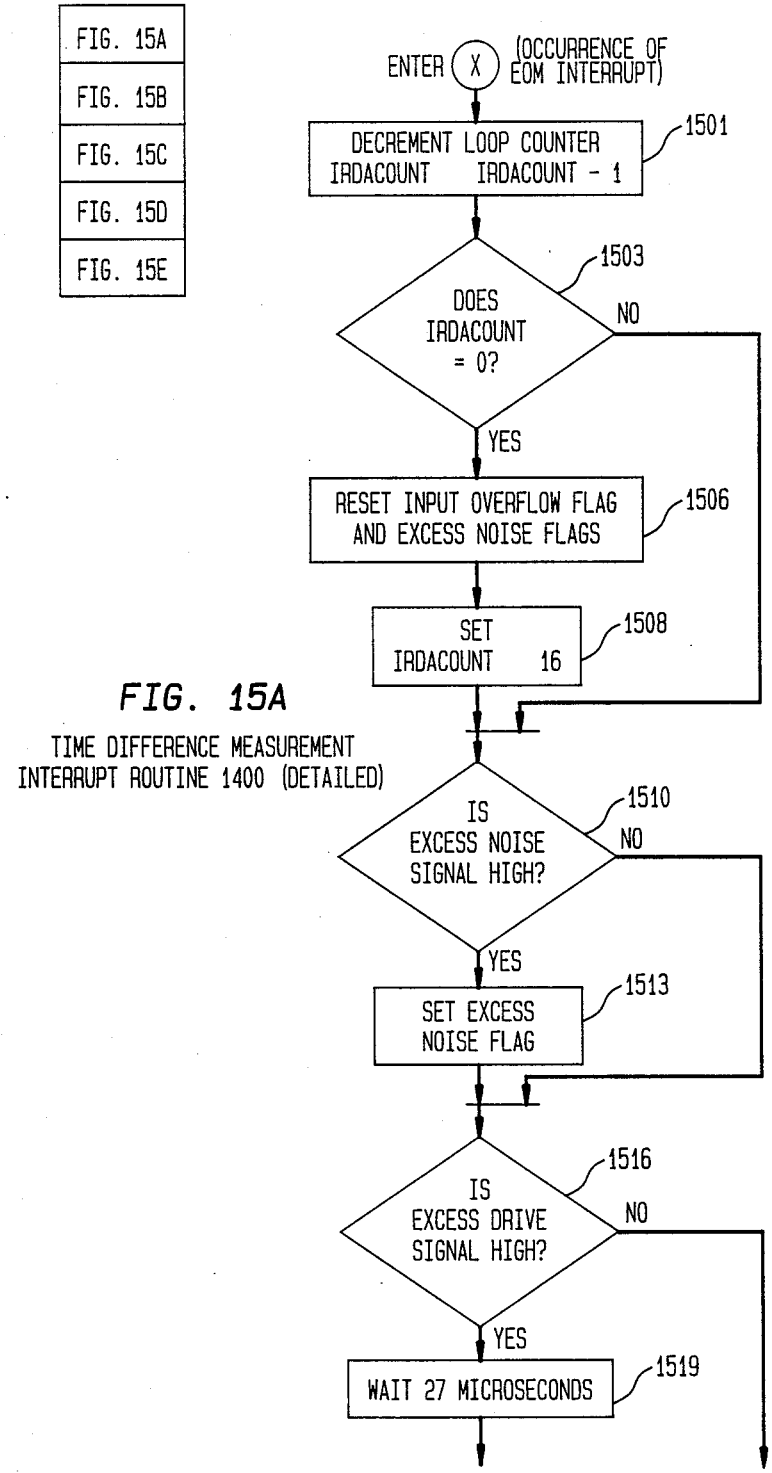
FIGS. 15A–15E collectively depict a detailed flowchart of Time Difference Measurement Interrupt Routine 1400, as embodied in the inventive system.
Figure 15B:
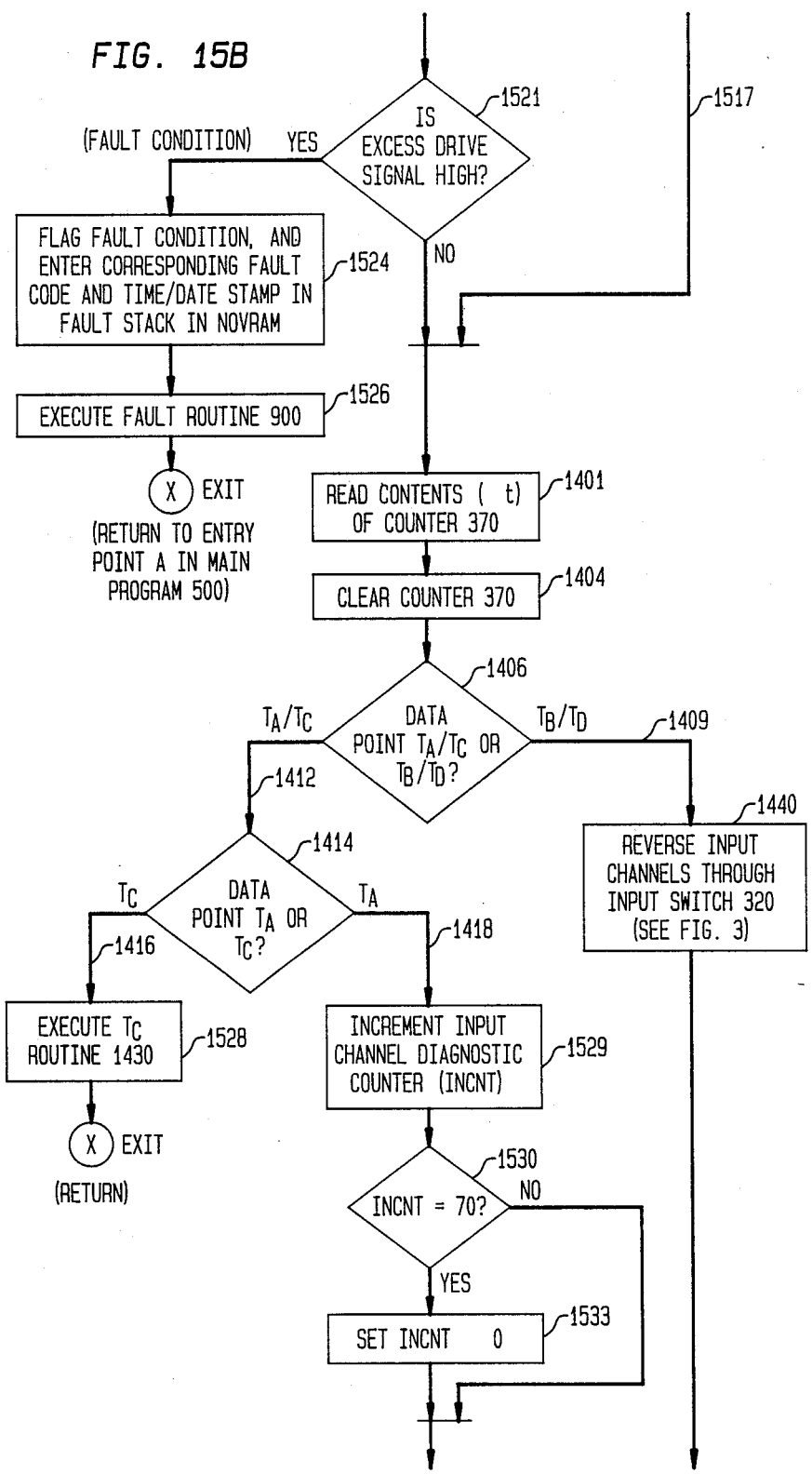
Figure 15C:
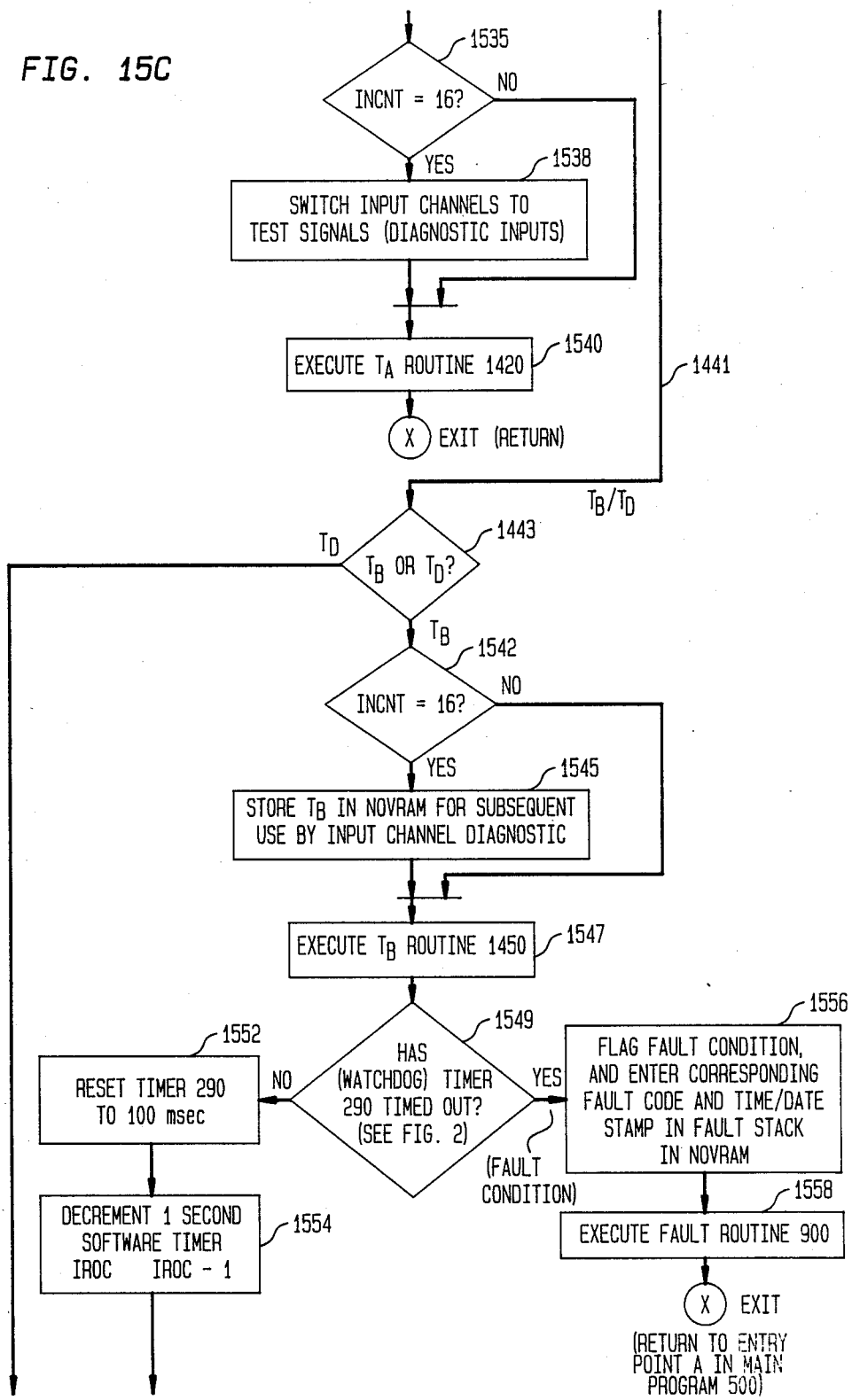
Figure 15D:
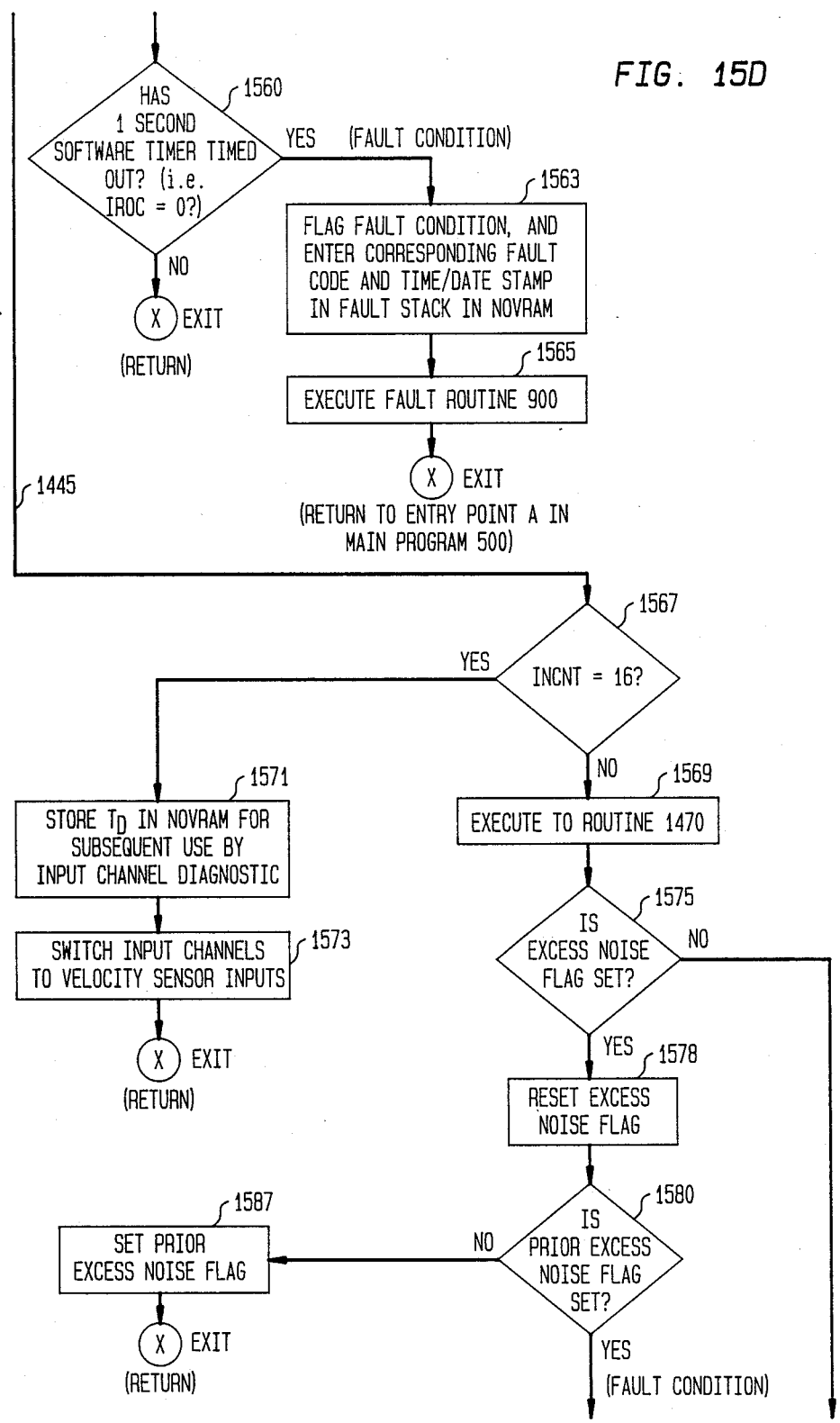
Figure 15E:
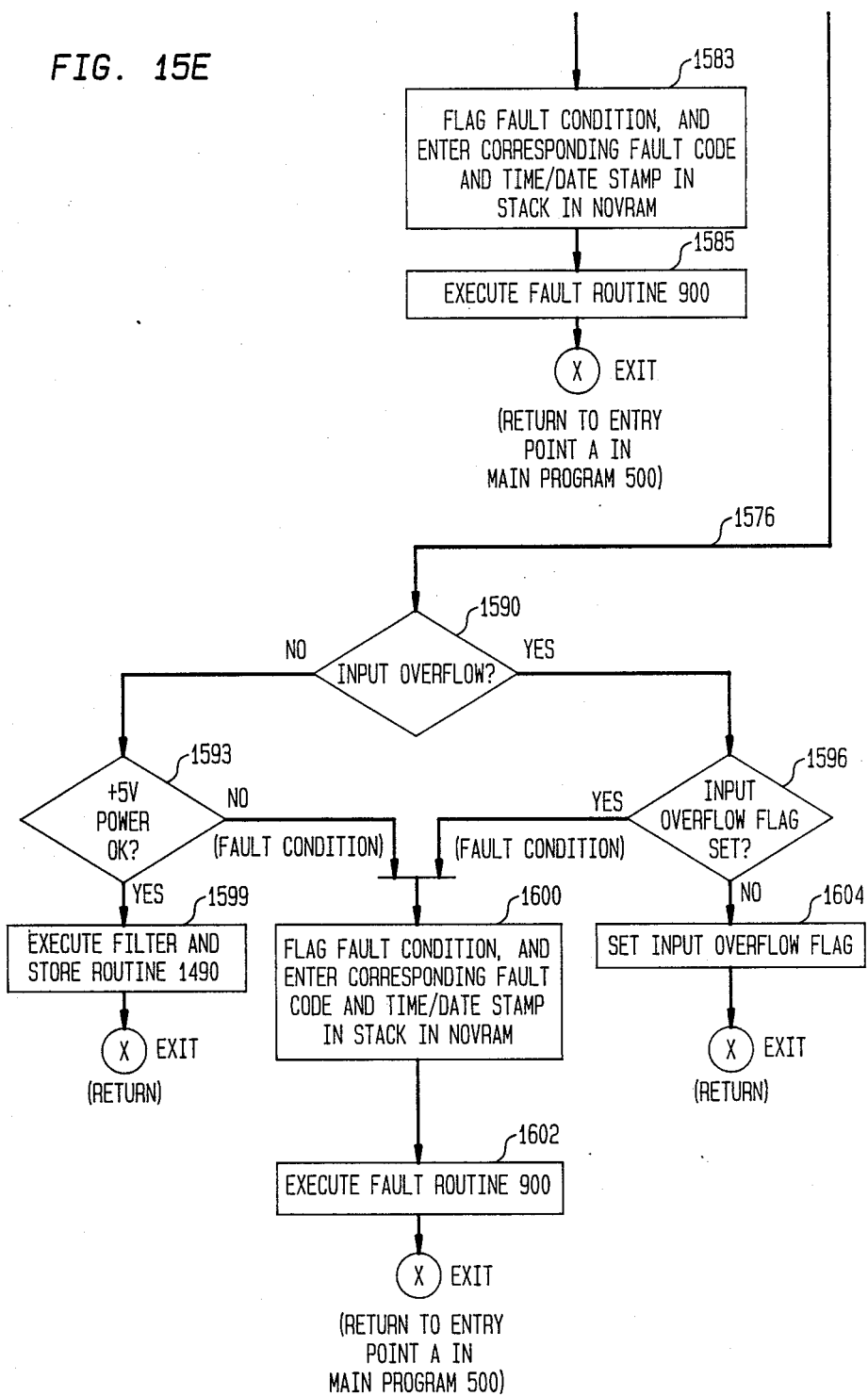

As a diagnostic measure, decision block 1510 checks the status of the EXCESS NOISE signal produced by time difference measurement circuit 30 (see FIG. 3A). In the event that this signal is high, then as shown in FIG. 15A, execution proceeds, via the YES path from decision block 1510, to block 1513 which sets the Excess Noise flag. Execution then proceeds to decision block 1516. Alternatively, if the EXCESS DRIVE signal is low, execution is directed, via the NO path from decision block 1510, to decision block 1516. This latter decision block tests the status of the EXCESS DRIVE signal produced by drive circuit 40, shown in FIG. 4 and discussed above. In the event the level of this signal is high, then execution proceeds, via the YES path from decision block 1516, to block 1519. Since the high level may have been caused by a "glitch", block 1519, when executed, merely consumes 27 microseconds of processing time, before passing execution to decision block 1521. This decision block re-tests the status of the EXCESS DRIVE signal. In the event the level of the EXCESS DRIVE signal still remains high, then a fault has occurred. In this case, decision block 1521 routes execution to block 1524. This block, when executed, flags the fault condition and enters the corresponding fault code along with the time/data stamp as the most recent entry into the fault stack stored in NOVRAM. Thereafter, block 1526 executes to invoke fault routine 900. Only after the user has intervened to reset the system will execution exit from routine 1400 and return to entry point A in main program 500 (see FIG. 5) Alternatively, in the event a glitch did indeed occur in this signal, then the glitch will most likely have vanished during the prior 27 microsecond interval. Hence, the level of the EXCESS DRIVE signal will not be low. In this case, decision block 1521 will route execution, via its NO path, to block 1401. Block 1401 as noted, will read the current contents of counter 370 as an incoming time difference measurement. Thereafter, block 1404 will execute to clear the contents of both counter 370 and double pulse detector 360.

At this point, execution proceeds to decision block 1406 to classify the incoming time difference measurement as either $T_A/T_C$ or $T_B/T_D$. As noted above in connection with FIGS. 14A and 14B, execution then proceeds either, via path 1412, to decision block 1414 to further classify the measurement as either $T_A$ or $T_C$ or, via path 1409, to block 1440 to instruct input switch 320 to reverse the input channel connections. Decision block 1414 routes execution to path 1418 or path 1416 if the incoming measurement is either $T_A$ or $T_C$, respectively. In the event the incoming time difference measurement is $T_C$, then block 1528 is executed to invoke $T_C$ routine 1430, as discussed above in conjunction with FIGS. 14A and 14B, to appropriately process the incoming time difference measurement as $T_C$. Alternatively, if the incoming measurement is $T_A$, then decision block 1414 routes execution, via path 1418, to block 1529. This latter block increments the contents of the Input Channel Diagnostic Counter, INCNT. This counter is incremented by one at the occurrence of each new value of $T_A$ and is used to identify the point in time at which input switch 320 is to be instructed to apply the reference signals to the input channels for diagnostic purposes. In particular, this counter is incremented once for every new set of four time difference measurements. After the 16th out of every 70 sets of time difference measurements has occurred, the input switch applies both reference signals through time measurement circuit 30 to test its performance. If the flow tubes vibrate at a resonant frequency of approximately 85 Hz, then this diagnostic occurs once per every 1.6 seconds. Specifically, after the counter INCNT has been incremented, execution passes to decision block 1530 which tests the value of this counter. If the value equals "70", then execution is routed, via the YES path from this decision block, to block 1533 which resets the value of this counter to zero. Otherwise or after block 1533 executes, execution proceeds to decision block 1535. This block tests whether the current count stored within counter INCNT equals 16. If this count equals 16, then execution proceeds, via the YES path from decision block 1535, to block 1538 which, when executed, instructs input switch 320 to route both reference signals, in lieu of the velocity signals, to channels 1 and 2. Thereafter or in the event the current count is not equal to "16", then block 1540 executes. This block invokes $T_A$ routine 1420, as discussed above, to appropriately process the incoming time difference measurement as $T_A$.

Alternatively, if the incoming time difference measurement is either $T_B$ or $T_D$ and block 1440 has been executed, then execution proceeds, via path 1441, to decision block 1443. At this point, decision block 1443, as discussed above, further classifies the incoming time difference measurement as either $T_B$ or $T_D$. In the event this measurement is $T_B$, then execution proceeds to decision block 1542. This decision block also examines the current loop count stored in INCNT. In the event this count is "16" which indicates that the reference signals have now been switched through input switch 320 into time difference measurement circuit 30, then block 1545 is executed, via the YES path emanating from decision block 1542. Block 1545, when executed, stores the value of the incoming time measurement value, now $T_B$, in a separate location in NOVRAM for subsequent use during execution of the input channel diagnostic. Thereafter or if this count does not equal "16", then block 1547 is executed. Block 1547, when executed, invokes $T_B$ routine 1450, as discussed above, to appropriately process the incoming time difference measurement as $T_B$. At this point, various diagnostics relating to the watch-dog timer are executed. In particular, execution proceeds to decision block 1549 which tests whether the watch dog timer (timer 290) has reached the end of its timing interval (i.e. whether this timer has timed out). If this timer has timed out, this indicates that this routine (time difference measurement interrupt routine 1400) has not executed within the past 100 milliseconds. This signifies erratic operation most likely caused by a fault. Consequently, execution proceeds, via the YES path from decision block 1549, to block 1556. This latter block, when executed, flags the fault condition and enters the corresponding fault code along with the time/date stamp as the most recent entry in the fault stack. Thereafter, block 1558 is executed to invoke fault routine 900. Execution proceeds from this routine only in the event the user has intervened to reset the system. Once this occurs, execution proceeds to entry point A in main program 500 (see FIG. 5). Alternatively, in the event the watch-dog timer has not timed out, execution proceeds, via the NO path from decision block 1549, to block 1552 which resets this timer to begin a new 100 msec timing cycle. With the flow tubes vibrating at normal frequencies, routine 1400 will be executing sufficiently frequently to ensure the watch-dog timer never reaches the end of its 100 msec timing cycle before being reset. Once block 1552 has executed, execution passes to block 1554 which, when executed, decrements the current value of the software counter, IROC, by one. As discussed above, the contents of this counter are reset by each time 100 msec interrupt routine 1000 (see FIGS. 10A–10D) executes. Now, in the event 100 msec interrupt routine 1000 has not executed during a two second period, a fault has occurred, probably in the real time clock. When this fault occurs, block 1554 will eventually decrement the contents of this counter to zero. At this point, execution passes to decision block 1560 which tests whether the contents of this counter equal zero, i.e. that the software timer IROC has timed out. If the count is not equal to zero, then execution exits from Time Difference Measurement Interrupt Routine 1400, via the NO path from decision block 1560. Alternatively, if the software timer has timed out (the value of IROC equals zero), then execution proceeds, via the YES path from decision block 1560, to block 1563. This latter block, when executed, flags the fault condition and stores the corresponding fault code along with a time/date stamp as the latest entry in the fault stack in NOVRAM. Thereafter, block 1565 is executed to invoke fault routine 900, as discussed above. Only after the user intervenes to reset the system will execution proceed to exit routine 1400 and return to entry point A in main program 500 (see FIG. 5).

Now, alternatively, if decision block 1443 has classified the incoming time difference measurement as $T_D$, then execution will proceed, via path 1445 from this decision block, to decision block 1567. This latter block will also check the contents of counter INCNT to determine whether its contents equal the value "16", which signifies that both reference signals are being applied through input switch 320 to channels 1 and 2. If the count equals the value "16", then execution proceeds, via the YES path emanating from decision block 1567, to block 1571. This latter block, when executed stores the value of the incoming time measurement value, now $T_D$, in a separate location in NOVRAM for subsequent use during execution of the input channel diagnostic. Thereafter, block 1573 executes to instruct input switch 320 to route the left and right velocity sensor signals rather than the reference voltages to channels 1 and 2 of time measurement difference circuit 30. At this point, execution exits from Time Difference Measurement Routine 1400. Alternatively, if the value of INCNT does not equal "16", then execution proceeds, via the NO path from decision block 1567, to block 1569. This latter block, when executed, invokes $T_D$ routine 1470 to appropriately process the incoming time difference measurement as $T_D$. Thereafter, the excess noise flag is tested as a diagnostic. Specifically, execution proceeds to decision block 1575 to test the status of the Excess Noise flag. If this flag is set, thereby indicating that noise was present on either or both velocity sensor signals, then execution first proceeds to block 1578 which resets the Excess Noise flag. Now, inasmuch as this noise may be a transient phenomena, a fault condition will only be signalled if this noise exists during two successive sets of time difference measurements (eight iterations) through routine 1400. Hence, once block 1578 executes, decision block 1580 is executed. This block tests the status of a Prior Excess Noise flag. In the event this flag is not set—this is the first occurrence of noise in the time difference measurements, then execution proceeds, via the NO path from decision block 1580, to block 1587 which sets the Prior Excess Noise flag for use during the following four iterations for the next set of four time difference measurements. One this occurs, execution then exits from routine 1400. As one can now appreciate, once noise is detected, the complete set of four time difference measurements that are affected by noise are ignored. Now, if the Prior Excess Noise flag has previously been set—indicating that noise extends into two successive sets of measurements, a fault condition occurs and decision block 1580 routes execution to block 1583. This block, when executed, flags the fault condition by entering the corresponding fault code along with the time/date stamp as the latest entry in the fault stack in NOVRAM. Thereafter, block 1585 is executed to invoke fault routine 900. This routine continues executing until the user intervenes to reset the system and by so doing causes execution to exit from routine 1400 and return to entry point A in main program 500 (see FIG. 5).

Now, alternatively, if the Excess Noise flag is not set, then decision block 1575 routes execution, via NO path 1576, to decision block 1590. This latter decision block checks whether an input overflow has just occurred for any of the incoming time difference measurements in the present set. As noted above, an input overflow occurs if the microprocessor detects that an incoming time difference measurement exceeds the capacity of counter 370 thereby causing it to overflow. If an overflow has not occurred, then execution proceeds, via the NO path from this decision block, to decision block 1593. This latter decision block checks the status of the +5 volt supply by testing the level of the +5 VOLT STATUS signal. In the event this supply is properly operating, then execution proceeds to block 1599. This block, when executed, invokes Filter and Store Routine 1490 to digitally filter the time difference sum, subtract the zero flow offset therefrom and store the resulting value as time difference sum $TS_f$ in NOVRAM for subsequent use by 100 msec interrupt routine 1000 (see FIGS. 10A–10D). Once routine 1490 has executed, execution exits from routine 1400. Now, alternatively, in the event an input overflow has just occurred, then execution proceeds, via the YES path from decision block 1590, to decision block 1596. Inasmuch as an overflow can occur in response to a transient condition, decision block 1590 determines whether an input overflow occurred during the previous set of time difference measurements. If an overflow did not occur during the previous set of measurements, then decision block 1596 routes execution, via its NO path, to block 1604 which sets the Input Overflow flag. Thereafter, execution exits routine 1400. Whenever an input overflow condition occurs, the present set of time difference measurements is ignored. Alternatively, if the Input Overflow flag has been previously set and an input overflow condition is currently present, indicating that an overflow occurs during each of two successive measurement sets, then a fault exists. In this case, decision block 1596 routes execution to block 1600. This block also executes, via the NO path from decision block 1593, in the event this decision block detects a failure in the +5 volt supply. Block 1600, when executed, flags the fault condition and enters the corresponding fault code along with the time/date stamp as the latest entry in the fault stack in NOVRAM. Thereafter, block 1602 executes to invoke fault routine 900. This routine continuously re-executes until the user intervenes to reset the system and cause execution to exit from Time Difference Measurement Routine 1400 and proceed to entry point A in main program 500 (see FIG. 5). This now concludes the detailed discussion of routine 1400.

As noted, the software utilizes several multiplication steps, particularly for scaling and unit conversion. To save execution time, the software performs non-integer multiplication through integer multiplication followed by shifting. In particular, a non-integer number can be accurately represented by an integer number (N) divided by two raised to a predetermined power (M). For each non-integer number, several different N and M values might exist. For example, to multiply a value in pounds/second to kilograms/second requires multiplying that value by a pounds to kilograms conversion factor of 2.2046. The value 2.2046 also equals $72240/2^{15}$, $36120/2^{14}$, or $18060/2^{13}$. Therefore, this conversion can be quickly computed by multiplying the value in kilograms/second by an integer, 72240, 36120 or 18060 and then shifting the result to the right by 15, 14 or 13 places, respectively. Inasmuch as the microprocessor used in the preferred embodiment, a ZS-8 manufactured by the Zilog Corporation contains an internal 8-by-8 bit hardware multiplier which is used in implementing a 16-by-16 bit software multiplier, the integer is chosen to be as large as possible up to a maximum value of 65535 ($2^{16}-1$), in order to provide maximal resolution, so long as the value, M, of the exponent remains an integer. Hence, corresponding N and M values are stored for all pre-determined non-integer constants (e.g. scaling, conversion factors, spring constants and the like) in a table in EPROM. Whenever the microprocessor is instructed to calculate a non-integer product of a number times any of these non-integer constants, the microprocessor accesses the table to determine the appropriate N and M values and then performs the non-integer multiplication by first multiplying the constant by the integer N, using the hardware multiplier, and then shifting the result to the right M places (or, if M is negative, to the left M places). A significant amount of execution time is advantageously saved in this fashion.

C. Network Description

Now, with the above understanding of the inventive metering system in mind, several such systems can be interconnected into a network with a single host processor as shown in FIG. 16.

As shown, the network contains individual metering systems $5_1, 5_2, \ldots, 5_n$, each consisting of a meter assembly and a ticket printer both connected to meter electronics. Meter assemblies $10_1, 10_2, \ldots, 10_n$ are all identical to meter assembly 10 shown in FIG. 1 and discussed in detail above, and are connected through leads $100_1, 100_2, \ldots, 100_n$ to meter electronics $20_1, 20_2, \ldots, 20_n$, respectively. Similarly, all the individual meter electronics are identical to meter electronics 20 which is also shown in FIG. 1 and discussed in detail above. As noted, each meter electronics provides two serial ports: an RS-232C port and an RS-485 port. The RS-232C port is used by each metering system to communicate to a local peripheral, such as a ticket printer as discussed above. Here, ticket printers $15_1, 15_2, \ldots, 15_n$ are respectively connected through leads $252_1, 252_2, \ldots, 252_n$ to meter electronics $20_1, 20_2, \ldots, 20_n$. The RS-485 ports are used for network communications and are all tied together to a common two wire differential line 83 (e.g. a suitable twisted pair). A host computer containing processor 88 is also tied to differential communication line 83 through RS-485 port 85. In addition, ticket printer 90 is locally connected, via RS-232C serial interface 86, to processor 88 located within the host computer. Through inclusion of appropriate software within each metering system and in the host computer, the host computer can advantageously communicate with each individual metering system on a bi-directional basis. In this manner, the host computer can first configure each metering system as desired by appropriately setting the user parameters for that meter (select appropriate scaling factors, high/low alarm levels, output measurement units) and thereafter receive flow data from each meter either by querying that meter or through a periodic transmission initiated by that meter. The host computer can also receive fault data from each meter and clear fault conditions. In this manner, the host can obtain all the totalized flow and mass flow rate measured by every meter for further analysis and plant wide process control applications. Moreover, the host computer can locally print totalized flow information for one or more metering systems using ticket printer 90.

This network capability finds particular use in many applications where multiple metering sites are necessary. One such illustrative application is a tank farm. Here, each metering system is connected in series with piping leading to a corresponding tank and is used to measure the amount of product (liquid or slurry) that flows into or from that tank. Through the network, one host computer can readily obtain flow data on a number of tanks in the farm. As tanks are filled with different products, the host computer can appropriately configure the meter for each tank to provide mass flow and mass flow rate data in suitable measurement units particular to the industry using that product. In the event a tank is to be filled with a different product than that which previously occurred, then the host computer can easily re-configure the metering system for that tank to suit the new product. This, in turn, advantageously eliminates the need for human operators to visit each metering site to configure the meter. Moreover, prior to a custody transfer, information could be downloaded, into host computer 80 from an upstream processor, situated at a source location such as a pipeline, refinery or other tank farm, regarding the products to be subsequently transferred such that the ensuing custody transfer of all the products can be handled and metered on a totally automatic basis.

Clearly, those skilled in the art recognize that, although the disclosed embodiment utilizes U-shaped flow tubes, flow tubes of almost any size and shape may be used as long as the tubes can be oscillated about an axis to establish a non-inertial frame of reference. For example, these tubes may include but are not limited to straight tubes, S-shaped tubes or looped tubes. Moreover, although the meter has been shown as containing only two parallel flow tubes, more than two parallel flow tubes—such as three, four or even more—may be used if desired. Furthermore, although the flow tubes have been described as being constructed from a material having a linear spring constant (such as 316 L stainless steel), the flow tubes could alternatively be fabricated from a material having a non-linear spring constant as long as the spring constant can be accurately characterized as being linear throughout the range of movement in which the flow tubes are vibrated.

Although a particular embodiment of the present invention has been shown and described herein, many varied embodiments incorporating the teachings of the present invention may be easily constructed by those skilled in the art.

We claim:

1. Apparatus for a Coriolis mass flow metering system particularly suited for use in custody transfers, said apparatus comprising:

a Coriolis metering assembly for measuring the mass flow rate of a fluid flowing therethrough, said assembly comprising:

first and second flow tubes;

inlet and outlet manifolds for respectively conducting said fluid into and out of both of said flow tubes, wherein said inlet manifold divides the fluid between both of said tubes and said outlet manifold combines the fluid exiting from both of said tubes;

first and second mounting blocks, which receive corresponding ends of both of said flow tubes and are fixedly secured to said inlet and outlet manifolds, for respectively dividing the fluid emanating from said inlet manifold and routing said divided fluid into both of said flow tubes or combining the fluid emanating from both of said flow tubes and routing the combined fluid into said outlet manifold, means, responsive to a drive signal, for vibrating both of said flow tubes in an opposing sinusoidal pattern; and means for sensing movement of both of said flow tubes caused by opposing Coriolis forces induced by passage of the fluid through said flow tubes and for producing sensor signals responsive to sensed movement; and circuit means, responsive to said sensor signals, for providing a totalized value of the mass flow of the fluid that has passed through said metering assembly, said circuit means comprising:

means, responsive to at least one of said sensor signals, for producing said drive signal;

means, responsive to said sensor signals, for determining, in response to the sensed movement of both of said flow tubes, successive time difference measurements, wherein any one of said time difference measurements occurs between first and second time points, wherein said first time point occurs when the velocity of a pre-defined point on said first flow tube reaches a pre-determined reference value and said second time point occurs when the velocity of a pre-defined point on said second flow tube reaches a corresponding pre-determined reference value, and wherein said one time difference value is a function of the value of the mass flow rate of the fluid that simultaneously passes through both of said flow tubes;

means, responsive to said determined time difference measurements, for generating successive measured values of the mass flow of said fluid that occur over corresponding pre-defined intervals of time;

means for accumulating said mass flow rate values over pre-determined intervals of time so as to produce the totalized mass flow value;

means for periodically executing at least one diagnostic operation so as to test the performance of a pre-defined portion of said apparatus and for detecting an occurrence of a fault condition, said fault condition being either a failure of said one diagnostic operation or the occurrence of any one of a number of pre-defined failure conditions that might occur in the operation of either said Coriolis meter assembly or said circuit means;

means, operative in conjunction with said accumulating means and in response to the occurrence of said fault condition, for inhibiting further accumulation of said measured mass flow values by said accumulating means during the fault condition so as to maintain said totalized mass flow value at a substantially constant value regardless of the amount of fluid that flows through said Coriolis meter assembly during the fault condition;

means, operative in conjunction with said accumulating means, for permitting said accumulating means to resume accumulation as soon as the fault condition has been cleared through external intervention to end the fault condition;

means for providing, as corresponding outputs of said metering system, said totalized mass flow value and an indication of the occurrence of said fault condition;

means for generating a first interrupt at the conclusion of each time difference measurement;

means for generating a second interrupt at fixed intervals of time; and means for servicing first and second interrupts, wherein said interrupt servicing means, in response to said first interrupt, incorporates a current one of said time difference measurements into a sum and, in response to said second interrupt, causes the accumulating means to update, in response to a current value of said sum, a measured value of the mass flow rate and the totalized mass flow value; and further wherein said diagnostic operation is executed during a time when neither said first interrupt nor said second interrupt is being serviced.

2. The apparatus in claim 1 wherein said constant value is the totalized value that existed immediately prior to the occurrence of said fault condition.

3. The apparatus in claim 2 wherein said circuit means further comprises:

means for producing an error signal in the event at least one of said sensor signal contains noise; and means, responsive to said error signal, for causing an associated one of the failure conditions to occur in the event said noise exists over a pre-selected period of time.

4. The apparatus in claim 1 wherein said circuit means further comprises means for executing a pre-defined sequence of diagnostics while said interrupt servicing means is waiting for either said first interrupt or said second interrupt to occur.

5. The apparatus in claim 4 wherein said circuit means further comprises means for storing and subsequently displaying a corresponding fault code of each of said fault conditions that has occurred.

6. Apparatus for a Coriolis mass flow metering system particularly suited for use in custody transfers, said apparatus comprising:

a Coriolis metering assembly for measuring the mass flow rate of a fluid flowing therethrough, said assembly comprising:

first and second flow tubes;

inlet and outlet manifolds for respectively conducting said fluid into and out of both of said flow tubes, wherein said inlet manifold divides the fluid between both of said tubes and said outlet manifold combines the fluid exiting from both of said tubes;

first and second mounting blocks, which receive corresponding ends of both of said flow tubes and are fixedly secured to said inlet and outlet manifolds, for respectively dividing the fluid emanating from said inlet manifold and routing said divided fluid into both of said flow tubes or combining the fluid emanating from both of said flow tubes and routing the combined fluid into said outlet manifold, means, responsive to a drive signal, for vibrating both of said flow tubes in an opposing sinusoidal pattern; and means for sensing movement of both of said flow tubes caused by opposing Coriolis forces induced by passage of the fluid through said flow tubes and for producing sensor signals responsive to sensed movement; and circuit means, responsive to said sensor signals, for providing a totalized value of the mass flow of the fluid that has passed through said metering assembly, said circuit means comprising:

means, responsive to at least one of said sensor signals, for producing said drive signal;

means, responsive to said sensor signals, for determining, in response to the sensed movement of both of said flow tubes, successive time difference measurements, wherein any one of said time difference measurements occurs between first and second time points, said first time point occurring when the velocity of a pre-defined point on said first flow tube reaches a pre-determined reference value and said second time point occurring when the velocity of a pre-defined point on said second flow tube reaches a corresponding pre-determined reference value, wherein said one time difference value is a function of the value of the mass flow rate of the fluid that simultaneously passes through both of said flow tubes, and wherein said time difference measurements determining means comprises:

means for applying first and second ones of said sensor signals as first and second channel signals, respectively;

means, responsive to said first and second channel signals, for measuring said time difference and for producing a numerical value representative of said measured time difference; and means for obtaining a plurality of individual time difference measurements occurring during a pre-determined number of sinusoidal cycles that form at least one of said sensor signals, wherein half of said time difference measurements are taken with the first and second ones of said sensor signals applied as said first and second channel signals and the other half are taken with the sensor signals applied in reverse order;

means, responsive to said determined time difference measurements, for generating successive measured values of the mass flow of said fluid that occur over corresponding pre-defined intervals of time;

means for accumulating said mass flow rate values over pre-determined intervals of time so as to produce the totalized mass flow value;

means for periodically executing at least one diagnostic operation so as to test the performance of a pre-defined portion of said apparatus and for detecting an occurrence of a fault condition, said fault condition being either a failure of said one diagnostic operation or the occurrence of any one of a number of pre-defined failure conditions that might occur in the operation of either said Coriolis meter assembly or said circuit means;

means, operative in conjunction with said accumulating means and in response to the occurrence of said fault condition, for inhibiting further accumulation of said measured mass flow values by said accumulating means during the fault condition so as to maintain said totalized mass flow value at a substantially constant value regardless of the amount of fluid that flows through said Coriolis meter assembly during the fault condition;

means, operative in conjunction with said accumulating means, for permitting said accumulating means to resume accumulation as soon as the fault condition has been cleared through external intervention to end the fault condition; and means for providing, as corresponding outputs of said metering system, said totalized mass flow value and an indication of the occurrence of said fault condition.

7. The apparatus in claim 6 wherein said time difference measurements determining means further comprises means, responsive to said individual time difference measurements, for generating a sum of the values of the individual time difference measurements such that error components attributable to differences in electrical characteristics of the first and second channels are canceled in said sum.

8. The apparatus in claim 7 wherein said time difference measurements determining means further comprises means for obtaining four individual time difference measurements during two successive cycles occurring in a waveform formed of an average of said first and second sensor signals.

9. The apparatus in claim 6 wherein said applying means comprises means for routing pre-defined first and second reference signals through said time difference measurements determining means as said sensor signals at pre-selected times so as to produce corresponding time difference reference measurements, and wherein said apparatus further comprises means for determining whether the time difference reference measurements lie within pre-defined bounds and, if one of said time difference reference measurements lies outside of said bounds, for generating an associated one of said failure conditions.

10. Apparatus for a Coriolis mass flow metering system particularly suited for use in custody transfers, wherein said apparatus utilizes a Coriolis mass flow rate metering assembly having at least two flow tubes with sensors coupled thereto for providing sensor signals indicative of movement of both of the flow tubes, said apparatus comprising:

means, responsive to said sensor signals, for determining, in response to the sensed movement of both of said flow tubes, successive time difference measurements, wherein any one of said time difference measurements occurs between first and second time points, wherein said first time point occurs when the velocity of a pre-defined point on said first flow tube reaches a pre-determined reference value and said second time point occurs when the velocity of a pre-defined point on said second flow tube reaches a corresponding pre-determined reference value, and wherein said one time difference value is a function of the value of the mass flow rate of the fluid that simultaneously passes through both of said flow tubes;

means, responsive to said determined time difference measurements, for generating successive measured values of the mass flow of said fluid that occur over corresponding pre-defined intervals of time;

means for accumulating said mass flow rate values over pre-determined intervals of time so as to produce the totalized mass flow value;

means for periodically executing at least one diagnostic operation so as to test the performance of a pre-defined portion of said apparatus and for detecting an occurrence of a fault condition, said fault condition being either a failure of said one diagnostic operation or the occurrence of any one of a number of pre-defined failure conditions that might occur in the operation of either said Coriolis meter assembly or said circuit means;

means, operative in conjunction with said accumulating means and in response to the occurrence of said fault condition, for inhibiting further accumulation of said measured mass flow values by said accumulating means during the fault condition so as to maintain said totalized mass flow value at a substantially constant value regardless of the amount of fluid that flows through said Coriolis meter assembly during the fault condition;

means, operative in conjunction with said accumulating means, for permitting said accumulating means to resume accumulation as soon as the fault condition has been cleared through external intervention to end the fault condition;

means for providing, as corresponding outputs of said metering system, said totalized mass flow value and an indication of the occurrence of said fault condition;

means for generating a first interrupt at the conclusion of each time difference measurement;

means for generating a second interrupt at fixed intervals of time; and means for servicing first and second interrupts, wherein said interrupt servicing means, in response to said first interrupt, incorporates a current one of said time difference measurements into a sum and, in response to said second interrupt, causes the accumulating means to update, in response to a current value of said sum, a measured value of the mass flow rate and the totalized mass flow value; and further wherein said diagnostic operation is executed during a time when neither said first interrupt nor said second interrupt is being serviced.

11. The apparatus in claim 10 wherein said constant value is the totalized value that existed immediately prior to the occurrence of said fault condition.

12. The apparatus in claim 11 further comprising:
means for producing an error signal in the event at least one of said sensor signal contains noise; and
means, responsive to said error signal, for causing an associated one of the failure conditions to occur in the event said noise exists over a pre-selected period of time.

13. The apparatus in claim 10 further comprising means for executing a pre-defined sequence of diagnostics while said interrupt servicing means is waiting for either said first interrupt or said second interrupt to occur.

14. The apparatus in claim 13 further comprising means for storing and subsequently displaying a corresponding fault code of each of said fault conditions that has occurred.

15. Apparatus for a Coriolis mass flow metering system particularly suited for use in custody transfers, wherein said apparatus utilizes a Coriolis mass flow rate metering assembly having at least two flow tubes with sensors coupled thereto for providing sensor signals indicative of movement of both of the flow tubes, said apparatus comprising:
means, responsive to said sensor signals, for determining, in response to the sensed movement of both of said flow tubes, successive time difference measurements, wherein any one of said time difference measurements occurs between first and second time points, said first time point occurring when the velocity of a pre-defined point on said first flow tube reaches a pre-determined reference value and said second time point occurring when the velocity of a pre-defined point on said second flow tube reaches a corresponding pre-determined reference value, wherein said one time difference value is a function of the value of the mass flow rate of the fluid that simultaneously passes through both of said flow tubes, and wherein said time difference measurements determining means comprises:
means for applying first and second ones of said sensor signals as first and second channel signals, respectively;
means, responsive to said first and second channel signals, for measuring said time difference and for producing a numerical value representative of said measured time difference; and
means, for obtaining a plurality of individual time difference measurements occurring during a pre-determined number of sinusoidal cycles that form at least one of said sensor signals, wherein half of said time difference measurements are taken with the first and second ones of said sensor signals applied as said first and second channel signals and the other half are taken with the sensor signals applied in reverse order;
means, responsive to said determined time difference measurements, for generating successive measured values of the mass flow of said fluid that occur over corresponding pre-defined intervals of time;
means for accumulating said mass flow rate values over pre-determined intervals of time so as to produce the totalized mass flow value;
means for periodically executing at least one diagnostic operation so as to test the performance of a pre-defined portion of said apparatus and for detecting an occurrence of a fault condition, said fault condition being either a failure of said one diagnostic operation or the occurrence of any one of a number of pre-defined failure conditions that might occur in the operation of either said Coriolis meter assembly or said circuit means;
means, operative in conjunction with said accumulating means and in response to the occurrence of said fault condition, for inhibiting further accumulation of said measured mass flow values by said accumulating means during the fault condition so as to maintain said totalized mass flow value at a substantially constant value regardless of the amount of fluid that flows through said Coriolis meter assembly during the fault condition;
means, operative in conjunction with said accumulating means, for permitting said accumulating means to resume accumulation as soon as the fault condition has been cleared through external intervention to end the fault condition; and
means for providing, as corresponding outputs of said metering system, said totalized mass flow value and an indication of the occurrence of said fault condition.

16. The apparatus in claim 15 wherein said time difference measurements determining means further comprises means, responsive to said individual time difference measurements, for generating the sum of the values of the individual time difference measurements such that error components attributable to differences in electrical characteristics of the first and second channels are canceled in said sum.

17. The apparatus in claim 16 wherein said time difference measurements determining means further comprises means for obtaining four individual time difference measurements during two successive cycles occurring in a waveform formed of an average of said first and second sensor signals.

18. The apparatus in claim 15 wherein said applying means comprises means for routing pre-defined first and second reference signals through said time difference measurements determining means as said sensor signals at pre-selected times so as to produce corresponding time difference reference measurements, and wherein said processing circuit further comprises means for determining whether the time difference reference measurements lie within pre-defined bounds and, if one of said time difference reference measurements lies outside of said bounds, for generating an associated one of said failure conditions.

19. Apparatus for a Coriolis mass flow metering system particularly suited for use in custody transfers, said apparatus comprising:
a Coriolis metering assembly for measuring the mass flow rate of a fluid flowing therethrough, said assembly comprising:
first and second flow tubes;
inlet and outlet manifolds for respectively conducting said fluid into and out of both of said flow tubes, wherein said inlet manifold divides the fluid between both of said tubes and said outlet manifold combines the fluid exiting from both of said tubes;
first and second mounting blocks, which receive corresponding ends of both of said flow tubes and are fixedly secured to said inlet and outlet manifolds, for respectively dividing the fluid emanating from said inlet manifold and routing said divided fluid into both of said flow tubes or combining the fluid emanating from both of said flow tubes and routing the combined fluid into said outlet manifold, means, responsive to a drive signal, for vibrating both of said flow tubes in an opposing sinusoidal pattern; and means for sensing movement of both of said flow tubes caused by opposing Coriolis forces induced by passage of the fluid through said flow tubes and for producing sensor signals responsive to sensed movement; and circuit means, responsive to sensed signals, for providing a totalized value of the mass flow of the fluid that has passed through said metering assembly, said circuit means comprising:

means, responsive to at least one of said sensor signals, for producing said drive signal;

means, responsive to said sensor signals, for determining, in response to the sensed movement of both of said flow tubes, successive time difference measurements, wherein any one of said time difference measurements occurs between first and second time points, said first time point occurring when the velocity of a pre-defined point on said first flow tube reaches a pre-determined reference value and said second time point occurring when the velocity of a pre-defined point on said second flow tube reaches a corresponding pre-determined reference value, wherein said one time difference value is a function of the value of the mass flow rate of the fluid that simultaneously passes through both of said flow tubes, and wherein said time difference measurements determining means comprises:

means for applying first and second ones of said sensor signals as first and second channel signals, respectively;

means, responsive to said first and second channel signals, for measuring said time difference and for producing a numerical value representative of said measured time difference; and means for obtaining a plurality of individual time difference measurements occurring during a pre-determined number of sinusoidal cycles that form at least one of said sensor signals, wherein half of said time difference measurements are taken with the first and second ones of said sensor signals applied as said first and second channel signals and the other half are taken with the sensor signals applied in reverse order;

means, responsive to said determined time difference measurements, for generating successive measured values of the mass flow of said fluid that occur over corresponding pre-defined intervals of time;

means for accumulating said mass flow rate values over pre-determined intervals of time so as to produce the totalized mass flow value;

means for periodically executing at least one diagnostic operation so as to test the performance of a pre-defined portion of said apparatus and for detecting an occurrence of a fault condition, said fault condition being either a failure of said one diagnostic operation or the occurrence of any one of a number of pre-defined failure conditions that might occur in the operation of either said Coriolis meter assembly or said circuit means;

means, operative in conjunction with said accumulating means and in response to the occurrence of said fault condition, for inhibiting further accumulation of said measured mass flow values by said accumulating means during the fault condition so as to maintain said totalized mass flow value at a substantially constant value regardless of the amount of fluid that flows through said Coriolis meter assembly during the fault condition;

means, operative in conjunction with said accumulating means, for permitting said accumulating means to resume accumulation as soon as the fault condition has been cleared through external intervention to end the fault condition;

means for providing, as corresponding outputs of said metering system, said totalized mass flow value and an indication of the occurrence of said fault condition;

means for generating a first interrupt at the conclusion of each time difference measurement;

means for generating a second interrupt at fixed intervals of time; and means for servicing first and second interrupts, wherein said interrupt servicing means, in response to said first interrupt, incorporates a current one of said time difference measurements into a sum and, in response to said second interrupt, causes the accumulating means to update, in response to a current value of said sum, a measured value of the mass flow rate and the totalized mass flow value; and further wherein said diagnostic operation is executed during a time when neither said first interrupt nor said second interrupt is being serviced.

20. The apparatus in claim 19 wherein said constant value is the totalized value that existed immediately prior to the occurrence of said fault condition.

21. The apparatus in claim 20 further comprising:

means for producing an error signal in the event at least one of said sensor signal contains noise; and means, responsive to said error signal, for causing an associated one of the failure conditions to occur in the event said noise exists over a pre-selected period of time.

22. The apparatus in claim 19 further comprising means for executing a pre-defined sequence of diagnostics while said interrupt servicing means is waiting for either said first interrupt or said second interrupt to occur.

23. The apparatus in claim 19 wherein said time difference measurements determining means further comprises means, responsive to said individual time difference measurements, for generating the sum of the values of the individual time difference measurements such that error components attributable to differences in electrical characteristics of the first and second channels are canceled in said sum.

24. The apparatus in claim 19 wherein said time difference measurements determining means further comprises means for obtaining four individual time difference measurements during two successive cycles occurring in a waveform formed of an average of said first and second sensor signals.

25. A method for use in a Coriolis mass flow metering system particularly suited for use in custody transfers, wherein said system utilizes a Coriolis mass flow rate metering assembly having at least two flow tubes with sensors coupled thereto for providing information indicative of movement of both of the flow tubes, said method comprising the steps of:

determining, in response to sensed movement of both or said flow tubes, successive time difference measurements, wherein any one of said time difference measurements occurs between first and second time points, wherein said first time point occurs when the velocity of a pre-defined point on said first flow tube reaches a pre-determined reference value and said second time point occurs when the velocity of a pre-defined point on said second flow tube reaches a corresponding pre-determined reference value, and wherein said one time difference value is a function of the value of the mass flow rate of the fluid that simultaneously passes through both of said flow tubes;

generating, in response to said determined time difference measurements, successive measured values of the mass flow of said fluid that occur over corresponding pre-defined intervals of time;

accumulating said mass flow rate values over pre-determined intervals of time so as to produce the totalized mass flow values;

periodically executing at least one diagnostic operation so as to test the performance of said system;

detecting an occurrence of a fault condition, said fault condition being either a failure of said one diagnostic operation or the occurrence of any one of a number of pre-defined failure conditions that might occur in the operation of either said Coriolis meter assembly or said circuit means;

inhibiting, in response to the occurrence of said fault condition, further accumulation of said measured mass flow values by said accumulating step during the fault condition so as to maintain said totalized mass flow value at a substantially constant value regardless of the amount of fluid that flows through said Coriolis meter assembly during the fault condition;

permitting said accumulating step to resume accumulation as soon a the fault condition has been cleared through external intervention to end the fault condition;

providing, as corresponding outputs of said metering system, said totalized mass flow value and an indication of the occurrence of said fault condition;

generating a first interrupt at the conclusion of each time difference measurement;

servicing said first interrupt in order to incorporate a current time difference measurement into a sum;

generating a second interrupt at fixed intervals of time;

servicing said second interrupt, in order to cause said accumulating step to update, in response to a current value of said sum, a measured value of mass flow rate value and the totalized mass flow value; and executing said diagnostic operation during a time when neither said first interrupt nor said second interrupt is being serviced.

26. The method in claim 25 wherein said constant value is the totalized value that existed immediately prior to the occurrence of said fault condition.

27. The method in claim 26 further comprising the steps of:

producing an error signal in the event at least one of said sensor signal contains noise; and causing, in response to said error signal, an associated one of the failure conditions to occur in the event said noise exists over a pre-selected period of time.

28. The method in claim 25 further comprising the step of executing a pre-defined sequence of diagnostics while waiting for either said first interrupt or said second interrupt to occur.

29. The method in claim 28 further comprising the step of storing and subsequently displaying a corresponding fault code of each of said fault conditions that has occurred.

30. A method for use in a Coriolis mass flow metering system particularly suited for use in custody transfers, wherein said system utilizes a Coriolis mass flow rate metering assembly having at least two flow tubes with sensors coupled thereto for providing information indicative of movement of both of the flow tubes, said method comprising the steps of:

determining, in response to sensed movement of both of said flow tubes, successive time difference measurements, wherein any one of said time difference measurements occurs between first and second time points, said first time point occurring when the velocity of a pre-defined point on said first flow tube reaches a pre-determined reference value and said second time point occurring when the velocity of a pre-defined point on said second flow tube reaches a corresponding pre-determined reference value, wherein said one time difference value is a function of the value of the mass flow rate of the fluid that simultaneously passes through both of said flow tubes, and wherein said time difference measurements determining step comprises the steps of:

applying first and second ones of said sensor signals as first and second channel signals, respectively;

measuring, in response to said first and second channel signals, a time difference and for producing a numerical value representative of said measured time difference; and obtaining a plurality of individual time difference measurements occurring during a pre-determined number of sinusoidal cycles that form at least one of said sensor signals, wherein half of said time difference measurements are taken with the first and second ones of said sensor signals applied as said first and second channel signals and the other half are taken with the sensor signals applied in reverse order;

generating, in response to said determined time difference measurements, successive measured values of the mass flow of said fluid that occur over corresponding pre-defined intervals of time;

accumulating said mass flow rate values over pre-determined intervals of time so as to produce the totalized mass flow value;

periodically executing at least one diagnostic operation so as to test the performance of said system;

detecting an occurrence of a fault condition, said fault condition being either a failure of said one diagnostic operation or the occurrence of any one of a number of pre-defined failure conditions that might occur in the operation of either said Coriolis meter assembly or said circuit means;

inhibiting, in response to the occurrence of said fault condition, further accumulation of said measured mass flow values by said accumulating step during the fault condition so as to maintain said totalized mass flow value at a substantially constant value regardless of the amount of fluid that flows through said Coriolis meter assembly during the fault condition;

permitting said accumulating step to resume accumulation as soon as the fault condition has been cleared through external intervention to end the fault condition; and providing, as corresponding outputs of said metering system, said totalized mass flow value and an indication of the occurrence of said fault condition.

31. The method in claim 30 wherein said time difference measurements determining step further comprises the step of generating, in response to said individual time difference measurements, the sum of the values of the individual time difference measurements such that error components attributable to differences in electrical characteristics of the first and second channels are canceled in said sum.

32. A method for use in a Coriolis mass flow metering system particularly suited for use in custody transfers, wherein said system utilizes a Coriolis mass flow rate metering assembly having at least two flow tubes with sensors coupled thereto for providing information indicative of movement of both of the flow tubes, said method comprising the steps of:

determining, in response to sensed movement of both of said flow tubes, successive time difference measurements, wherein any one of said time difference measurements occurs between first and second time points, said first time point occurring when the velocity of a pre-defined point on said first flow tube reaches a pre-determined reference value and said second time point occurring when the velocity of a pre-defined point on said second flow tube reaches a corresponding pre-determined reference value, wherein said one time difference value is a function of the value of the mass flow rate of the fluid that simultaneously passes through both of said flow tubes, and wherein said time difference measurements determining step comprises the steps of:

applying first and second ones of said sensor signals as first and second channel signals, respectively;

measuring, in response to said first and second channel signals, a time difference and for producing a numerical value representative of said measured time difference; and obtaining a plurality of individual time difference measurements occurring during a pre-determined number of sinusoidal cycles that form at least one of said sensor signals, wherein half of said time difference measurements are taken with the first and second ones of said sensor signals applied as said first and second channel signals and the other half are taken with the sensor signals applied in reverse order;

generating, in response to said determined time difference measurements, successive measured values of the mass flow of said fluid that occur over corresponding pre-defined intervals of time;

accumulating said mass flow rate values over pre-determined intervals of time so as to produce the totalized mass flow value;

periodically executing at least one diagnostic operation so as to test the performance of said system;

detecting an occurrence of a fault condition, said fault condition being either a failure of said one diagnostic operation or the occurrence of any one of a number of pre-defined failure conditions that might occur in the operation of either said Coriolis meter assembly or said circuit means;

inhibiting, in response to the occurrence of said fault condition, further accumulation of said measured mass flow values by said accumulating step during the fault condition so as to maintain said totalized mass flow value at a substantially constant value regardless of the amount of fluid that flows through said Coriolis meter assembly during the fault condition;

permitting said accumulating step to resume accumulation as soon as the fault condition has been cleared through external intervention to end the fault condition;

providing, as corresponding outputs of said metering system, said totalized mass flow value and an indication of the occurrence of said fault condition;

generating a first interrupt at the conclusion of each time difference measurement;

servicing said first interrupt in order to incorporate a current time difference measurement into a sum;

generating a second interrupt at fixed intervals of time;

servicing said second interrupt, in order to cause said accumulating step to update, in response to a current value of said sum, a measured value of mass flow rate value and the totalized mass flow value; and executing said diagnostic operation during a time when neither said first interrupt nor said second interrupt is being serviced.

33. The method in claim 32 wherein said constant value is the totalized value that existed immediately prior to the occurrence of said fault condition.

34. The method in claim 33 further comprising the steps of:

producing an error signal in the event at least one of said sensor signal contains noise; and causing, in response to said error signal, an associated one of the failure conditions to occur in the event said noise exists over a pre-selected period of time.

35. The method in claim 32 further comprising the step of executing a pre-defined sequence of diagnostics while waiting for either said first interrupt or said second interrupt to occur.

36. The method in claim 32 wherein said time difference measurements determining step comprises the step of generating, in response to said individual time difference measurements, the sum of the values of the individual time difference measurements such that error components attributable to differences in electrical characteristics of the first and second channels are canceled in said sum.

37. The method in claim 32 wherein said time difference determining step comprises the step of obtaining four individual time difference measurements during two successive cycles occurring in a waveform formed of an average of said first and second sensor signals.

* * * * *